United States Patent
Washino et al.

(10) Patent No.: US 8,733,307 B2
(45) Date of Patent: May 27, 2014

(54) HYDRAULIC BRAKING DEVICE AND VALVE TIMING ADJUSTING APPARATUS

(71) Applicant: Denso Corporation, Kariya (JP)

(72) Inventors: Seiichirou Washino, Nagoya (JP); Toru Takahashi, Chiryu (JP); Makoto Otsubo, Anjo (JP); Kuniaki Oka, Nishio (JP); Shuhei Oe, Nukata-gun (JP)

(73) Assignee: Denso Corporation, Kariya (JP)

( * ) Notice: Subject to any disclaimer, the term of this patent is extended or adjusted under 35 U.S.C. 154(b) by 5 days.

(21) Appl. No.: 13/628,191

(22) Filed: Sep. 27, 2012

(65) Prior Publication Data

US 2013/0074793 A1 Mar. 28, 2013

(30) Foreign Application Priority Data

Sep. 28, 2011 (JP) ................................. 2011-212130
Nov. 16, 2011 (JP) ................................. 2011-250901
Jan. 31, 2012 (JP) ................................. 2012-17792
Apr. 6, 2012 (JP) ................................. 2012-87509
Jul. 23, 2012 (JP) ................................. 2012-162924

(51) Int. Cl.
*F01L 1/34* (2006.01)
*F01L 1/344* (2006.01)
*H01F 1/44* (2006.01)
*F16D 57/00* (2006.01)
*F16F 9/53* (2006.01)
*F16F 13/30* (2006.01)

(52) U.S. Cl.
CPC ................ *F01L 1/3442* (2013.01); *F16F 9/53* (2013.01); *F16F 13/30* (2013.01); *H01F 1/447* (2013.01); *F16D 57/002* (2013.01); *F16F 9/535* (2013.01)

USPC ..................... 123/90.17; 123/90.15; 464/160; 188/267.2

(58) Field of Classification Search
CPC ...................................... F01L 1/3442
USPC ........... 123/90.15, 90.17; 464/160; 188/267.2
See application file for complete search history.

(56) References Cited

U.S. PATENT DOCUMENTS 8,245,679 B2 * 8/2012 Morishima ................. 123/90.17
2010/0095920 A1   4/2010 Morishima
2011/0303170 A1  12/2011 Morishima

FOREIGN PATENT DOCUMENTS

JP   61-065913   4/1986
JP   62-209272   9/1987
JP   63-214578   9/1988

(Continued)

OTHER PUBLICATIONS

Office Action (2 pages) dated Feb. 25, 2014 issued in corresponding Japanese Application No. 2012-087509 and English translation (3 pages).

*Primary Examiner* — Ching Chang
(74) *Attorney, Agent, or Firm* — Nixon & Vanderhye PC

(57) ABSTRACT

A sealing structure has a permanent magnet and a magnetic-flux guiding member for guiding magnetic flux of the permanent magnet to a brake shaft of a brake rotating member. The magnetic-flux guiding member surrounds an outer periphery of the brake shaft so as to form a sealing gap around the brake shaft. The sealing gap is communicated to a fluid chamber, in which magnetic viscous fluid is filled. A fluid sealing member is provided at the brake shaft at a housing outer side of the magnetic-flux guiding member to form an intermediate fluid chamber, in which an intermediate fluid made of non-magnetic liquid is filled.

39 Claims, 52 Drawing Sheets

(56) References Cited

FOREIGN PATENT DOCUMENTS

| | | |
|---|---|---|
| JP | 2002-235856 | 8/2002 |
| JP | 2004-218457 | 8/2004 |
| JP | 2005-220776 | 8/2005 |
| JP | 2010-164118 | 7/2010 |

\* cited by examiner

FIG. 7

|  | BASE FLUID OF MAGNETIC VISCOUS FLUID | | INTERMEDIATE FLUID | |
|---|---|---|---|---|
| 1st EMBODIMENT | NON-MAGNETIC | NON-POLAR | NON-MAGNETIC | POLAR |
| 2nd EMBODIMENT | | POLAR | | NON-POLAR |
| 3rd EMBODIMENT | | NON-POLAR | | NON-POLAR |

HYDRAULIC BRAKING DEVICE AND VALVE TIMING ADJUSTING APPARATUS

CROSS REFERENCE TO RELATED APPLICATION

This application is based on the following Japanese Patent Applications, the disclosures of which are incorporated herein by reference:
(1) No. 2011-212130 filed on Sep. 28, 2011;
(2) No. 2011-250901 filed on Nov. 16, 2011;
(3) No. 2012-017792 filed on Jan. 31, 2012;
(4) No. 2012-087509 filed on Apr. 6, 2012; and
(5) No. 2012-162924 filed on Jul. 23, 2012.

TECHNICAL FIELD

The present disclosure relates to a hydraulic braking device and a valve timing adjusting apparatus having the same.

BACKGROUND

A hydraulic braking device is known in the art, according to which magnetic viscous fluid is filled in a fluid chamber formed in a housing and a brake rotating member is rotatably accommodated in the fluid chamber so that the brake rotating member is in contact with the magnetic viscous fluid. Viscosity of the magnetic viscous fluid is controlled (changed) when density of magnetic flux passing through the magnetic viscous fluid is changed. In the hydraulic braking device of this kind, it is possible to apply braking torque to the brake rotating member with a relatively small amount of electric power. Therefore, the hydraulic braking device is preferably applied to a valve timing adjusting apparatus for an internal combustion engine, according to which a relative phase (an engine operational phase) between a crankshaft and a cam shaft for deciding a valve timing (a valve opening and/or closing timing of an intake and/or an exhaust valve) is adjusted depending on a degree of the braking torque.

According to the hydraulic braking device known in the art, for example, as disclosed in Japanese Patent Publication No. 2010-121614 (A), a brake rotating member is rotatably accommodated in a fluid chamber of a housing, wherein a brake shaft extends in an inside of the housing and outwardly extends from the housing. A gap between the brake shaft and the housing is sealed by a sealing device. More in detail, a permanent magnet and a magnetic-flux guiding member of the sealing device are provided so as to surround the brake shaft, so that magnetic flux of the permanent magnet is guided from the magnetic-flux guiding member to the brake shaft via a sealing gap, which is formed between the magnetic-flux guiding member and the brake shaft and communicated to the fluid chamber. Then, magnetic viscous fluid, which flows from the fluid chamber into the sealing gap, receives the magnetic flux and thereby viscosity of the magnetic viscous fluid is increased. The magnetic viscous fluid is trapped in a film-like condition. More exactly, magnetic particles contained in the magnetic viscous fluid are trapped by the magnetic flux to form sealing films in the sealing gap.

The sealing films formed in the sealing gap restrict flow of the magnetic viscous fluid in an axial direction of the brake shaft from a housing-inner side to a housing-outer side. Namely, a so-called self-sealing function is brought out by the magnetic viscous fluid itself in the sealing gap. Leakage of the magnetic viscous fluid from the fluid chamber can be suppressed and thereby change of braking characteristic due to the leakage of the magnetic viscous fluid can be suppressed.

In addition, when the leakage of the magnetic viscous fluid is suppressed by the sealing films, frictional resistance to be applied to the brake shaft can be reduced. Durability of the hydraulic braking device is thereby increased.

According to the above hydraulic braking device (JP No. 2010-121614), however, the braking characteristic may be changed due to the following factors. In the magnetic viscous fluid, the magnetic particles are dispersed in base fluid made of non-magnetic liquid. The non-magnetic base fluid does not receive action of the magnetic flux in the sealing gap but receives fluid pressure which is increased in the fluid chamber in accordance with increase of temperature. The base fluid is likely to flow in a direction to the housing-outer side. The leakage of the base fluid may not only cause change of property for the magnetic viscous fluid but also facilitate such change of property for the magnetic viscous fluid, because the leakage of the magnetic viscous fluid catches up the magnetic particles contained in the magnetic viscous fluid. The change of property for the magnetic viscous fluid decreases the self-sealing function in the sealing gap, which may indirectly or directly cause change of the braking characteristic, because the decrease of the self-sealing function in the sealing gap may influence the change of property for the magnetic viscous fluid in the fluid chamber.

A well-known mechanical sealing structure may be further used, in addition to the structure for the self-sealing function, so as to restrict the flow of the magnetic particles in the sealing gap from the housing-inner side to the housing-outer side. A magnetic fluid may be used as functional fluid in place of the magnetic viscous fluid, in which the magnetic particles are dispersed in the base fluid. However, in each case, it is necessary to form the sealing gap in order to improve durability. It is, therefore, still a problem that the base fluid may flow out through the sealing gap and thereby the property of the magnetic viscous fluid (or other functional fluid) may be changed. In other words, the braking characteristic of the hydraulic braking device may be changed.

Furthermore, according to the above hydraulic braking device (JP No. 2010-121614), it may have the following problem. When the magnetic particles contained in the magnetic viscous fluid are collected at such an area close to an inner peripheral portion of the magnetic-flux guiding member, the magnetic particles trapped by the magnetic flux in the sealing gap may be pushed out by such collected magnetic particles. Then, the magnetic particles may leak from the sealing gap to the housing-outer side.

More in detail, in the hydraulic braking device of the above prior art (JP No. 2010-121614), the magnetic-flux guiding member is partly covered by the magnetic shielding member. In other words, an axial end surface of the inner peripheral portion of the magnetic-flux guiding member is exposed to the fluid chamber via the communication gap. The magnetic flux may be leaked from such exposed portion of the magnetic-flux guiding member and thereby the magnetic particles contained in the magnetic viscous fluid may be collected at such a portion close to the sealing gap. The collected magnetic particles are magnetically attracted by the magnetic flux into the sealing gap. Then, the magnetic particles having been trapped by the magnetic flux in the sealing gap (for the purpose of forming the sealing films) may be pushed out from the sealing gap by such additionally attracted magnetic particles. Such leakage of the magnetic particles may decrease the self-sealing function, to thereby cause the variation of the braking characteristic for the hydraulic braking device.

According to another hydraulic braking device known in the art, for example, as disclosed in Japanese Patent Publication No. 2011-256838 (A), a gap between a brake shaft of a brake rotating member (which extends in an inside of a housing and outwardly extends from the housing) and the housing is sealed by a sealing structure. More exactly, a sealing gap, which is communicated to a fluid chamber, is formed between a magnetic screw portion of a male screw shape and a magnetic-flux guiding member. The magnetic screw portion is formed by a spiral projection, which is projected from the brake shaft in a radial outward direction. The magnetic-flux guiding member surrounds an outer periphery of the brake shaft, namely the magnetic screw portion. Since magnetic flux is guided between the magnetic-flux guiding member and the magnetic screw portion via the sealing gap, the magnetic viscous fluid is withdrawn from the fluid chamber into the sealing gap and viscosity of the magnetic viscous fluid is increased to thereby form sealing films. A self-sealing function is brought out, according to which leakage of the magnetic viscous fluid from the sealing gap to a housing-outer side is suppressed by such sealing films, namely by the magnetic viscous fluid itself.

According to the sealing structure of the above prior art (JP No. 2011-256838), the magnetic screw portion is so formed that the spiral projection comes away in the axial direction of the brake shaft from a housing-inner side of the brake shaft to a housing-outer side when tracing the spiral projection in a shaft rotating direction. Moment in a direction to the housing-inner side is given to the magnetic viscous fluid. The above moment is generated by visco-seal function (that is, a labyrinth-sealing effect of a screw-rotation type) based on hydro-dynamic effect for pumping up the magnetic viscous fluid by repeating compression and expansion and based on viscous effect by increase of viscosity of the magnetic viscous fluid. According to the visco-seal function, even when non-magnetic liquid of the magnetic viscous fluid is separated from magnetic particles, which are contained in the magnetic viscous fluid and trapped by the magnetic flux in the sealing gap, and has flown out from the sealing gap in the housing-outer side, such non-magnetic liquid is pushed back in the housing-inner side to the sealing gap.

As above, according to the sealing structure of the prior art (JP No. 2011-256838), the self-sealing function as well as the visco-seal function are brought out, so that variation of braking characteristic of the hydraulic braking device caused by possible leakage of the magnetic viscous fluid can be suppressed.

According to the sealing structure of the above prior art (JP No. 2011-256838), the non-magnetic liquid of the magnetic viscous fluid can be pushed back in the housing-inner direction by the visco-seal function when the brake rotating member is rotating. However, when the brake rotating member is not rotated, hydro-dynamic effect of the visco-seal function cannot be brought out. When the non-magnetic liquid is separated from the magnetic viscous fluid during non-operation (no-rotation) of the brake rotating member, the non-magnetic liquid may leak out of the sealing gap. Then, variation of braking characteristic may occur in the hydraulic braking device.

SUMMARY OF THE DISCLOSURE

The present disclosure is made in view of the above points. It is an object of the present disclosure to provide a hydraulic braking device and a valve timing adjusting apparatus having the same, according to which durability of the hydraulic braking device is improved and change of the braking characteristic can be suppressed.

According to a feature of the present disclosure (for example, as defined in Claim 1), a hydraulic braking device comprises:

a housing having a fluid chamber;

magnetic viscous fluid filled in the fluid chamber and made of non-magnetic base fluid into which magnetic particles are dispersed, so that viscosity of the magnetic viscous fluid is changed depending on density of magnetic flux passing through the magnetic viscous fluid;

a viscosity controlling unit for controlling the density of the magnetic flux passing through the magnetic viscous fluid in order to change the viscosity of the magnetic viscous fluid;

a brake rotating member having a brake shaft passing through an inside of the housing in its axial direction and outwardly extending from the housing, the brake rotating member being in contact with the magnetic viscous fluid in the fluid chamber so that braking torque depending on the viscosity of the magnetic viscous fluid is applied to the brake rotating member; and a sealing structure for fluid-tightly sealing a gap between the housing and the brake rotating member.

The sealing structure comprises;

a permanent magnet for generating magnetic flux;

a magnetic-flux guiding member provided in the housing and surrounding the brake shaft, so that a sealing gap communicated to the fluid chamber is formed between the magnetic-flux guiding member and the brake shaft, the magnetic-flux guiding member guiding the magnetic flux generated at the permanent magnet to the brake shaft;

a fluid sealing member provided in the housing at a housing-outer side more remote from the magnetic-flux guiding member in the axial direction and being in contact with the brake shaft so as to fluid-tightly seal a gap between the housing and the brake shaft;

an intermediate fluid chamber formed in the housing between the sealing gap and the fluid sealing member; and an intermediate fluid made of non-magnetic liquid and filled in the intermediate fluid chamber.

According to the above feature, the magnetic viscous fluid flows from the fluid chamber into the sealing gap formed between the magnetic-flux guiding member and the brake shaft. The magnetic viscous fluid receives action of the magnetic flux, which is generated at the permanent magnet and guided from the magnetic-flux guiding member to the brake shaft via the sealing gap. The magnetic particles contained in the magnetic viscous fluid are kept to remain in the sealing gap by the action of the magnetic flux, so that sealing films are formed in the sealing gap. A self-sealing function is brought out by the sealing films, according to which flow of the magnetic viscous fluid is restricted by the fluid itself in an axial direction of the brake shaft from the housing-inner side toward the housing-outer side. Frictional resistance applied to the brake shaft can be reduced to thereby increase durability of the hydraulic braking device.

According to the sealing structure of the above feature, the intermediate fluid chamber is formed between the magnetic-flux guiding member (forming the sealing gap) and the fluid sealing member and the intermediate fluid is filled in the intermediate fluid chamber. The fluid sealing member brings out the sealing function for fluid-tightly sealing a gap between the fluid sealing member and the brake shaft, so that the intermediate fluid may not flow out from the intermediate fluid chamber. Fluid pressure of the fluid chamber passes to the fluid sealing member through the base fluid of the magnetic viscous fluid in the sealing gap and the intermediate fluid in the intermediate fluid chamber. It is, therefore, possible to avoid such a situation that the base fluid of the magnetic viscous fluid catches the magnetic particles and flows together with the magnetic particles from the sealing gap into the intermediate fluid chamber. Change of property for the magnetic viscous fluid hardly occurs. In addition, since the intermediate fluid is made of the non-magnetic liquid, the intermediate fluid is not magnetically attracted into the sealing gap. Since the intermediate fluid is not mixed into the base fluid of the magnetic viscous fluid, the change of property for the magnetic viscous fluid hardly occurs. As above, a possible decrease of the self-sealing function as well as variation of brake characteristic, which could be caused by the change of property for the magnetic viscous fluid, can be avoided.

Furthermore, according to the sealing structure of the above feature, the magnetic particles can hardly reach at the fluid sealing member, even when the magnetic particles are caught up by the base fluid of the magnetic viscous fluid and have flown out from the sealing gap into the intermediate fluid chamber. This is because there exists a certain axial distance between the sealing gap and the fluid sealing member via the intermediate fluid chamber.

Accordingly, even in a case that surface pressure is reduced in a contacting boundary area between the fluid sealing member and the brake shaft, it is possible to avoid a situation that the magnetic particles may enter such contacting boundary area to increase the frictional resistance. Durability of the hydraulic braking device can be increased.

According to another feature of the present disclosure (for example, as defined in claim 8), a hydraulic braking device comprises:

a housing having a fluid chamber;

functional fluid filled in the fluid chamber and made of base fluid into which magnetic particles are dispersed, so that viscosity of the functional fluid is changed depending on density of magnetic flux passing through the functional fluid;

a viscosity controlling unit for controlling the density of the magnetic flux passing through the functional fluid in order to change the viscosity of the functional fluid;

a brake rotating member having a brake shaft passing through an inside of the housing in its axial direction and outwardly extending from the housing, the brake rotating member being in contact with the functional fluid in the fluid chamber so that braking torque depending on the viscosity of the functional fluid is applied to the brake rotating member; and a sealing structure for fluid-tightly sealing a gap between the housing and the brake rotating member.

The sealing structure comprises;

a particle sealing unit for forming a sealing gap, which is communicated to the fluid chamber, between the particle sealing unit and the brake shaft, wherein the particle sealing unit seals the sealing gap so as to restrict movement of the magnetic particles in an axial direction from a housing-inner side to a housing-outer side;

a fluid sealing member provided in the housing at the housing-outer side more remote from the particle sealing unit in the axial direction and being in contact with the brake shaft so as to fluid-tightly seal a gap between the housing and the brake shaft;

an intermediate fluid chamber formed in the housing between the sealing gap and the fluid sealing member in the axial direction; and an intermediate fluid made of liquid and filled in the intermediate fluid chamber.

According to the sealing structure of the above feature (for claim 8), the movement of the magnetic particles (which have entered the sealing gap from the fluid chamber) in the axial direction from the housing-inner side to the housing-outer side is restricted by sealing function of the particle sealing unit. According to such sealing structure, it is possible not only to form the sealing gap having an appropriate gap width between the particle sealing unit and the brake shaft but also to seal the magnetic particles (that is, to restrict movement of the magnetic particles). Frictional resistance to be applied to the brake shaft is thereby reduced so as to increase durability of the hydraulic braking device.

In addition, the fluid sealing member, which is provided in the housing at the housing-outer side of the intermediate fluid chamber, is fluid-tightly in contact with the brake shaft to bring out the sealing function to the intermediate fluid filled in the intermediate fluid chamber. Therefore, the intermediate fluid can be always fully filled in the intermediate fluid chamber. Fluid pressure in the fluid chamber is propagated via the base fluid of the functional fluid in the sealing gap and the intermediate fluid in the intermediate fluid chamber, so that the fluid pressure is received by the fluid sealing member. According to the above structure, it is possible to avoid a situation that the magnetic particles are caught up by the base fluid and that such base fluid flows out from the sealing gap to the intermediate fluid chamber. Change of property of the functional fluid, which could be caused by the leakage of the magnetic particles from the sealing gap, can be suppressed. As a result, variation of the braking characteristic, which may be caused by the change of property of the functional fluid, can be avoided.

Furthermore, according to the sealing structure of the above feature (for example, as defined in claim 8), the magnetic particles can hardly reach at the fluid sealing member, even when the magnetic particles are caught up by the base fluid of the functional fluid and have flown out from the sealing gap into the intermediate fluid chamber. This is because there exists a certain axial distance between the sealing gap and the fluid sealing member via the intermediate fluid chamber.

Accordingly, even in a case that surface pressure is reduced in a contacting boundary area between the fluid sealing member and the brake shaft, it is possible to avoid a situation that the magnetic particles may enter such contacting boundary area to increase the frictional resistance. Durability of the hydraulic braking device can be increased.

According to a further feature of the present disclosure (for example, as defined in Claim 21), a hydraulic braking device comprises;

a housing having a fluid chamber;

magnetic viscous fluid filled in the fluid chamber and made of non-magnetic base fluid into which magnetic particles are dispersed, so that viscosity of the magnetic viscous fluid is changed depending on density of magnetic flux passing through the magnetic viscous fluid;

a viscosity controlling unit for controlling the density of the magnetic flux passing through the magnetic viscous fluid in order to change the viscosity of the magnetic viscous fluid;

a brake rotating member having a brake shaft passing through an inside of the housing in its axial direction and outwardly extending from the housing, the brake rotating member being in contact with the magnetic viscous fluid in the fluid chamber so that braking torque depending on the viscosity of the magnetic viscous fluid is applied to the brake rotating member; and a magnetic sealing sleeve unit provided in the housing so as to surround an outer periphery of the brake shaft.

The magnetic sealing sleeve unit comprising;

a magnetic-flux generating member for generating magnetic flux to be guided to the brake shaft, a magnetic-flux guiding member provided at, at least, one of axial ends of a housing-inner side and a housing-outer side of the magnetic-flux generating member, the magnetic-flux guiding member having an inner peripheral portion for forming a sealing gap between the inner peripheral portion and the brake shaft, so that the magnetic flux of the magnetic-flux generating member is guided from the magnetic-flux guiding member to the brake shaft via the sealing gap, or vice versa; and a magnetic shielding member of a sleeve-unit having an axial end surface, which is in contact with an axial end surface of the inner peripheral portion on a housing-inner side of the magnetic-flux guiding member, for restricting passing of the magnetic flux of the magnetic-flux generating member in the axial direction to the housing-inner side of the magnetic-flux guiding member, wherein the magnetic shielding member forms a communication gap between the magnetic shielding member and the brake shaft so that the fluid chamber is communicated to the sealing gap via the communication gap, and wherein a gap width of the communication gap is made to be equal to or smaller than a gap width of the sealing gap.

According to the above feature (claim 21), the sealing gap formed between the magnetic-flux guiding member and the brake shaft is communicated to the fluid chamber via the communication gap, so that the sealing gap is filled with the magnetic viscous fluid, which is filled in the fluid chamber. The magnetic particles contained in the magnetic viscous fluid are trapped by the action of the magnetic flux, which is guided from the magnetic-flux guiding member to the brake shaft via the sealing gap, so that sealing films are formed in the sealing gap. The sealing films bring out self-sealing function for restricting by itself movement of the magnetic viscous fluid in an axial direction of the brake shaft from the housing-inner side to the housing-outer side.

According to the magnetic sealing sleeve unit of the above feature, since the inner peripheral portion of the magnetic-flux guiding member is covered by the magnetic shielding member from the housing-inner side, the passing of the magnetic flux in the axial direction is restricted from the inner peripheral portion to the housing-inner side. Since a possible leakage of the magnetic flux is reduced from the inner peripheral portion (which forms the sealing gap) to the communication gap formed between the magnetic shielding member and the brake shaft, it is possible to avoid a situation that the magnetic particles contained in the magnetic viscous fluid are collected from the communication gap to such an area neighboring to the sealing gap.

In addition, since the gap width of the communication gap is made to be equal to or smaller than the gap width of the sealing gap, pressure loss in the communication gap during movement of the magnetic particles becomes larger than that in the sealing gap. It is, therefore, possible to suppress such a situation that the magnetic particles may reach at the inner peripheral portion of the magnetic-flux guiding portion from the fluid chamber via the communication gap.

As a result, a total force for magnetically attracting the magnetic particles to the sealing gap from the housing-inner side becomes smaller than frictional force applied to the magnetic particles in the sealing gap (more exactly, frictional force generated between the magnetic-flux guiding member and the magnetic particles and/or among the magnetic particles themselves). Accordingly, the magnetic particles are not pulled into the sealing gap, and a possible leakage of the magnetic particles (which may be caused by pull-in of the magnetic particles) to the housing-outer side can be suppressed. The self-sealing function by the sealing films, which are formed by trapping the magnetic particles, can be maintained. Namely, the variation of the brake characteristic can be avoided.

According to a still further feature of the present disclosure (for example, as defined in claim 35), a hydraulic braking device comprises:

a housing having a fluid chamber;

magnetic viscous fluid filled in the fluid chamber and made of non-magnetic fluid into which magnetic particles are dispersed, so that viscosity of the magnetic viscous fluid is changed depending on density of magnetic flux passing through the magnetic viscous fluid;

a viscosity controlling unit for controlling the density of the magnetic flux passing through the magnetic viscous fluid in order to change the viscosity of the magnetic viscous fluid;

a brake rotating member rotatably accommodated in the fluid chamber, the braking rotating member being in contact with the magnetic viscous fluid in the fluid chamber so that braking torque depending on the viscosity of the magnetic viscous fluid is applied to the brake rotating member, the brake rotating member having a brake shaft outwardly extending from the housing; and a magnetic sealing structure for fluid-tightly sealing a gap between the housing and the brake rotating member.

The magnetic sealing structure comprises;

a magnetic-flux generating member provided in the housing for generating magnetic flux;

a magnetic screw portion formed in the brake shaft formed in a male screw shape having a spiral projection, which is projected in a radial outward direction and spirally comes away from a housing-inner side of the brake shaft toward a housing-outer side of the brake shaft when tracing the spiral projection in a shaft rotating direction;

a magnetic-flux guiding portion provided in the housing so as to surround an outer periphery of the brake shaft to thereby form a sealing gap portion in a radial direction between the magnetic screw portion and the magnetic-flux guiding portion, the sealing gap portion being communicated to the fluid chamber, and the magnetic-flux guiding portion guiding the magnetic flux generated by the magnetic-flux generating member to the magnetic screw portion via the sealing gap portion;

a fluid sealing member provided in the housing so as to be in contact with the outer periphery of the brake shaft for fluid-tightly sealing a gap between the brake shaft and the housing; and a magnetic-flux restricting portion provided in the housing between the magnetic-flux guiding portion and the fluid sealing member in the axial direction so as to surround the outer periphery of the magnetic screw portion, the magnetic-flux restricting portion forming a fluid pooling gap portion in the radial direction between the magnetic screw portion and the magnetic-flux restricting portion, the fluid pooling gap portion being communicated to the sealing gap portion, wherein a radial distance of the fluid pooling gap portion is set to be such a value that Reynolds number of the non-magnetic fluid passing through the fluid pooling gap portion becomes smaller than a critical Reynolds number.

BRIEF DESCRIPTION OF THE DRAWINGS

The above and other objects, features and advantages of the present disclosure will become more apparent from the following detailed description made with reference to the accompanying drawings. In the drawings:

FIG. 7 is a table showing components of a base fluid for a magnetic viscous fluid and an intermediate fluid according to the first to third embodiments of the present disclosure;

DETAILED DESCRIPTION OF THE EMBODIMENTS

Figure 1:
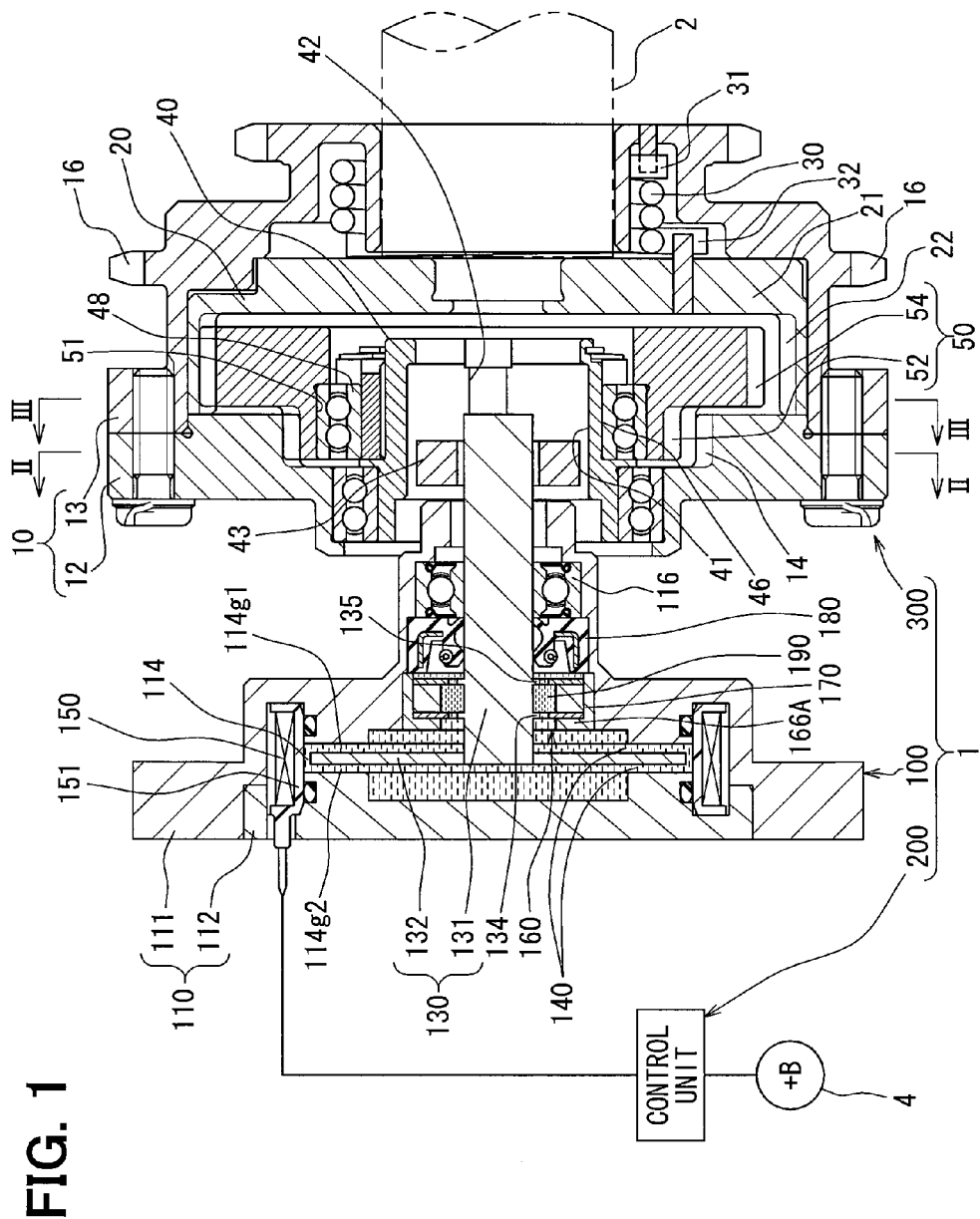
FIG. 1 is a schematic cross sectional view taken along a line I-I in FIG. 2, showing a valve timing adjusting apparatus having a hydraulic braking device according to a first embodiment of the present disclosure.

The present disclosure will be explained by way of multiple embodiments with reference to the drawings. The same reference numerals are used throughout the embodiments for the purpose of designating the same or similar parts and/or components.

(First Embodiment)

FIG. 1 shows a valve timing adjusting apparatus 1 having a hydraulic braking device 100 according to a first embodiment of the present disclosure. The valve timing adjusting apparatus 1, which is mounted in a vehicle, is provided in a torque transmitting system for transmitting an engine torque from a crankshaft (not shown) of an internal combustion engine to a cam shaft 2. The cam shaft 2 drives an intake valve (not shown) of the engine by use of the engine torque so as to open and close the intake valve. In the present embodiment, the valve timing adjusting apparatus 1 adjusts a valve timing (a valve opening and/or a valve closing timing) of the intake valve (one of operating valves of the engine).

Figure 2:
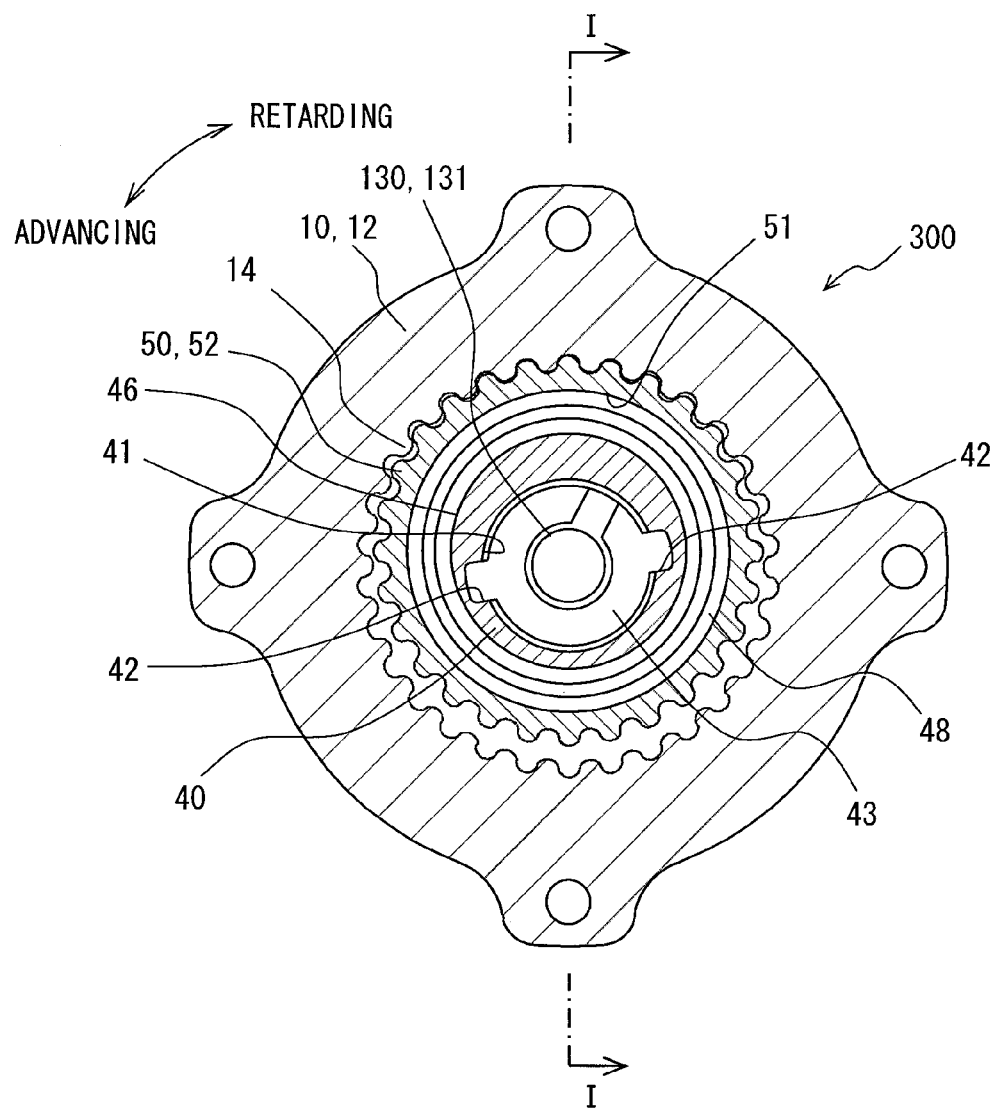
FIG. 2 is a schematic cross sectional view taken along a line II-II in FIG. 1.
Figure 3:
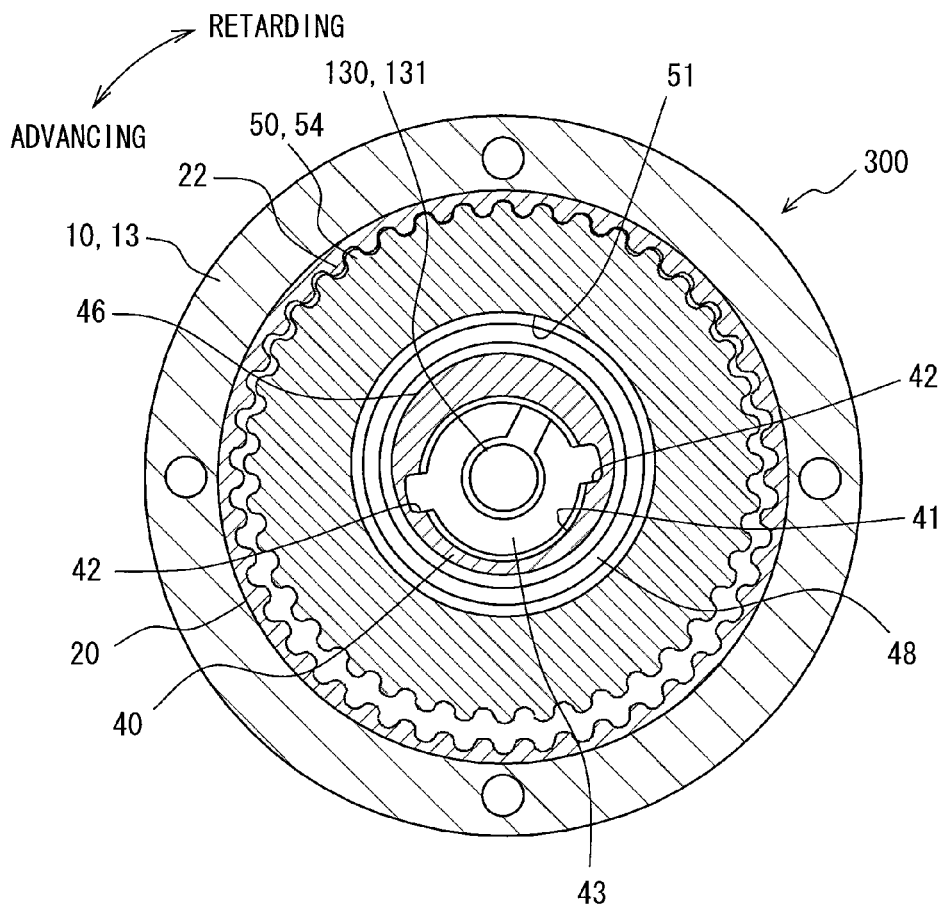
FIG. 3 is a schematic cross sectional view taken along a line in FIG. 1.

As shown in FIGS. 1 to 3, the valve timing adjusting apparatus 1 is composed of the hydraulic braking device 100, a power-supply control unit 200 and a phase adjusting mechanism 300 (also referred to as a phase adjusting device), so as to realize a desired valve timing by adjusting a relative phase (an engine operational phase) of the cam shaft 2 with respect to the crankshaft of the engine.

(Hydraulic Braking Device)

The hydraulic braking device 100 shown in FIG. 1, which is electrically operated, is composed of a housing 110, a brake rotating member 130, magnetic viscous fluid 140, an electromagnetic solenoid coil 150, a sealing structure (a sealing unit) 160 and so on.

The housing 110, which is formed in a hollow cylindrical shape, has a fixed member 111 and a cover member 112. The fixed member 111, which is made of magnetic material and formed in a cylindrical shape having a stepped portion, is fixed to a fixing portion (not shown) of the engine, such as, a chain casing. The cover member 112, which is made of magnetic material and formed in a circular dish shape, is firmly attached to the fixed member 111 on a side thereof axially opposite to the phase adjusting device 300. The cover member 112, which is fluid-tightly and coaxially inserted into and firmly fixed to the fixed member 111, forms a fluid chamber 114 in an inside of the housing 110 between the fixed member 111 and the cover member 112.

The brake rotating member 130 is composed of a brake shaft 131 and a brake rotor 132. The brake shaft 131, which is made of magnetic material and formed in a column shape, is coaxially arranged with the fixed member 111 and the cover member 112 of the housing 110. The brake shaft 131 passes through the fixed member 111 of the housing 110 and outwardly extends in an axial direction toward the phase adjusting device 300, so that the brake shaft 131 is connected to the phase adjusting device 300, which is located at an outside of the housing 110. An intermediate portion of the brake shaft 131 in the axial direction thereof is rotatably supported by a bearing 116 provided in the fixed member 111 of the housing 110. According to the above structure, engine torque is transmitted from the crankshaft of the engine via the phase adjusting device 300 during an operation of the engine, and thereby the brake rotating member 130 is rotated in a predetermined direction (a rotor rotating direction), that is, an anti-clockwise direction in FIGS. 2 and 3.

As shown in FIG. 1, the brake rotor 132, which is made of magnetic material and formed in a disc shape, extends in a radial direction from an axial end of the brake shaft 131 opposite to the phase adjusting device 300 and is accommodated in the fluid chamber 114 formed in the housing 110. According to such a structure, the brake rotor 132 forms first and second magnetic gaps 114$g$1 and 114$g$2, respectively between the brake rotor 132 and the fixed member 111 of the housing 110 and between the brake rotor 132 and the cover member 112 of the housing 110.

Figure 4:
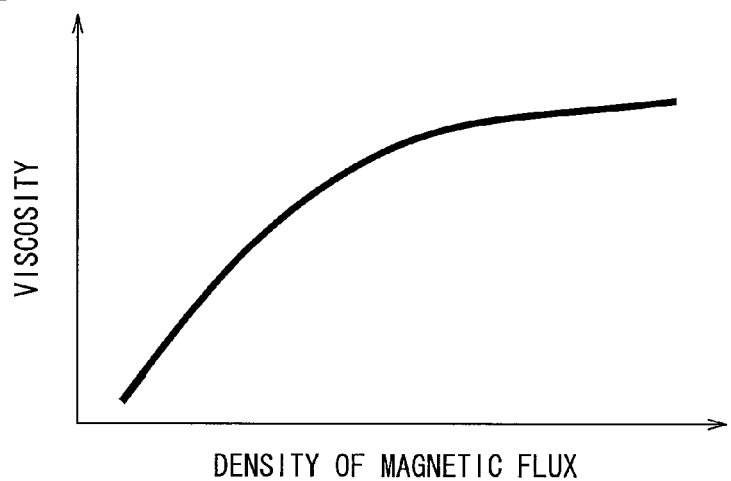
FIG. 4 is a characteristic curve for explaining characteristic of magnetic viscous fluid.

The magnetic viscous fluid 140 is filled in the fluid chamber 114, including the magnetic gaps 114$g$1 and 114$g$2. The magnetic viscous fluid 140, which is a kind of functional fluid, is made of non-magnetic base fluid into which magnetic particles of powder form (for example, magnetic particles of carbonyl iron) are mixed and dispersed in a condition of suspending solution. The magnetic viscous fluid 140 has characteristic, according to which viscosity of its presence is increased depending on an increase of density of magnetic flux passing through the magnetic viscous fluid, as shown in FIG. 4, and yield stress is increased in proportion to the viscosity.

As shown in FIG. 1, the electromagnetic solenoid coil 150, which has a winding of a metal wire wound on a resin-made bobbin 151, is coaxially arranged at an outer peripheral side of the brake rotor 132. The solenoid coil 150 is supported in the housing 110 between the fixed member 111 and the cover member 112. When electric power is supplied to the solenoid coil 150, magnetic flux is generated at the solenoid coil 150 and passes through the fixed member 111, the first magnetic gap 114$g$1, the brake rotor 132, the second magnetic gap 114$g$2 and the cover member 112.

When the electric power is supplied to the solenoid coil 150 so as to generate the magnetic flux during the operation of the engine, in which the brake rotating member 130 is rotated in the anti-clockwise direction, the generated magnetic flux passes through the magnetic viscous fluid 140 in the magnetic gaps 114$g$1 and 114$g$2 of the fluid chamber 114.

As a result, braking torque for braking the rotation of the brake rotating member (the brake rotor 132) by function of viscous resistance is generated in the direction (in the clockwise direction in FIGS. 2 and 3) opposite to the rotating direction of the brake rotating member 130. Namely, the braking torque is generated between the related elements (the housing 110 and the brake rotating member 130), which are in contact with the magnetic viscous fluid 140 viscosity of which is changed. As above, the braking torque depending on the viscosity of the magnetic viscous fluid 140 can be applied to the brake rotating member 130, when the electric power is supplied to the solenoid coil 150 so that the magnetic flux passes through the magnetic viscous fluid 140 in the fluid chamber 114.

Figure 5:
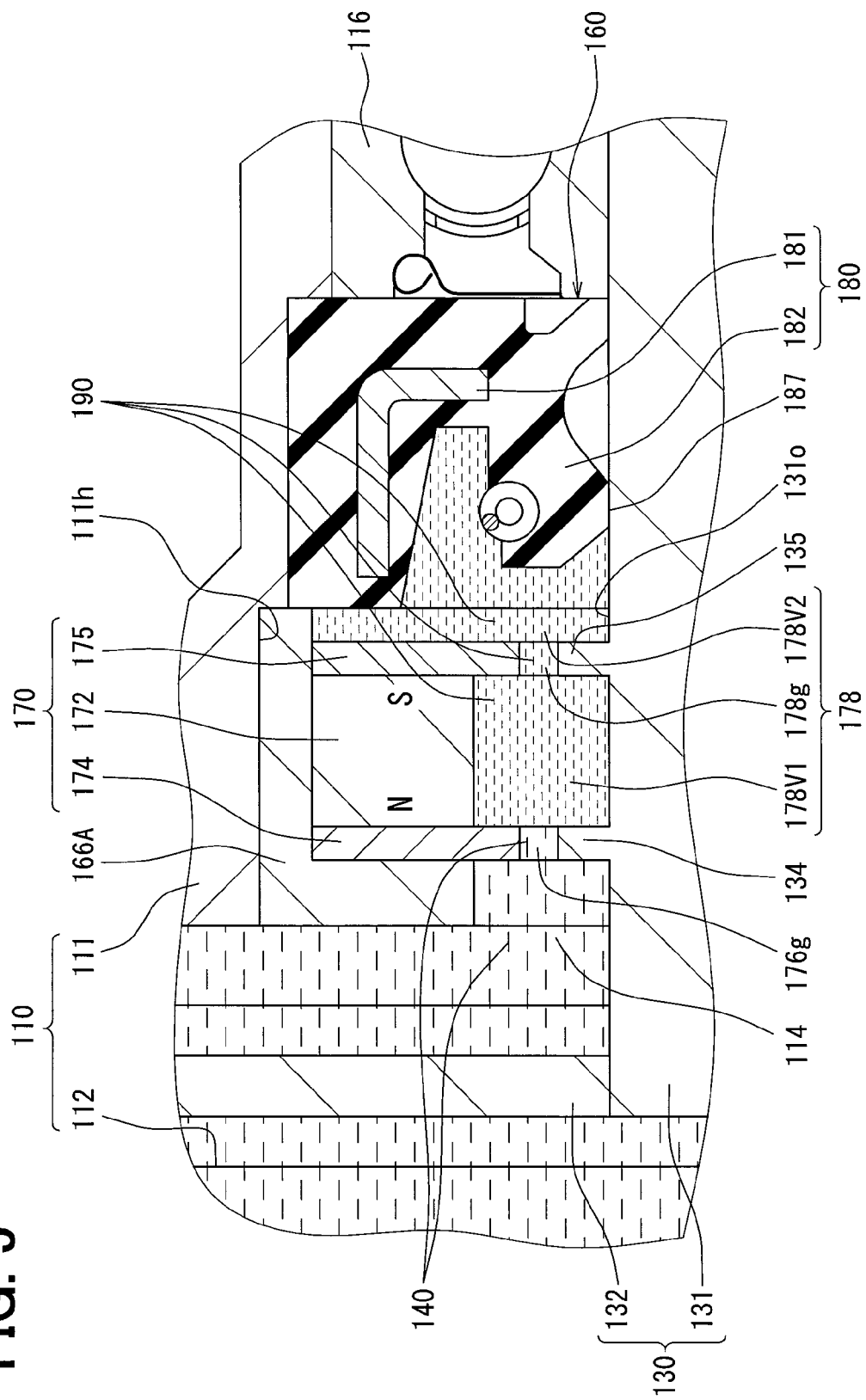
FIG. 5 is a schematically enlarged cross sectional view showing a sealing structure of the hydraulic braking device of FIG. 1.

As shown in FIGS. 1 and 5, the sealing structure 160 is provided in the housing 110 between the fluid chamber 114 and the bearing 116 in the axial direction. The sealing structure 160 seals a sealing gap 176g between the fixed member 111 of the housing 110 and the brake shaft 131 of the brake rotating member 130, so as to prevent the magnetic viscous fluid 140 from leaking to an outside of the housing 110.

(Power-Supply Control Unit)

As shown in FIG. 1, the power-supply control unit 200 is composed of a micro-computer and arranged at an outside of the hydraulic braking device 100. The power-supply control unit 200 is electrically connected to a battery 4 of the vehicle and to the solenoid coil 150 of the hydraulic braking device 100 to control power supply to the solenoid coil 150 during the operation of the engine, so that the viscosity of the magnetic viscous fluid 140 is changed. As a result of controlling the viscosity of the magnetic viscous fluid 140, the braking torque to be applied to the brake rotating member 130 (i.e. the brake rotor 132) is changed (increased or decreased) depending on the power supply to the solenoid coil 150. The power-supply control unit 200 and the solenoid coil 150 collectively constitute a viscosity controlling unit.

(Phase Adjusting Mechanism)

As shown in FIGS. 1 to 3, the phase adjusting mechanism 300 (the phase adjusting device 300) is composed of a driving-side rotating member 10, a driven-side rotating member 20, an assisting member 30, a planetary carrier 40, a planetary gear 50 and so on.

As shown in FIGS. 1 to 3, the driving-side rotating member 10 is formed in a hollow cylindrical shape as a whole. The driving-side rotating member 10 is composed of a gear member 12 and a sprocket member 13, which are fixed to each other by bolts. The gear member 12 is made of metal and formed in a disc plate shape. A driving-side internal gear 14 is formed at an inner peripheral wall of the gear member 12, wherein a diameter of a tip circle is smaller than that of a root circle. The sprocket member 13 is made of metal and formed in the cylindrical shape. Multiple sprocket teeth 16, each of which extends in a radial outward direction as shown in FIG. 1, are formed at an outer peripheral wall of the sprocket member 13.

A timing chain (not shown) is connected between the sprocket teeth 16 and teeth of the crankshaft (not shown), so that the sprocket member 13 is operatively connected to the crankshaft. The engine torque is transmitted from the crankshaft to the sprocket member 13 during the operation of the engine. The driving-side rotating member 10 is rotated in conjunction with the crankshaft of the engine in the predetermined direction (in the anti-clockwise direction in FIGS. 2 and 3).

As shown in FIG. 1, the driven-side rotating member 20, which is made of metal and formed in a cylindrical shape having a closed bottom end, is coaxially arranged in an inside of the sprocket member 13. The driven-side rotating member 20 has a coupling portion 21 at its bottom end, which is coaxially coupled to the cam shaft 2. According to such a structure, the driven-side rotating member 20 is rotated in conjunction with the cam shaft 2 in the predetermined direction (in the anti-clockwise direction) and the driven-side rotating member 20 is rotatable relative to the driving-side rotating member 10.

As shown in FIGS. 1 and 3, a driven-side internal gear 22 is formed at an inner peripheral wall of the driven-side rotating member 20, wherein a diameter of a tip circle is smaller than that of a root circle. An inner diameter of the driven-side internal gear 22 is made to be larger than an inner diameter of the driving-side internal gear 14. A number of teeth of the driven-side internal gear 22 is made to be larger than that of the driving-side internal gear 14.

As shown in FIG. 1, the assisting member 30, which is composed of a helical torsion spring made of metal, is coaxially arranged in the inside of the sprocket member 13. Each end 31, 32 of the assisting member 30 is respectively connected to (engaged with) the sprocket member 13 and the coupling portion 21. The assisting member 30 is deformed in a torsional condition between both ends 31 and 32 to thereby bias the driven-side rotating member 20 in a retarding direction with respect to the driving-side rotating member 10.

As shown in FIGS. 1 to 3, the planetary carrier 40, which is made of metal and formed in a cylindrical shape, has a torque-transmitted portion 41 at an inner peripheral wall thereof, to which braking torque from the brake rotating member 130 of the hydraulic braking device 100 is transmitted. The inner peripheral wall of the planetary carrier 40 is coaxially arranged with the driving-side rotating member 10, the driven-side rotating member 20 and the brake shaft 131 of the brake rotating member 130. A pair of grooves 42 is formed in the planetary carrier 40 at its inner peripheral wall, so that each of the groves 42 is opened in a radial inward direction. The torque-transmitted portion 41 is coupled to the brake shaft 131 via a coupling member 43, each of projections of which is inserted into the respective grooves 42. According to such a structure, the planetary carrier 40 is rotated together with the brake rotating member 130 in the predetermined direction (in the anti-clockwise direction in FIGS. 2 and 3) and rotatable relative to the driving-side rotating member 10.

As shown in FIGS. 1 to 3, the planetary carrier 40 has a bearing supporting portion 46 at an outer peripheral wall thereof for rotatably supporting the planetary gear 50. The bearing supporting portion 46 having a cylindrical surface, which is eccentric to the driving-side and driven-side rotating members 10 and 20 as well as the brake shaft 131 of the brake rotating member 130, is coaxially fitted into a center hole 51 of the planetary gear 50 via a planetary bearing 48. The planetary gear 50 is rotatably supported by the bearing support portion 46 so as to perform a sun-and-planet motion. In the sun-and-planet motion, the planetary gear 50 is rotated around a center axis of the bearing supporting portion 46, the cylindrical surface of which is eccentrically arranged to the brake shaft 131, while the planetary gear 50 runs around the planetary carrier 40 in the rotating direction thereof. Accordingly, when the planetary carrier 40 is rotated relative to the driving-side rotating member 10 in the direction of orbital motion of the planetary gear 50, the planetary gear performs its sun-and-planet motion.

The planetary gear 50 is made of metal and formed in a cylindrical shape having a stepped portion. An external gear 52 of a driving-side as well as an external gear 54 of a driven-side is formed at respective outer peripheral walls of the planetary gear 50. An outer diameter of the driven-side external gear 54 is made larger than that of the driving-side external gear 52. Each number of teeth for the driving-side and driven-side external gears 52 and 54 is respectively made to be smaller than that for the driving-side and the driven-side internal gears 14 and 22 by the same number of teeth. The driving-side external gear 52 is arranged in a radial inside space of the driving-side internal gear 14 and engaged therewith. The driven-side external gear 54 is arranged in a radial inside space of the driven-side internal gear 22 and engaged therewith.

The phase adjusting mechanism (device) 300 adjusts the engine operational phase depending on the braking torque applied to the brake rotating member 130 and assisting torque applied to the brake rotating member 130 in a direction opposite to a direction of the braking torque.

More in detail, when the braking torque applied to the brake rotating member 130 is maintained and thereby the brake rotating member 130 is rotated at the same rotational speed to the driving-side rotating member 10, the planetary carrier 40 is not rotated relative to the driving-side rotating member 10. As a result, the planetary gear 50 does not perform the sun-and-planet motion and the driving-side and the driven-side rotating members 10 and 20 are rotated together with each other, so that the engine operational phase is maintained (not changed).

When the braking torque applied to the brake rotating member 130 is increased and thereby the brake rotating member 130 is rotated against the assisting torque at rotational speed lower than that of the driving-side rotating member 10, the planetary carrier 40 is rotated relative to the driving-side rotating member 10 in a retarding direction. Then, the planetary gear 50 performs the sun-and-planet motion and the driven-side rotating member 20 is rotated relative to the driving-side rotating member 10 in an advancing direction. Namely, the engine operational phase is advanced.

On the other hand, when the braking torque applied to the brake rotating member 130 is decreased and the brake rotating member 130 is rotated upon receiving the assisting torque at rotational speed higher than that of the driving-side rotating member 10, the planetary carrier 40 is rotated relative to the driving-side rotating member 10 in the advancing direction. As a result, the planetary gear 50 performs the sun-and-planet motion and the driven-side rotating member 20 is rotated relative to the driving-side rotating member 10 in the retarding direction. Namely, the engine operational phase is retarded.

(Sealing Structure)

The sealing structure 160 will be explained in detail. The sealing structure 160 fluid-tightly separates the fluid chamber 114, in which the magnetic viscous fluid 140 is filled, from the outside of the housing 110. As shown in FIGS. 1 and 5, the sealing structure 160 is composed of a pair of annular projections 134 and 135 (first and second annular projections), a magnetic shielding member 166A, a magnetic sealing sleeve unit 170, a fluid sealing member 180 and an intermediate fluid 190.

In the following explanation, an inside of the housing 110 for forming the fluid chamber 114 is simply referred to as "a housing-inside". An outside of the housing 110, at which the phase adjusting device 300 is arranged, is referred to as "a housing-outside". A left-hand side in the drawings (for example, in FIGS. 1 and 5) is referred to as "a housing-inner side", while a right-hand side is referred to as "a housing-outer side". In addition, an axial direction for the housing 110 and the brake shaft 131 is simply referred to as "an axial direction", while a rotating direction of the brake shaft 131 is simply referred to as "a rotating direction".

As shown in FIG. 5, the pair of annular projections 134 and 135 is formed at an outer periphery 131o of the brake shaft 131 with a predetermined distance from each other in the axial direction. The annular projections 134 and 135 are located at a position of an inner peripheral side of the magnetic shielding member 166A and/or the magnetic sealing sleeve unit 170. Each of the annular projections 134 and 135 is made of magnetic material, such as, carbon steel, and formed in an annular disc shape. The first annular projection 134 is formed at a position of the housing-inner side, while the second annular projection 135 is formed at a position of the housing-outer side in the axial direction.

The magnetic shielding member 166A is made of non-magnetic material, for example, austenitec stainless steel, and formed in a cylindrical shape having an open end and a bottom end in the axial direction. The magnetic shielding member 166A is coaxially arranged at the outer periphery of the brake shaft 131 so as to surround the outer periphery thereof in the rotating direction. A fit-in hole 111h is formed at an inner peripheral side of the fixed member 111 of the housing 110. The magnetic shielding member 166A is inserted into and fixed to the fit-in hole 111h, in such a way that the open end (the right-hand end in the drawing) of the magnetic shielding member 166A is directed to the housing-outer side (that is, in a direction toward the bearing 116), while the bottom end of the magnetic shielding member 166A is directed to the housing-inner side (that is, in a direction toward the fluid chamber 114).

Figure 6:
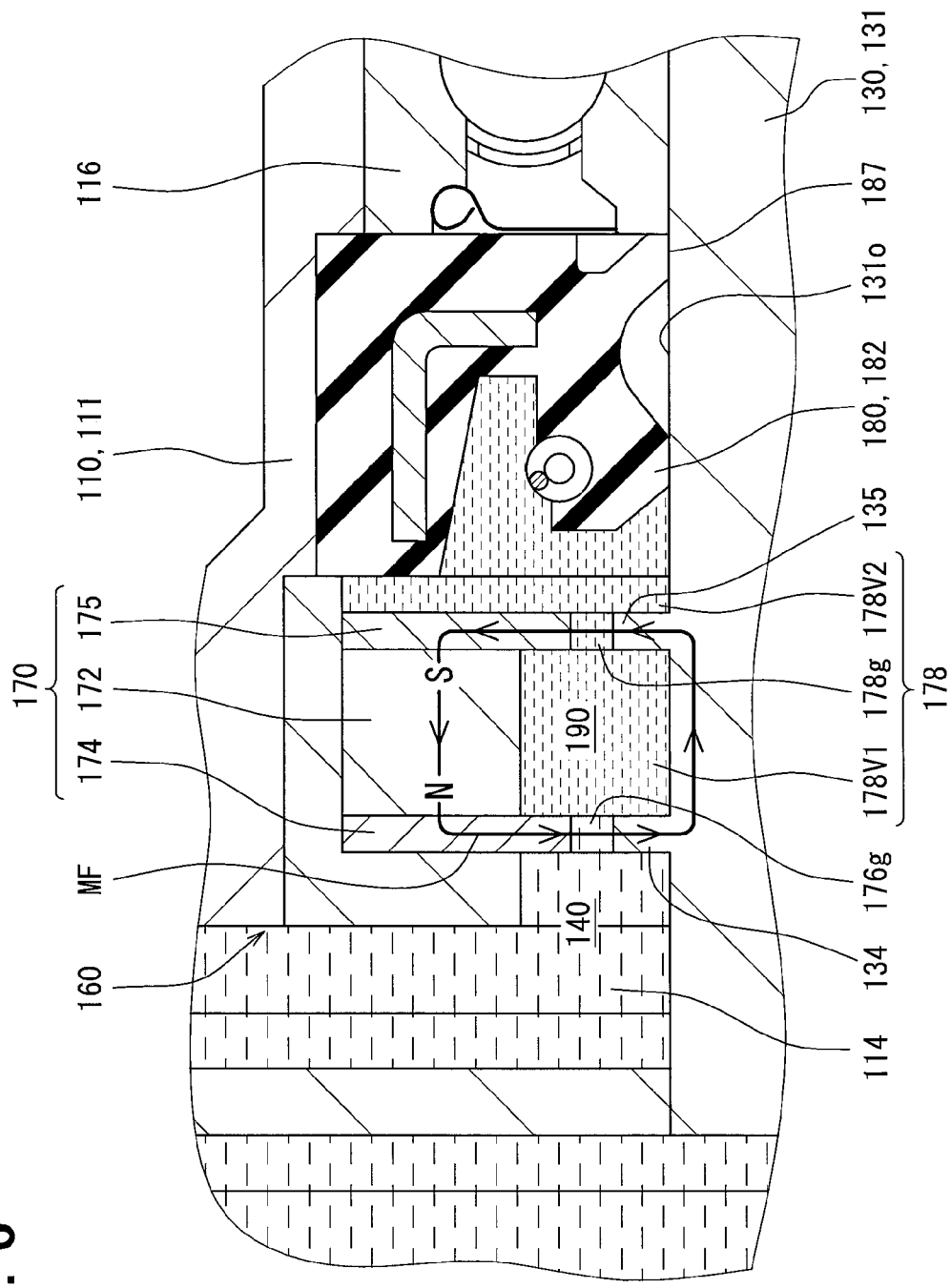
FIG. 6 is a schematically enlarged cross sectional view showing the sealing structure for explaining characteristic thereof.

The magnetic sealing sleeve unit 170 is composed of a permanent magnet 172 and a pair of (first and second) magnetic-flux guiding plates 174 and 175. The magnetic sealing sleeve unit 170 (hereinafter, simply referred to as the sleeve unit 170) works as a particle sealing unit or a particle sealing member. The sleeve unit 170 is fitted into an inner peripheral wall of the magnetic shielding member 166A. In other words, the sleeve unit 170 is fixed to the housing 110 via the magnetic shielding member 166A. The permanent magnet 172 is made of, for example, a ferrite magnet, and formed in a cylindrical shape. The permanent magnet 172 is coaxially arranged at the outer periphery of the brake shaft 131 so as to surround the outer periphery of the brake shaft 131 in the rotating direction. The permanent magnet 172 is magnetized in the axial direction, so that N-pole and S-pole are formed at axial ends thereof. As shown in FIG. 6, magnetic flux MF is constantly generated between the N-pole and the S-pole.

As shown in FIG. 5, each of the first and second magnetic-flux guiding plates 174 and 175 is made of magnetic material, for example, carbon steel, and formed in a disc shape. Each magnetic-flux guiding plate 174, 175 is coaxially arranged at the outer periphery of the brake shaft 131 so as to surround the outer periphery thereof in the rotating direction. The first and second magnetic-flux guiding plates 174 and 175 are separated from each other by a predetermined distance in the axial direction so as to interpose the permanent magnet 172 between them. Each of the magnetic-flux guiding plates 174 and 175 is projected in a radial inward direction from the permanent magnet 172.

The first magnetic-flux guiding plate 174 is projected in the radial inward direction toward the first magnetic projection 134 to form a sealing gap 176g. The sealing gap 176g is communicated to the fluid chamber 114 in the axial direction, so that the magnetic viscous fluid 140 flows from the fluid chamber 114 to the sealing gap 176g. The sealing gap 176g is filled with the magnetic viscous fluid 140.

On the other hand, the second magnetic-flux guiding plate 175, which is located at the housing-outer side (which is more remote from the first magnetic-flux guiding plate 174 in the axial direction), forms another sealing gap 178g (which is also referred to as a trapping gap 178g) between the second magnetic-flux guiding plate 175 and the second annular projection 135. The first and second magnetic-flux guiding plates 174 and 175 are also collectively or independently referred to as a magnetic-flux guiding member.

The fluid sealing member 180 is an oil seal, which is composed of a ring 181 made of metal and a sealing lip 182 made of synthetic rubber fixed to the ring 181. The fluid sealing member 180 is coaxially arranged at the outer periphery 131o of the brake shaft 131 so as to surround the brake shaft 131 in the rotating direction. The sealing lip 182 of the fluid sealing member 180 is inserted into the fit-in hole 111h of the housing 110 and arranged at such a position, which is remote from the second magnetic-flux guiding plate 175 and from the second annular projection 135 in the axial direction toward the housing-outer side with a predetermined distance. The sealing lip 182 is in sliding contact with the whole outer periphery 131o of the brake shaft 131 in the rotating direction, so as to fluid-tightly seal a gap between the brake shaft 131 and the housing 110.

A space between the fluid sealing member 180 and the sealing gap 176g in the axial direction forms an intermediate fluid chamber 178.

A first sub-chamber 178v1 is formed in the radial direction between the outer periphery 131o of the brake shaft 131 and the inner periphery of the permanent magnet 172 and in the axial direction between the magnetic-flux guiding plates 174 and 175 and between the annular projections 134 and 135. A volume of the first sub-chamber 178v1 is made to be larger than that of the sealing gap 176g, which is formed next to the first sub-chamber 178v1 in the axial direction. In other words, a cross sectional area of the first sub-chamber 178v1 is larger than that of the sealing gap 176g.

The sealing gap 178g (the trapping gap 178g), which is a part of the intermediate fluid chamber 178 and is formed between the second magnetic-flux guiding plate 175 and the second annular projection 135, extends in the axial direction. A volume of the trapping gap 178g, which is formed next to the first sub-chamber 178v1, is made to be smaller than that of the first sub-chamber 178v1. Namely, a cross sectional area of the trapping gap 178g is smaller than that of the first sub-chamber 178v1.

A second sub-chamber 178v2 is formed in the radial direction between the outer periphery 131o of the brake shaft 131 and the inner periphery of the magnetic shielding member 166A and in the axial direction between the second magnetic-flux guiding plate 175 as well as the second annular projection 135 and the fluid sealing member 180. A volume of the second sub-chamber 178v2 is made to be larger than that of the trapping gap 178g, which is formed next to the second sub-chamber 178v2 in the axial direction. Namely, a cross sectional area of the second sub-chamber 178v2 is larger than that of the trapping gap 178g.

As above, the intermediate fluid chamber 178 is composed of the first and second sub-chambers 178v1 and 178v2 and the trapping gap 178g. An intermediate fluid 190 of a liquid phase is fully and entirely filled in the intermediate fluid chamber 178. The intermediate fluid 190 is made of non-magnetic fluid, which can keep its liquid phase in a circumstance of the engine operation. As shown in FIG. 7, the intermediate fluid of the first embodiment is different from the base fluid of the magnetic viscous fluid 140.

The base fluid of the magnetic viscous fluid 140 is made of non-polar liquid (hydrophobic liquid), such as oil or the like (which is homogenous or heterogeneous oil to engine lubricating oil). On the other hand, the intermediate fluid 190 is made of polar liquid (hydrophilic liquid), such as fluid based on polyethylene glycols mono ether group having a boiling point higher than 140° C., ionic liquid having a freezing point lower than −30° C., water and so on.

According to the present embodiment having the above explained sealing structure 160, as shown in FIG. 6, the magnetic flux MF generated by the permanent magnet 172 passes through the magnetic-flux guiding plates 174 and 175 and is guided to and/or guided from the annular projections 134 and 135 via the sealing gap 176g and the trapping gap 178g. The magnetic-flux guiding plates 174 and 175 are extended in the radial inward direction, while the annular projections 134 and 135 are extended in the radial outward direction. The magnetic flux MF can be intensively guided to the sealing gap 176g and the trapping gap 178g.

The density of the magnetic flux MF passing through the sealing gap 176g and the trapping gap 178g is thus increased. The magnetic viscous fluid 140 can easily flow into the sealing gap 176g (communicated to the fluid chamber 114) because of magnetic attraction for the magnetic particles. The magnetic particles contained in the magnetic viscous fluid 140 are held by the magnetic flux MF and thereby the viscosity of the magnetic viscous fluid 140 in the sealing gap 176g is increased. As a result, the magnetic viscous fluid 140 is held in the sealing gap 176g (between the first magnetic-flux guiding plate 174 and the first annular projection 134) in a film-like condition (hereinafter, also referred to as a magnetic sealing film). A self-sealing function is brought out by the above magnetic sealing film, so that the magnetic viscous fluid 140 restricts by itself a fluid flow of the magnetic viscous fluid in the axial direction from the housing-inner side to the housing-outer side (in the right-hand direction in the drawing of FIG. 1 or 5). According to the above structure and function, while the sealing gap 176g having an appropriate gap width is formed between the first magnetic-flux guiding plate 174 and the first annular projection 134 and such sealing gap 176g is sealed by the magnetic viscous fluid 140 itself for the magnetic particles contained therein. Frictional resistance to be applied to the brake shaft 131 can be decreased so as to not only improve durability of the hydraulic braking device but also avoid loss of torque, which may cause a decrease of fuel consumption ratio of the engine.

According to the first embodiment, the fluid sealing member 180 is provided at a position separated from a housing-outer side of the first magnetic-flux guiding plate 174, which forms the sealing gap 176g. The intermediate fluid 190 is held in the intermediate fluid chamber 178 between the sealing gap 176g and the fluid sealing member 180. The fluid sealing member 180 brings out a sealing function to the intermediate fluid 190 by the fluid-tight sliding contact with the brake shaft 131. Since the intermediate fluid chamber 178 is always filled with the intermediate fluid 190, fluid pressure in the fluid chamber 114 is propagated through the base fluid of the magnetic viscous fluid 140 in the sealing gap 176g and the intermediate fluid 190 in the intermediate fluid chamber 178, and then transmitted to the fluid sealing member 180. The fluid pressure is received by the fluid sealing member 180. Therefore, it is possible to prevent the base fluid from catching up the magnetic particles and flowing out from the sealing gap 176g to the intermediate fluid chamber 178. In addition, since the base fluid of the magnetic viscous fluid 140 is made of the non-polar liquid, while the intermediate fluid 190 is made of the polar liquid, the base fluid repels the intermediate fluid 190 by its repulsive force. A possible mixture of the base fluid into the intermediate fluid 190, which would cause a flow-out of the base fluid from the sealing gap 176g into the intermediate fluid chamber 178, can be suppressed. Furthermore, since the intermediate fluid 190 is made of the non-magnetic fluid, the intermediate fluid 190 is not magnetically attracted from the intermediate fluid chamber 178 into the sealing gap 176g. Therefore, the possible mixture of the intermediate fluid 190 into the base fluid of the magnetic viscous fluid 140 can be also suppressed. As above, the possible flow-out of the magnetic viscous fluid 140 from the sealing gap 176g into the intermediate fluid chamber 178 as well as the possible mixture of the intermediate fluid from the intermediate fluid chamber 178 into the magnetic viscous fluid 140 in the sealing gap 176g can be suppressed. It is thereby possible to avoid not only a situation in which the self-sealing function may be decreased due to the possible mixture of the magnetic viscous fluid 140 and the intermediate fluid 190 but also a situation in which the braking characteristic may be changed due to change of property of the magnetic viscous fluid 140. It is, therefore, possible to maintain adjusting accuracy for the engine operational phase.

In addition, according to the first embodiment, since the magnetic particles of the magnetic viscous fluid 140, to which the base fluid of the non-polar liquid is attached, repels the intermediate fluid 190 of the polar liquid, the possible flow-out of the magnetic particles from the sealing gap 176g into the intermediate fluid chamber 178 and the possible flow to the fluid sealing member 180 can be suppressed. Even if the magnetic particles flew out into the intermediate fluid chamber 178, the magnetic particles could hardly reach at the fluid sealing member 180 because of a distance between the sealing gap 176g and the fluid sealing member 180. Since the first sub-chamber 178v1 extends in the axial direction depending on the distance between the first and second magnetic-flux guiding plates 174 and 175, the necessary distance of the intermediate fluid chamber 178 through which the magnetic particles should flow and reach at the fluid sealing member 180 is relatively long. In addition, even when the magnetic particles flew into the intermediate fluid chamber 178, such magnetic particles would be trapped by the trapping gap 178g, to which the magnetic flux MF is guided by the second magnetic-flux guiding plate 175. Accordingly, the magnetic particles can be surely prevented from flowing through the intermediate fluid chamber 178 (having the trapping gap 178g) and reaching at the fluid sealing member 180. Based on the above structure and function, even when surface pressure on a boundary surface 187, at which the fluid sealing member 180 is brought into the sliding contact with the brake shaft 131, as shown in FIGS. 5 and 6, is decreased, it is possible to avoid such a situation that the magnetic particles enter into the boundary surface 187 and thereby the frictional resistance is increased. The durability of the hydraulic braking device can be thus increased.

In addition, according to the first embodiment, the density of the magnetic flux MF, which is necessary for holding the magnetic particles in the sealing gap 176g, can be made smaller. Since the magnetic sealing film(s) is formed by the magnetic viscous fluid 140 in the sealing gap 176g, through which the magnetic flux MF of the smaller density passes, the frictional resistance applied to the brake shaft 131 can be reduced. Thereby, the durability can be increased and the loss of torque can be avoided.

(Second Embodiment)

A second embodiment of the present disclosure is a modification of the first embodiment. As shown in FIG. 7, the non-magnetic base fluid for the magnetic viscous fluid 140 is made of the polar liquid (hydrophilic liquid), such as fluid based on polyethylene glycols mono ether group having a boiling point higher than 140° C., ionic liquid having a freezing point lower than −30° C., water and so on. On the other hand, the non-magnetic intermediate fluid 190 is made of the non-polar liquid (hydrophobic liquid), such as oil or the like (which is homogenous or heterogeneous oil to engine lubricating oil).

According to the second embodiment, since the base fluid of the magnetic viscous fluid 140 is made of the polar liquid, while the intermediate fluid 190 is made of the non-polar liquid, the base fluid repels the intermediate fluid 190 by its repulsive force. A possible mixture of the base fluid into the intermediate fluid 190, which would cause a flow-out of the base fluid from the sealing gap 176g into the intermediate fluid chamber 178, can be suppressed.

Furthermore, since the intermediate fluid 190 is made of the non-magnetic fluid, the intermediate fluid 190 is not magnetically attracted from the intermediate fluid chamber 178 into the sealing gap 176g. Therefore, the possible mixture of the intermediate fluid 190 into the base fluid of the magnetic viscous fluid 140 can be also suppressed.

As above, in the same manner to the first embodiment, it is possible to avoid not only the situation in which the self-sealing function may be decreased due to the possible mixture of the magnetic viscous fluid 140 and the intermediate fluid 190 but also the situation in which the braking characteristic may be changed due to change of property of the magnetic viscous fluid 140.

In addition, according to the second embodiment, since the magnetic particles of the magnetic viscous fluid 140, to which the base fluid of the polar liquid is attached, repels the intermediate fluid 190 of the non-polar liquid, the possible flow-out of the magnetic particles from the sealing gap 176g into the intermediate fluid chamber 178 and the possible flow to the fluid sealing member 180 can be suppressed. As a result, in the same manner to the first embodiment, the surface pressure on the boundary surface 187 (between the brake shaft 131 and the fluid sealing member 180) can be reduced to thereby increase the durability.

(Third Embodiment)

A third embodiment of the present disclosure is a further modification of the first embodiment. As shown in FIG. 7, the non-magnetic base fluid for the magnetic viscous fluid 140 is made of the non-polar liquid, such as, the oil or the like as in the same manner to the first embodiment. The non-magnetic intermediate fluid 190 is also made of the non-polar liquid, which is the same to the base fluid for the magnetic viscous fluid 140 (that is, the non-polar liquid, such as, the oil and so on).

According to the third embodiment, since the intermediate fluid 190, which is the same to the base fluid for the magnetic viscous fluid 140, is used, a possible increase of cost for the fluid can be suppressed. In addition, the intermediate fluid 190 of the non-magnetic fluid is not magnetically attracted from the intermediate fluid chamber 178 into the sealing gap 176g and thereby the possible mixture of the intermediate fluid 190 into the base fluid of the magnetic viscous fluid 140 can be suppressed. Even when the intermediate fluid was mixed into the base fluid, there would occur no problem because of the same fluid to each other. Accordingly, in the same manner to the first embodiment, it is possible to avoid not only the situation in which the self-sealing function may be decreased due to the possible mixture of the magnetic viscous fluid 140 and the intermediate fluid 190 but also the situation in which the braking characteristic may be changed due to change of property of the magnetic viscous fluid 140.

(Fourth Embodiment)

Figure 8:
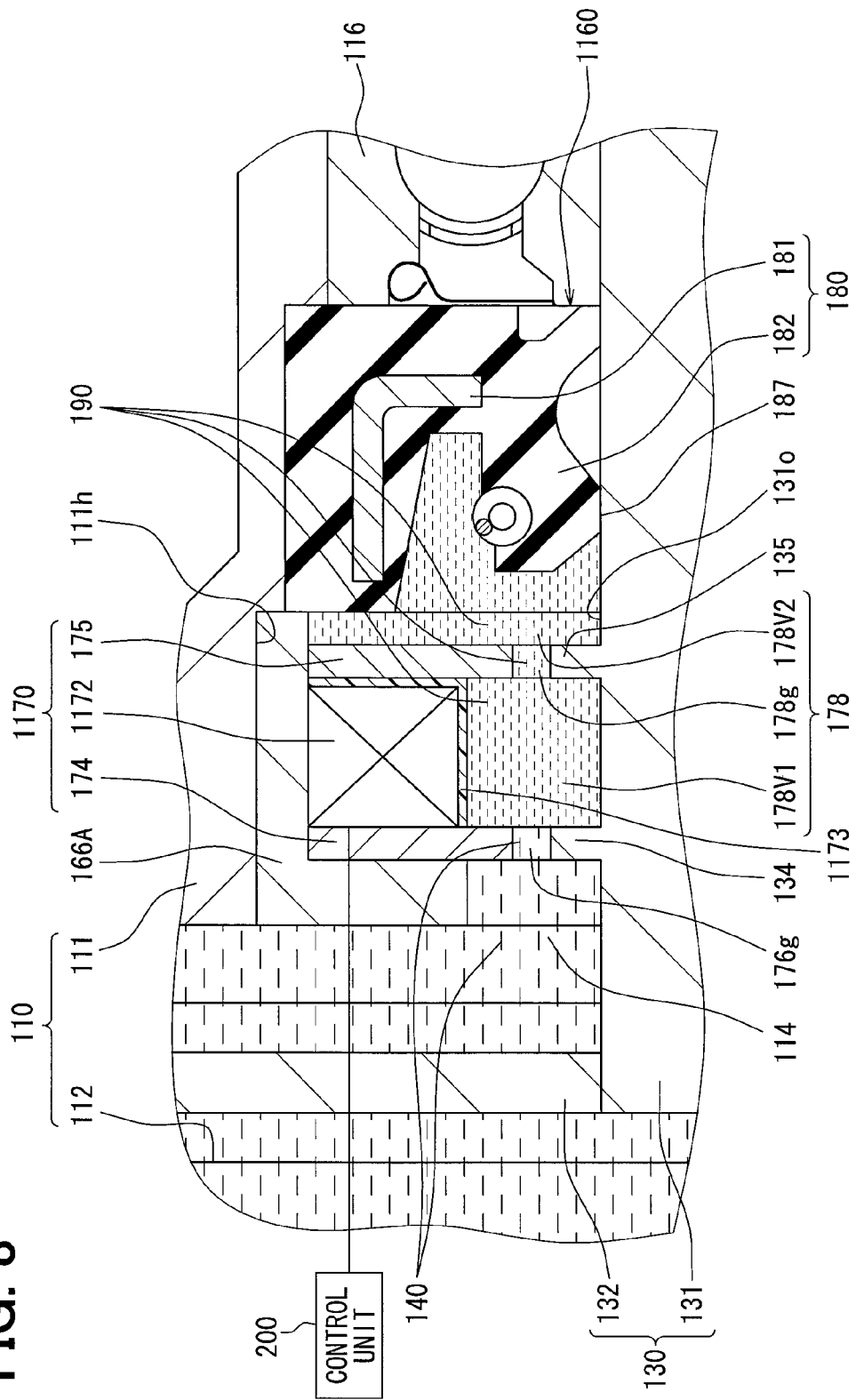
FIG. 8 is a schematically enlarged cross sectional view showing a sealing structure according to a fourth embodiment of the present disclosure.

A fourth embodiment of the present disclosure is a still further modification of the first embodiment. As shown in FIG. 8, in a sealing structure 1160, a magnetic sealing sleeve unit 1170 (working as the particle sealing unit or member) has an electromagnet 1172 in place of the permanent magnet 172 of the first embodiment. The electromagnet 1172 is composed of a metal wire wound on a resin-made bobbin 1173 and formed in a cylindrical shape as a whole. The electromagnet 1172 is coaxially arranged with the brake shaft 131 at the outer periphery thereof so as to surround the brake shaft 131 in the rotating direction. When the electric power is supplied from the power-supply control unit 200 to the electromagnet 1172, the magnetic flux is generated like the magnetic flux MF in the first embodiment.

In the fourth embodiment, the magnetic flux generated by the electromagnet 1172 is guided by the magnetic-flux guiding plates 174 and 175 to the respective annular projections 134 and 135 via the sealing gap 176g and the trapping gaps 178g. The same advantages to the first embodiment can be obtained in the fourth embodiment, too.

(Fifth Embodiment)

Figure 9:
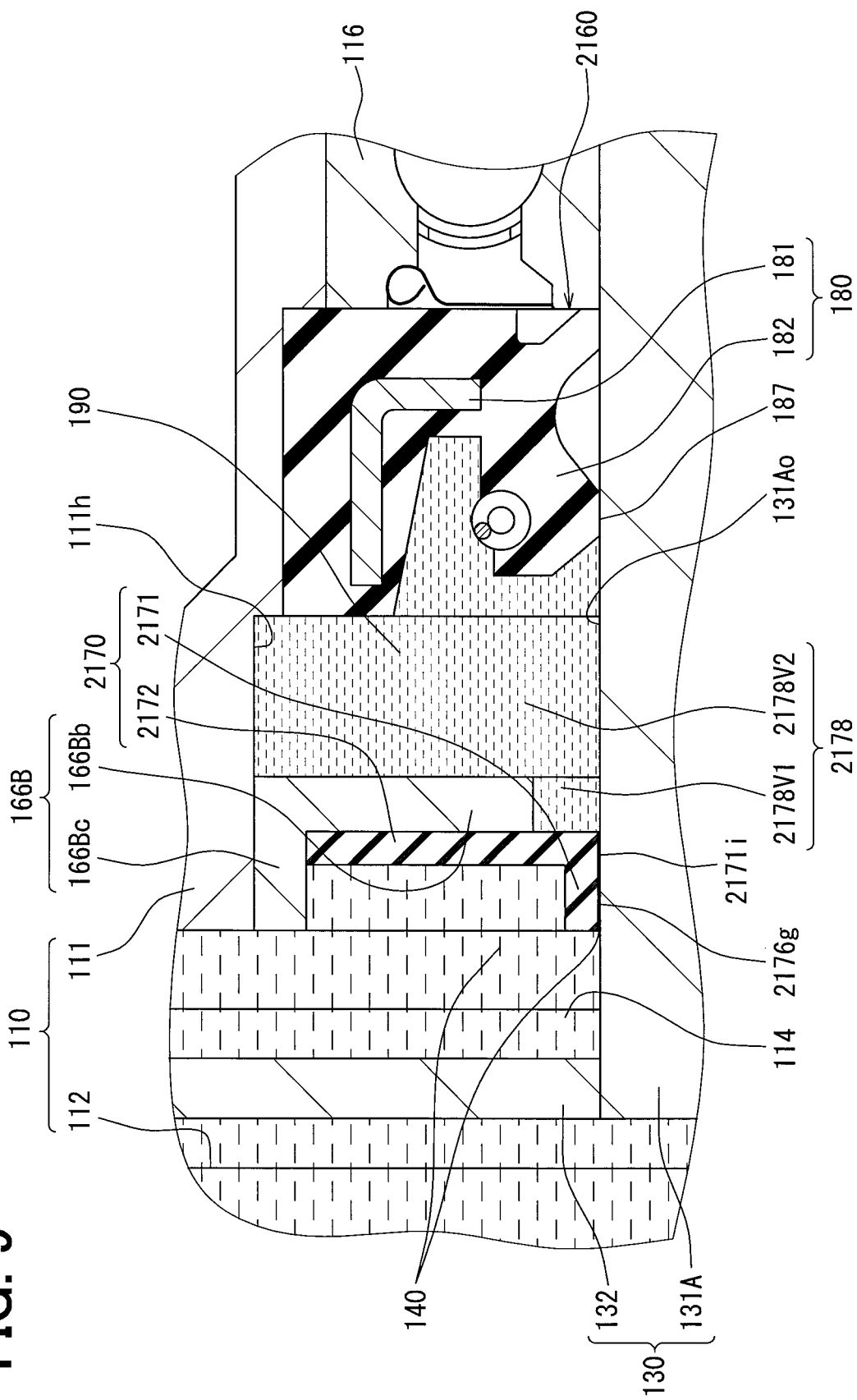
FIG. 9 is a schematically enlarged cross sectional view showing a sealing structure according to a fifth embodiment of the present disclosure.

A fifth embodiment of the present disclosure is a modification of the first embodiment. As shown in FIG. 9, in a sealing structure 2160, a magnetic shielding member 166B (made of non-magnetic material) is inserted into the fit-in hole 111h of the housing 110 in such a way that a bottom wall portion 166Bb is positioned on the housing-outer side while its open end is positioned on the housing-inner side (in a direction opposite to the first embodiment).

The sealing structure 2160 has a mechanical seal member 2170 working as the particle sealing unit/member, in place of the magnetic sealing sleeve unit 170 of the first embodiment. The mechanical seal member 2170 is made of, for example, an O-ring made of rubber, a lip packing made of carbon and so on. The mechanical seal member 2170 (the O-ring in FIG. 9) is coaxially arranged at an outer periphery 131Ao of a brake shaft 131A. The mechanical seal member 2170 has a cylindrical sealing body 2171 and a flanged body 2172 extending from an axial end of the sealing body 2171 (of the housing-outer side) in a radial outward direction. The mechanical seal member 2170 is inserted into a cylindrical wall portion 166Bc of the magnetic shielding member 166B, in such a way that an axial bottom end surface of the flanged body 2172 of the housing-outer side (that is, the right-hand side surface in FIG. 9) is covered by the bottom wall portion 166Bb of the magnetic shielding member 166B. A sealing gap 2176g is formed between an inner periphery 2171i of the sealing body 2171 and the outer periphery 131Ao of the brake shaft 131A. In the present embodiment, a structure corresponding to the annular projections 134 and 135 of the first embodiment is not formed on the outer periphery 131Ao of the brake shaft 131A.

Figure 10:
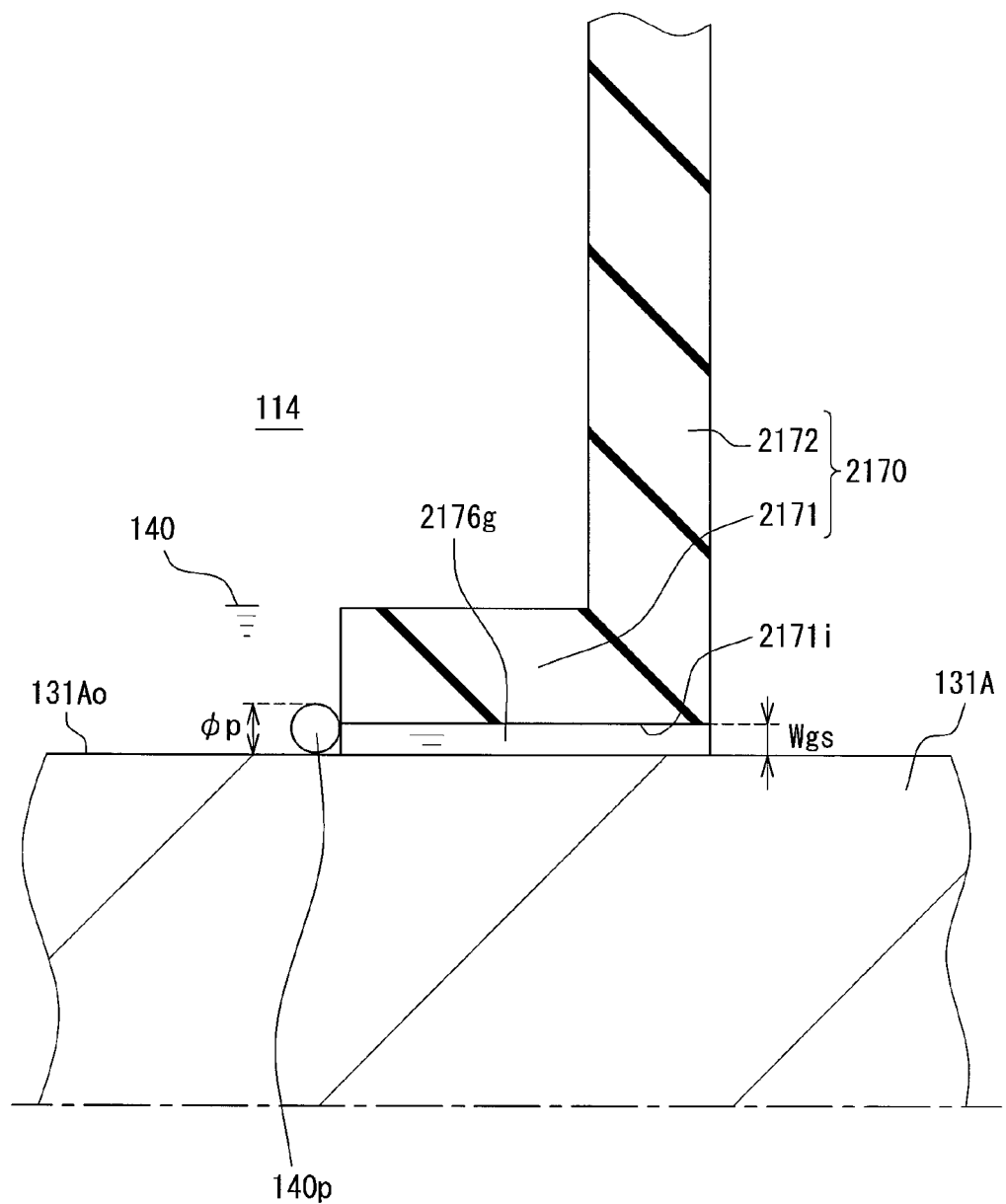
FIG. 10 is a schematically enlarged cross sectional view for explaining characteristic of the sealing structure of FIG. 9.

The sealing body 2171 of the mechanical seal member 2170 is projected in a radial inward direction from an inner periphery of the bottom wall portion 166Bb of the magnetic shielding member 166B. As shown in FIG. 10, a radial distance (a gap width) "Wgs" of the sealing gap 2176g is so made as to be smaller than a minimum outer diameter "φp" of the magnetic particle 140p contained in the magnetic viscous fluid 140. The mechanical seal member 2170 has a function as a gap adjusting member. The sealing gap 2176g is filled with the base fluid for the magnetic viscous fluid 140, which flows from the fluid chamber 114 into the sealing gap 2176g.

As shown in FIG. 9, an intermediate fluid chamber 2178 is formed between the sealing gap 2176g and the fluid sealing member 180 in the axial direction. A first sub-chamber 2178v1 is formed between the brake shaft 131A and the inner periphery of the bottom wall portion 166Bb of the magnetic shielding member 166B and extends in the axial direction for the entire axial length of the bottom wall portion 166Bb of the magnetic shielding member 166B. A volume (a cross sectional area) of the first sub-chamber 2178v1 is made larger than that of the sealing gap 2176g.

A second sub-chamber 2178v2, which is formed between the brake shaft 131A and the inner periphery of the fit-in hole 111h of the fixed member 111 in the radial direction, extends in the axial direction between the magnetic shielding member 166B and the fluid sealing member 180. A volume (a cross sectional area) of the second sub-chamber 2178v2 is made to be larger than that of the first sub-chamber 2178v1. The intermediate fluid chamber 2178 (being composed of the first and second sub-chambers 2178v1 and 2178v2) is fully filled with the intermediate fluid 190, which is the same fluid to the intermediate fluid 190 of the first embodiment.

According to the fifth embodiment, the magnetic particles 140p contained in the magnetic viscous fluid 140 can hardly flow from the fluid chamber 114 into the sealing gap 2176g formed between the mechanical seal member 2170 and the brake shaft 131A, wherein the radial distance (the gap width) "Wgs" is adjusted to be smaller than the outer diameter "φp" of the magnetic particles 140p. Therefore, the sealing gap 2176g having the appropriate gap width can be formed between the mechanical seal member 2170 and the brake shaft 131A, while the sealing gap 2176g surely restricts the flow of the magnetic particles 140p. The frictional resistance to be applied to the brake shaft 131A can be thereby decreased so as to not only improve durability but also avoid the loss of torque.

According to the fifth embodiment, as in the same manner to the first embodiment, the fluid sealing member 180, which is fluid-tightly in contact with the outer periphery 131Ao of the brake shaft 131A, brings out the sealing function for the intermediate fluid 190 of the intermediate fluid chamber 2178. Since the intermediate fluid chamber 2178 is always filled with the intermediate fluid 190, the fluid pressure in the fluid chamber 114 is propagated through the base fluid of the magnetic viscous fluid 140 in the sealing gap 2176g and the intermediate fluid 190 in the intermediate fluid chamber 2178 and transmitted to the fluid sealing member 180. The fluid pressure is received by the fluid sealing member 180. Therefore, it is possible to prevent the base fluid from catching up the magnetic particles 140p and flowing out from the sealing gap 2176g to the intermediate fluid chamber 2178.

In addition, since the base fluid of the magnetic viscous fluid 140 is made of the non-polar liquid, while the intermediate fluid 190 is made of the polar liquid, the base fluid repels the intermediate fluid 190 by its repulsive force. A possible mixture of the base fluid into the intermediate fluid 190, which would cause the flow-out of the base fluid from the sealing gap 2176g into the intermediate fluid chamber 2178, can be suppressed.

As above, the possible flow-out of the magnetic viscous fluid 140 from the sealing gap 2176g into the intermediate fluid chamber 2178 can be suppressed. It is thereby possible to avoid a situation in which the braking characteristic may be changed due to change of property of the magnetic viscous fluid 140. It is, therefore, possible to maintain adjusting accuracy for the engine operational phase by the valve timing adjusting apparatus.

In addition, according to the fifth embodiment, as in the same manner to the first embodiment, since the magnetic particles 140p contained in the magnetic viscous fluid 140, to which the base fluid of the non-polar liquid is attached, rebels the intermediate fluid 190 of the polar liquid, the possible flow-out of the magnetic particles 140p from the sealing gap 2176g into the intermediate fluid chamber 2178 and the possible flow to the fluid sealing member 180 can be suppressed.

Even if the magnetic particles 140*p* flew out into the intermediate fluid chamber 2178, the magnetic particles could hardly reach at the fluid sealing member 180 because of a distance between the sealing gap 2176*g* and the fluid sealing member 180. Accordingly, even when the surface pressure on the boundary surface 187, at which the fluid sealing member 180 is brought into the sliding contact with the brake shaft 131A, is decreased, it is possible to avoid such a situation that the magnetic particles 140*p* enter into the boundary surface 187 and thereby the frictional resistance is increased. Accordingly, the durability of the hydraulic braking device can be increased.

(Sixth Embodiment)

Figure 11:
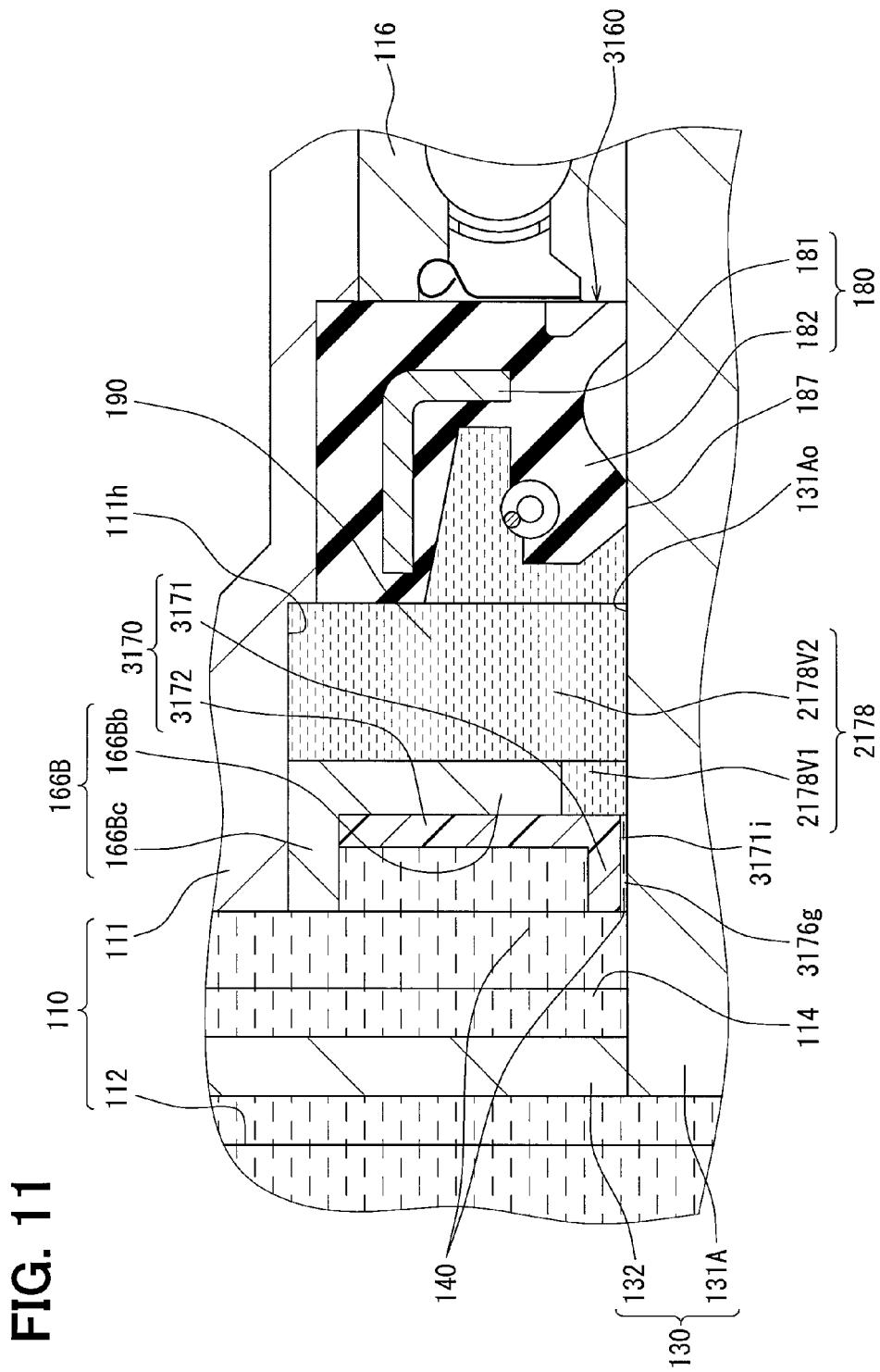
FIG. 11 is a schematically enlarged cross sectional view showing a sealing structure according to a sixth embodiment of the present disclosure.

A sixth embodiment of the present disclosure is a modification of the fifth embodiment. As shown in FIG. 11, a sealing structure 3160 of the sixth embodiment has a resin-made filter member 3170 working as the particle sealing member, in place of the mechanical seal member 2170 of the fifth embodiment. The resin-made filter member 3170 is made of resin, for example, polytetrafluoroethylene (PTFE), and formed in a mesh shape for trapping the magnetic particles 140*p*. The resin-made filter member 3170 has a cylindrical filter body 3171 and a flanged body 3172.

Figure 12:
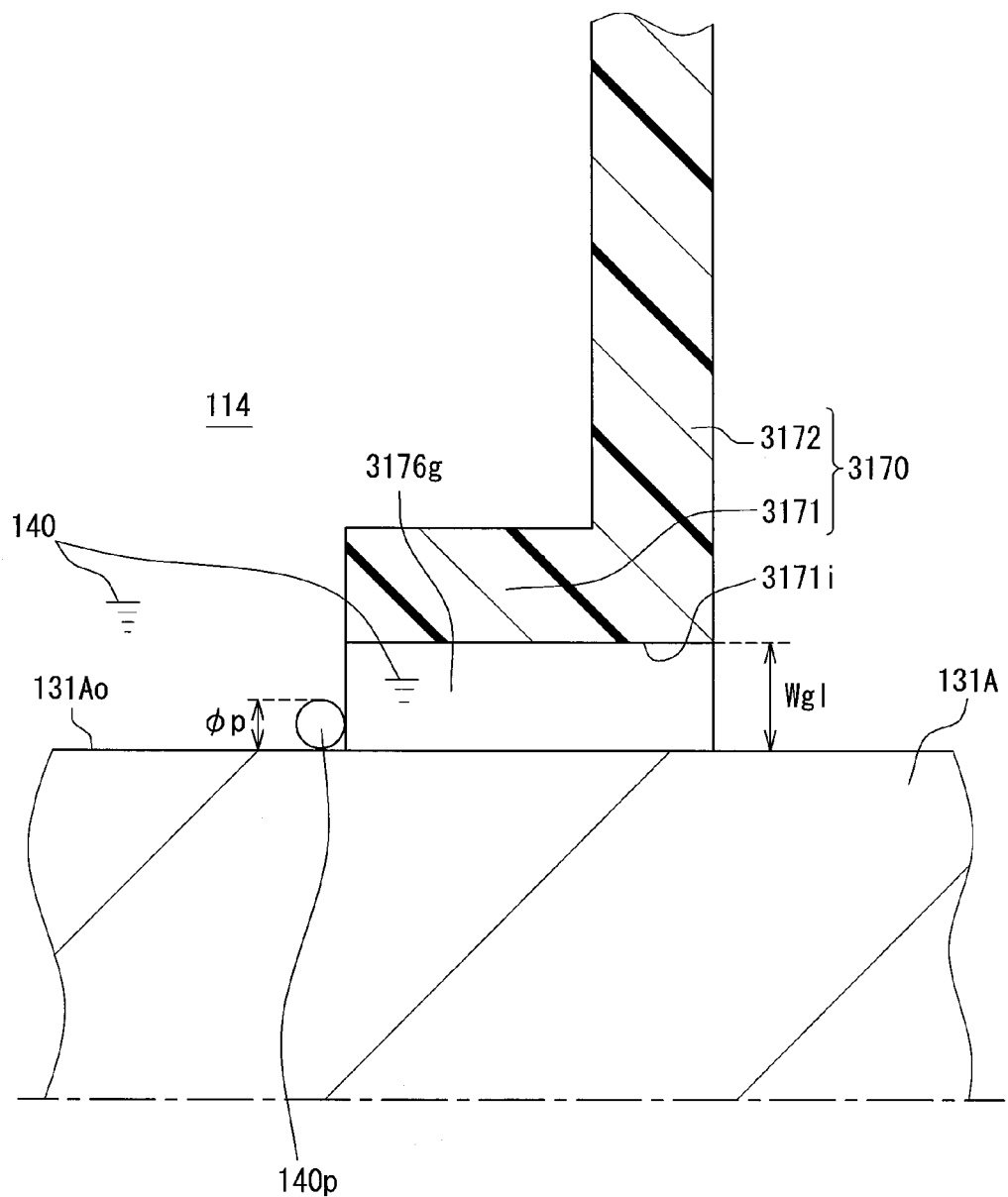
FIG. 12 is a schematically enlarged cross sectional view for explaining characteristic of the sealing structure of FIG. 11.

A sealing gap 3176*g*, which is communicated to the fluid chamber 114 in the axial direction, is formed between the outer periphery 131Ao of the brake shaft 131A and an inner periphery 3171*i* of the filter body 3171 in the radial direction. As shown in FIG. 12, a radial distance (a gap width) "Wg1" of the sealing gap 3176*g* is so made as to be larger than an outer diameter "φp" of the magnetic particle 140*p* contained in the magnetic viscous fluid 140. The magnetic particles 140 flow from the fluid chamber 114 into the sealing gap 3176*g* together with the base fluid of the magnetic viscous fluid 140. The intermediate fluid chamber 2178 is formed between the sealing gap 3176*g* and the fluid sealing member 180, as shown in FIG. 11, as in the same manner to the fifth embodiment.

According to the sixth embodiment, the magnetic particles 140*p*, which flow from the fluid chamber 114 into the sealing gap 3176*g*, are trapped in the sealing gap 3176*g* by the resin-made filter member 3170. A flow of the magnetic particles 140*p* is thereby restricted in the axial direction from the housing-inner side to the housing-outer side (that is, in the right-hand direction in FIGS. 11 and 12). Therefore, the sealing gap 3176*g* having the appropriate gap width is formed between the resin-made filter member 3170 and the brake shaft 131A, while the sealing gap 3176*g* surely restricts the flow of the magnetic particles 140*p*. The frictional resistance to be applied to the brake shaft 131A can be decreased so as to not only improve durability but also avoid the loss of torque, as in the same manner to the fifth embodiment.

(Seventh Embodiment)

Figure 13:
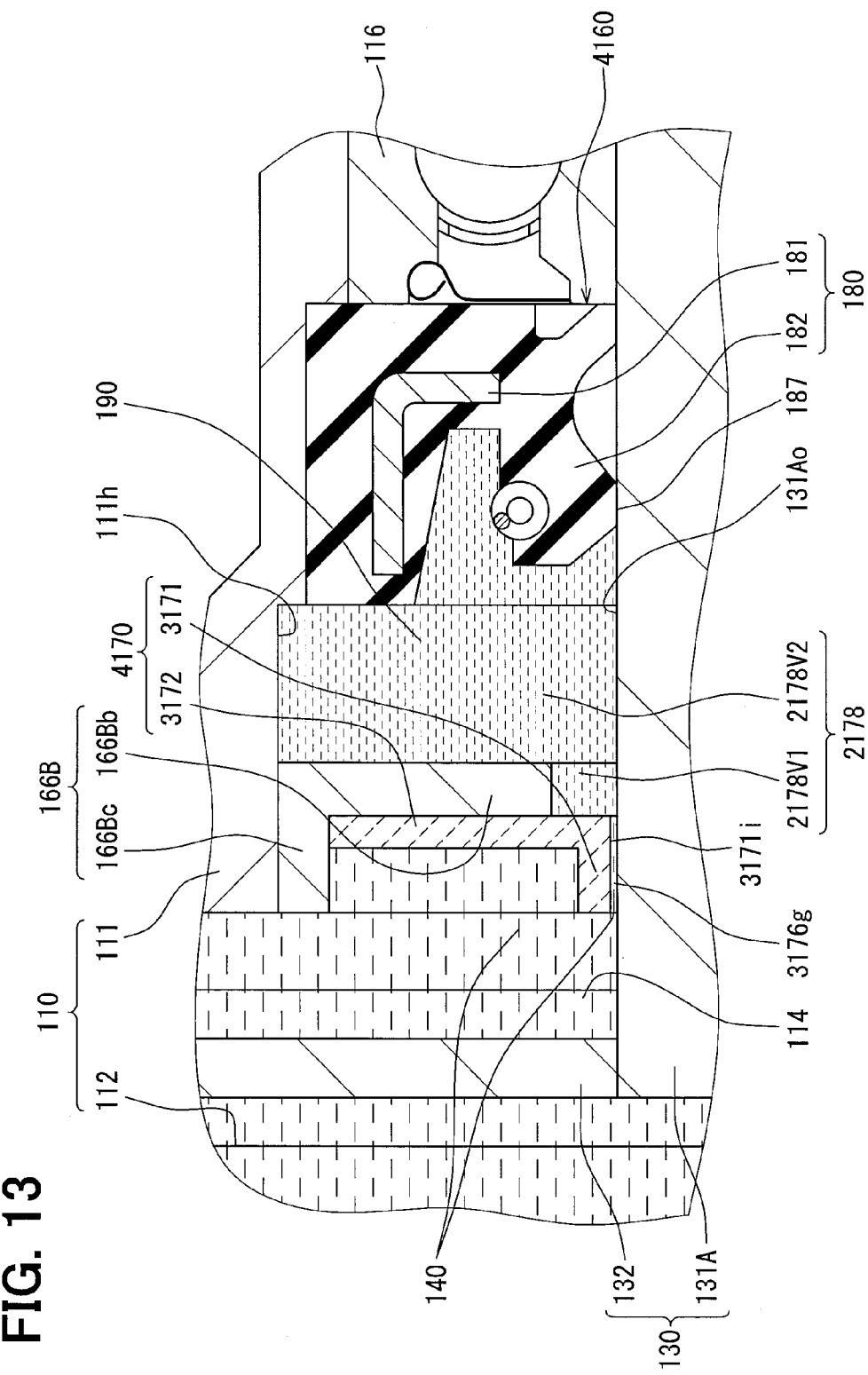
FIG. 13 is a schematically enlarged cross sectional view showing a sealing structure according to a seventh embodiment of the present disclosure.

A seventh embodiment of the present disclosure is a modification of the sixth embodiment. As shown in FIG. 13, a sealing structure 4160 of the seventh embodiment has a porous filter member 4170 working as the particle sealing member, in place of the resin-made filter member 3170 of the sixth embodiment. The porous filter member 4170 is made of, for example, ceramics, and formed in a porous shape so that the magnetic particles 140*p* can be trapped. The porous filter member 4170 has the same structure (except for the porous shape made of the ceramic material) and function to the resin-made filter member 3170 of the sixth embodiment, so that the same effects to that of the sixth embodiment can be obtained.

(Eighth Embodiment)

Figure 14:
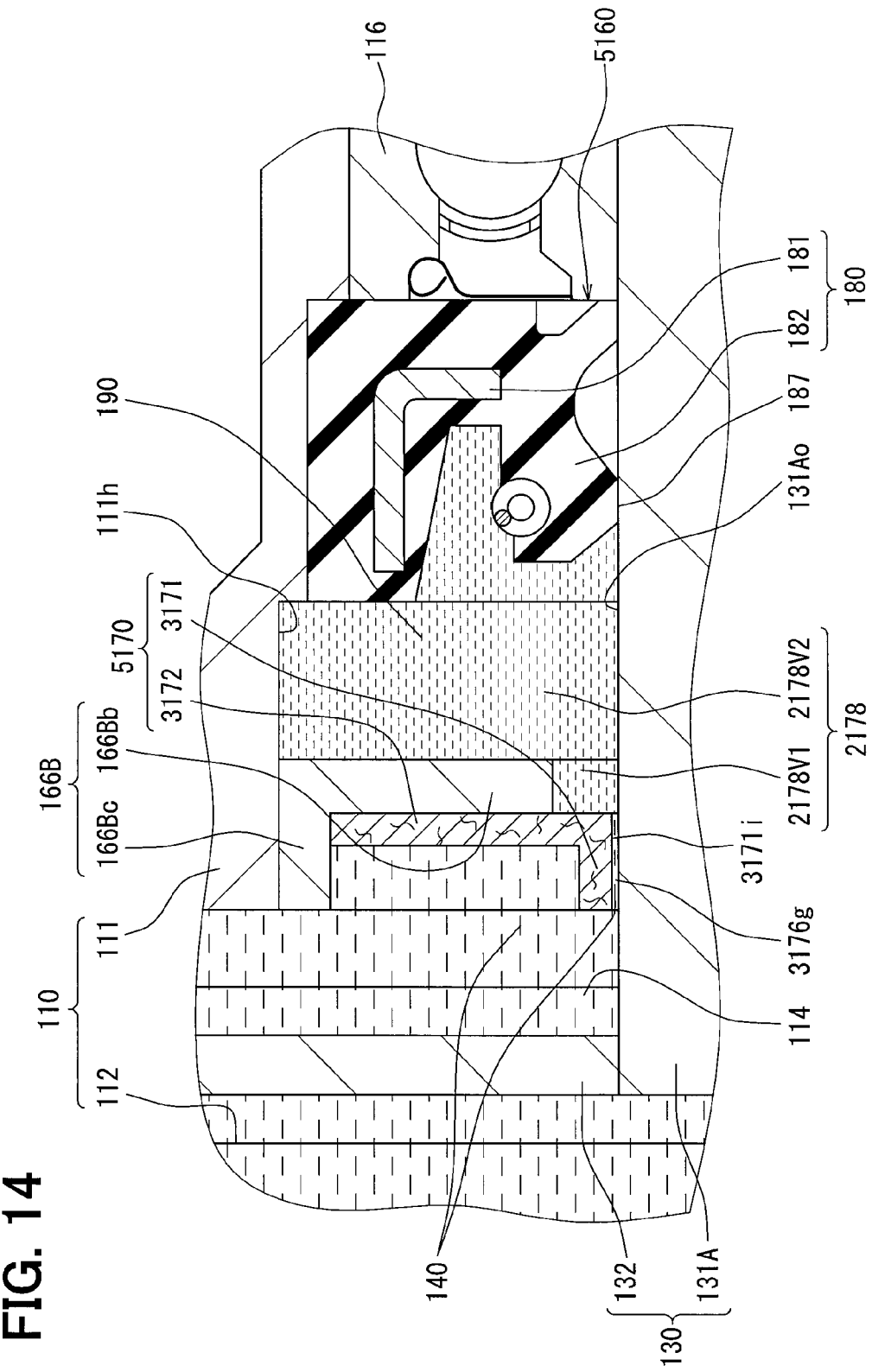
FIG. 14 is a schematically enlarged cross sectional view showing a sealing structure according to an eighth embodiment of the present disclosure.

An eighth embodiment of the present disclosure is another modification of the sixth embodiment. As shown in FIG. 14, a sealing structure 5160 of the eighth embodiment has a fiber filter member 5170 working as the particle sealing member, in place of the resin-made filter member 3170 of the sixth embodiment. The fiber filter member 5170 is made of, for example, resin, ceramics or the like, and formed in a fibrous form so that the magnetic particles 140*p* can be trapped. The fiber filter member 5170 has the same structure (except for the fibrous form made of the resin or the ceramic material) and function to the resin-made filter member 3170 of the sixth embodiment, so that the same effects to that of the sixth embodiment can be obtained.

(Ninth Embodiment)

Figure 15:
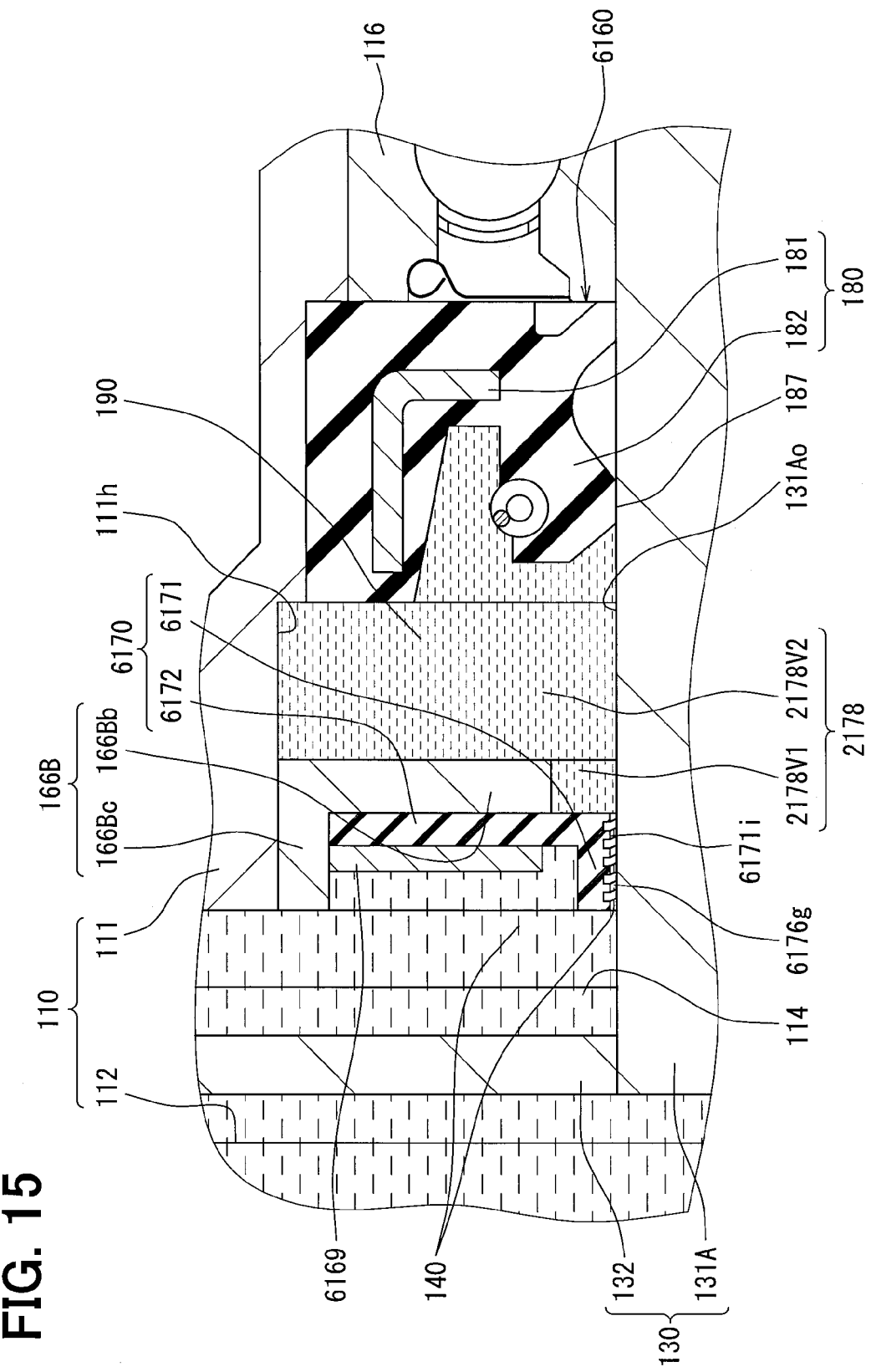
FIG. 15 is a schematically enlarged cross sectional view showing a sealing structure according to a ninth embodiment of the present disclosure.
Figure 16:
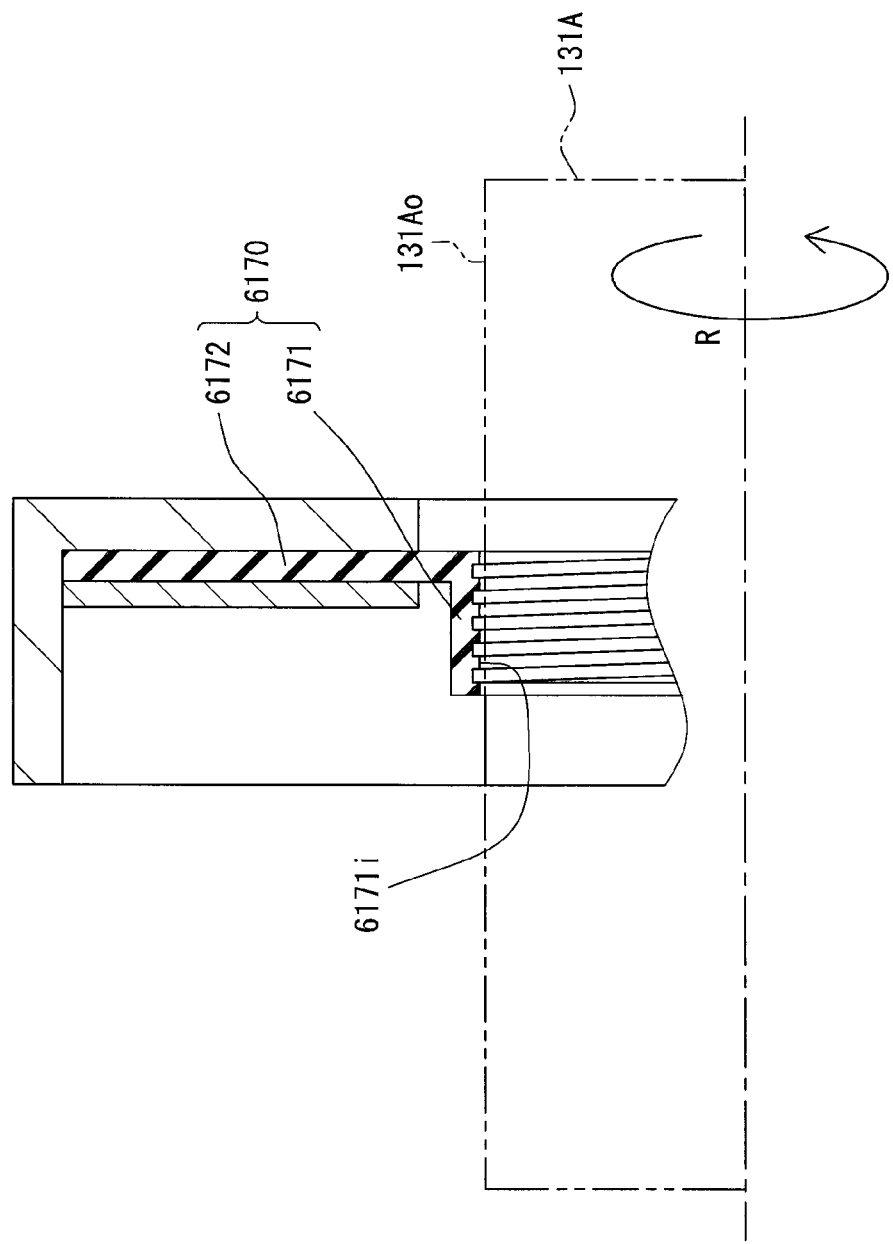
FIG. 16 is a schematically enlarged cross sectional view for explaining characteristic of the sealing structure of FIG. 15.

A ninth embodiment of the present disclosure is a further modification of the sixth embodiment. As shown in FIG. 15, a sealing structure 6160 of the ninth embodiment is composed of a resin-made filter member 6170 having a filter body 6171 and a flanged body 6172. The resin-made filter member 6170 also works as the particle sealing member. A spiral groove of a female screw shape is formed at an inner periphery 6171*i* of the filter body 6171, so that the resin-made filter member 6170 brings out a visco-seal function. As shown in FIG. 16, the spiral groove of the inner periphery 6171*i* comes away in the axial direction from the housing-inner side to the housing-outer side, when traced the spiral groove along the rotating direction "R" of the brake shaft 131A. As shown in FIG. 15, a sealing gap 6176*g*, which has the radial distance (the gap width) "Wg1" (not shown), is formed in the radial direction between the outer periphery 131Ao of the brake shaft 131A and mountain tops of the female screw formed in the inner periphery 6171*i*. The flanged body 6172 is interposed between the bottom wall portion 166Bb of the magnetic shielding member 166B and a non-magnetic spacer 6169.

According to the ninth embodiment, the magnetic particles 140*p*, which flow into the sealing gap 6176*g* formed between the inner periphery 6171*i* of the resin-made filter member 6170 and the outer periphery 131Ao of the brake shaft 131A, receive centrifugal force by the rotation of the brake shaft 131A in the rotating direction "R" and thereby the magnetic particles 140*p* are pushed against the inner periphery 6171*i* of the resin-made filter member 6170. Since the inner periphery 6171*i* is formed with the spiral groove, a moment in a direction to the housing-inner side (in the left-hand side direction in FIGS. 15 and 16) is applied to the magnetic particles 140*p* pushed against the inner periphery 6171*i*. Accordingly, the flow of the magnetic particles 140*p* is restricted in the direction to the housing-outer side (in the right-hand side direction in FIGS. 15 and 16).

In addition, the magnetic particles 140*p* are trapped by the resin-made filter member 6170, as in the same manner to the sixth embodiment. Therefore, the sealing gap 6176*g* having the appropriate gap width is formed between the resin-made filter member 6170 and the brake shaft 131A, while the sealing gap 6176*g* surely restricts the flow of the magnetic particles 140*p*. The frictional resistance to be applied to the brake shaft 131A can be decreased so as to not only improve durability but also avoid the loss of torque, as in the same manner to the fifth embodiment.

(Tenth Embodiment)

Figure 17:
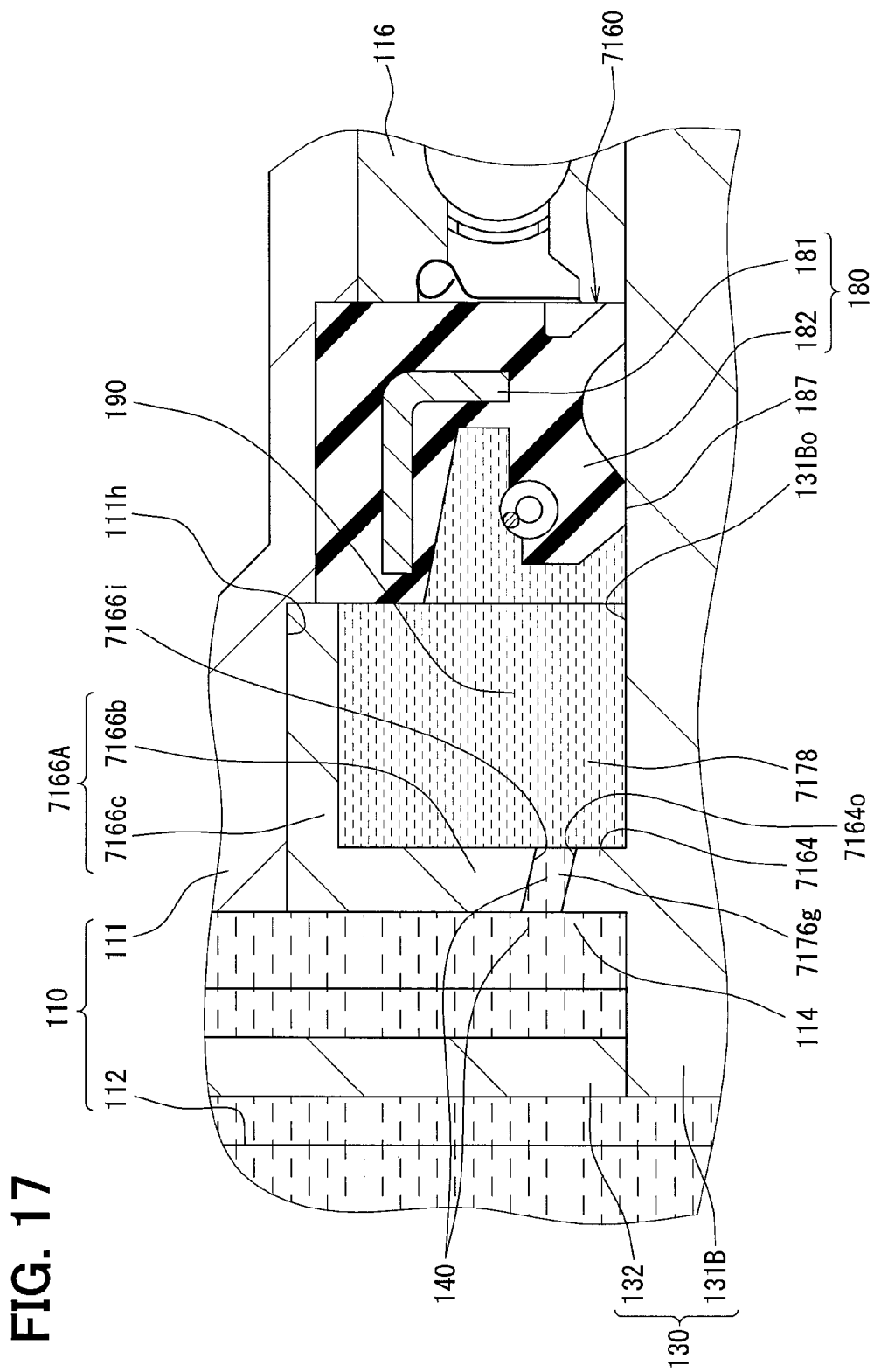
FIG. 17 is a schematically enlarged cross sectional view showing a sealing structure according to a tenth embodiment of the present disclosure.

A tenth embodiment of the present disclosure is a modification of the first embodiment. As shown in FIG. 17, a sealing structure 7160 of the tenth embodiment does not have a unit corresponding to the magnetic sealing sleeve unit 170 of the first embodiment. The sealing structure 7160 has a magnetic shielding member 7166A made of non-magnetic material and working as the particle sealing member. More in detail, the magnetic shielding member 7166A is positioned in the fit-in hole 111h, as in the same manner to the first embodiment. An inner periphery 7166i of a bottom wall portion 7166b is formed in a tapered shape, so that an inner diameter is changed in the axial direction. The magnetic shielding member 7166A also functions as "a diameter changing member". The inner diameter of the inner periphery 7166i is increased with a constant change rate in the axial direction from the housing-outer side to the housing-inner side.

Figure 18:
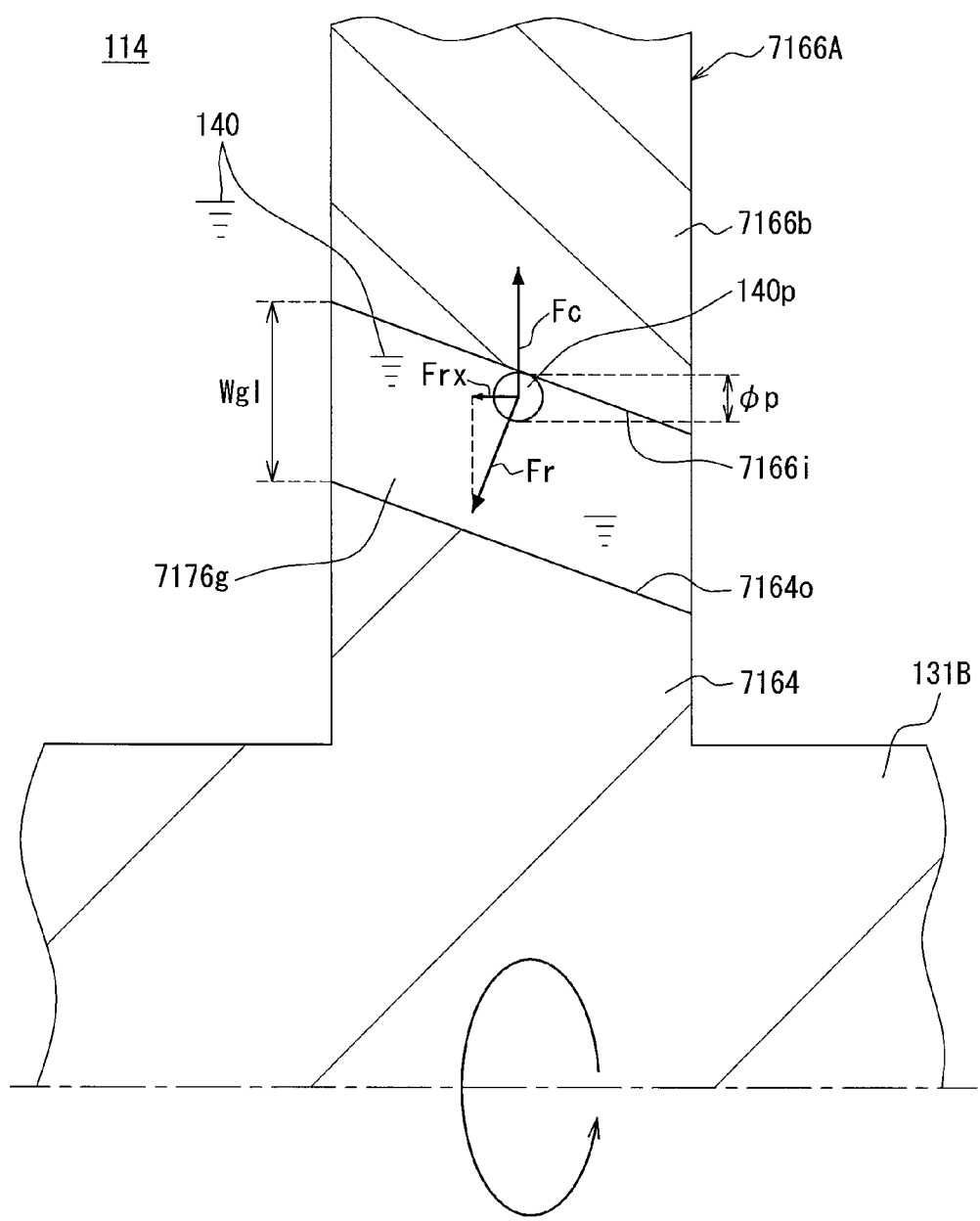
FIG. 18 is a schematically enlarged cross sectional view for explaining characteristic of the sealing structure of FIG. 17.

The inner periphery 7166i of the magnetic shielding member 7166A is opposing to an outer periphery 7164o of an annular projection 7164. In the present embodiment, only one annular projection 7164 is formed in a brake shaft 131B. A sealing gap 7176g, which is communicated to the fluid chamber 114, is formed in the radial direction between the inner periphery 7166i and the outer periphery 7164o. An outer diameter of the outer periphery 7164o is likewise increased with a constant change rate, which is substantially the same to that for the inner periphery 7166i, in the axial direction from the housing-outer side to the housing-inner side. As shown in FIG. 18, a radial distance (a gap width) "Wg1" of the sealing gap 7176g is so made as to be larger than the outer diameter "φp" of the magnetic particle 140p contained in the magnetic viscous fluid 140. The magnetic particles 140 flow from the fluid chamber 114 into the sealing gap 7176g together with the base fluid of the magnetic viscous fluid 140.

According to the tenth embodiment, as shown in FIG. 17, a space between the sealing gap 7176g and the fluid sealing member 180 is formed as an intermediate fluid chamber 7178. The intermediate fluid chamber 7178 is formed in an inside of a cylindrical wall portion 7166c of the magnetic shielding member 7166A and extends in the axial direction for its entire axial length, so that volume of the intermediate fluid chamber 7178 (a cross sectional area thereof) is made to be larger than that of the sealing gap 7176g. The intermediate fluid 190 is fully filled in the intermediate fluid chamber 7178.

According to the tenth embodiment, as shown in FIG. 18, a centrifugal force "Fc" is applied by the rotation of the brake shaft 131B to the magnetic particles 140p of the magnetic viscous fluid 140, which flow from the fluid chamber 114 into the sealing gap 7176g formed between the inner periphery 7166i of the magnetic shielding member 7166A and the brake shaft 131B. Therefore, the magnetic particles 140p are pushed against the inner periphery 7166i of the magnetic shielding member 7166A.

As shown in FIG. 18, as a result that the magnetic particles 140p are pushed by the centrifugal force "Fc" against the inner periphery 7166i, the inner diameter of which is increased in the axial direction from the housing-outer side to the housing-inner side (in the direction toward the left-hand side in the drawing), a component "Frx" in the axial direction of a drag "Fr" is applied to the magnetic particles 140p in the axial direction to the housing-inner side. The drag "Fr" corresponds to the centrifugal force "Fc". The flow of the magnetic particles 140p in the axial direction to the housing-outer side (in the direction toward the right-hand side in FIG. 18) is thereby restricted.

Therefore, while the sealing gap 7176g having the appropriate gap width is formed between the magnetic shielding member 7166A and the brake shaft 131B, the sealing gap 7176g surely restricts the flow of the magnetic particles 140p. In other words, the sealing gap 7176g is surely sealed for the flow of the magnetic particles 140p. The frictional resistance to be applied to the brake shaft 131B can be decreased so as to not only improve durability but also avoid the loss of torque.

According to the tenth embodiment, as in the same manner to the first embodiment, the fluid sealing member 180, which is fluid-tightly in contact with the outer periphery 131Bo of the brake shaft 131B, brings out the sealing function for the intermediate fluid 190 of the intermediate fluid chamber 7178. Since the intermediate fluid chamber 7178 is always filled with the intermediate fluid 190, the fluid pressure in the fluid chamber 114 is propagated through the base fluid of the magnetic viscous fluid 140 in the sealing gap 7176g and the intermediate fluid 190 in the intermediate fluid chamber 7178 and transmitted to the fluid sealing member 180. The fluid pressure is received by the fluid sealing member 180. Therefore, it is possible to prevent the base fluid from catching up the magnetic particles 140p and flowing out from the sealing gap 7176g to the intermediate fluid chamber 7178.

In addition, since the base fluid of the magnetic viscous fluid 140 is made of the non-polar liquid, while the intermediate fluid 190 is made of the polar liquid, the base fluid repels the intermediate fluid 190 by its repulsive force. A possible mixture of the base fluid into the intermediate fluid 190, which would cause the flow-out of the base fluid from the sealing gap 7176g into the intermediate fluid chamber 7178, can be suppressed.

As above, the possible flow-out of the magnetic viscous fluid 140 from the sealing gap 7176g into the intermediate fluid chamber 7178 can be suppressed. It is thereby possible to avoid the situation in which the braking characteristic may be changed due to change of property of the magnetic viscous fluid 140. It is, therefore, possible to maintain adjusting accuracy for the engine operation phase by the valve timing adjusting apparatus.

In addition, according to the tenth embodiment, as in the same manner to the first embodiment, since the magnetic particles 140p of the magnetic viscous fluid 140, to which the base fluid of the non-polar liquid is attached, repels the intermediate fluid 190 of the polar liquid, the possible flow-out of the magnetic particles 140p from the sealing gap 7176g into the intermediate fluid chamber 7178 and the possible flow to the fluid sealing member 180 can be suppressed. Even if the magnetic particles 140p flew out into the intermediate fluid chamber 7178, the magnetic particles could hardly reach at the fluid sealing member 180 because of a distance between the sealing gap 7176g and the fluid sealing member 180. Accordingly, even when the surface pressure on the boundary surface 187, at which the fluid sealing member 180 is brought into the sliding contact with the brake shaft 131B, is decreased, it is possible to avoid such situation that the magnetic particles 140p enter into the boundary surface 187 and thereby the frictional resistance is increased. Accordingly, the durability of the hydraulic device can be increased.

(Eleventh Embodiment)

Figure 19:
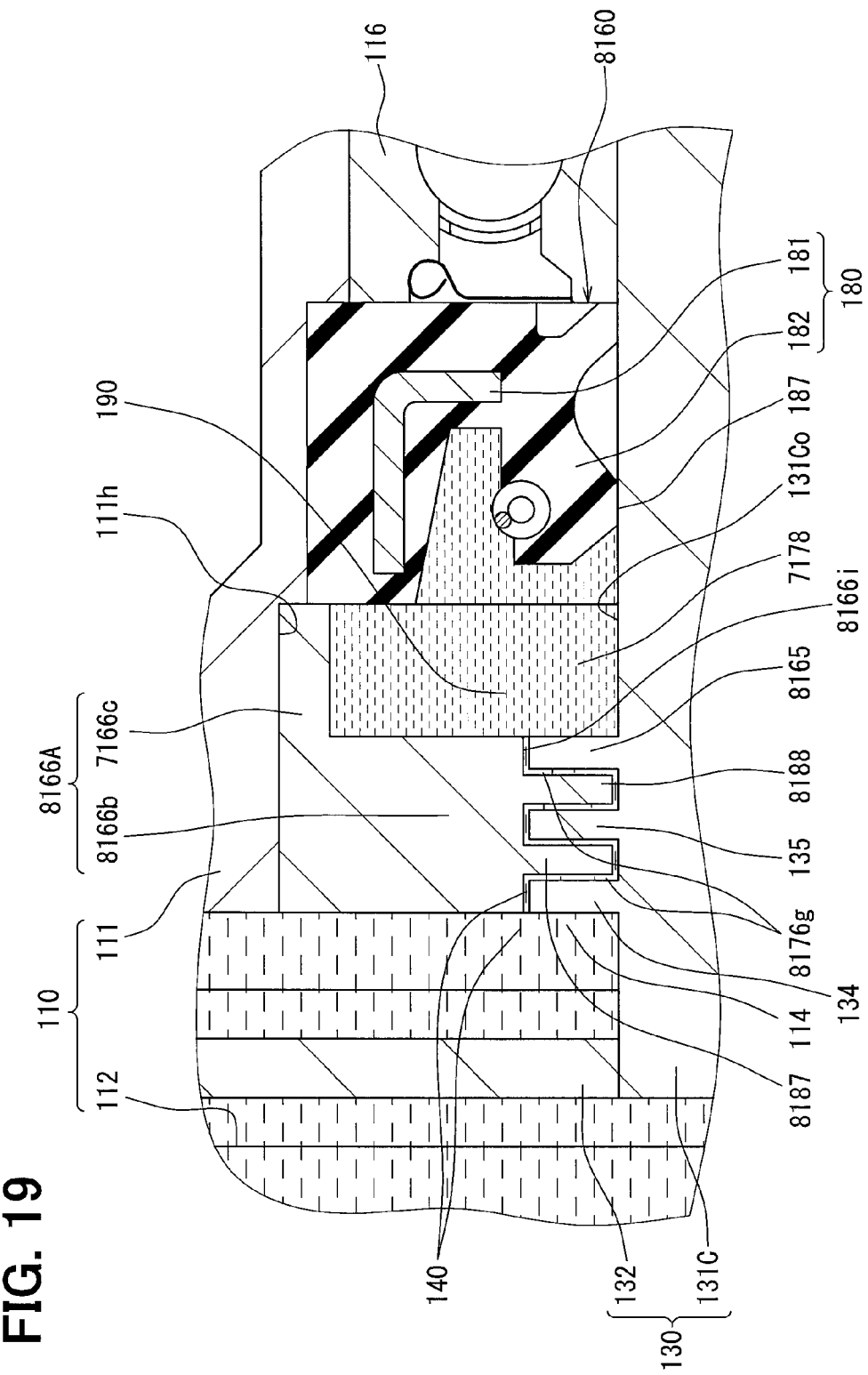
FIG. 19 is a schematically enlarged cross sectional view showing a sealing structure according to an eleventh embodiment of the present disclosure.

An eleventh embodiment of the present disclosure is a modification of the tenth embodiment. As shown in FIG. 19, a sealing structure 8160 has a magnetic shielding member 8166A working as the particle sealing member. The magnetic shielding member 8166A has a bottom wall portion 8166b, an inner periphery 8166i of which is formed with multiple annular projections 8187 and 8188, in place of the taper-shaped inner periphery 7166i of the tenth embodiment. The magnetic shielding member 8166A also functions as "a labyrinth sealing member".

In the present embodiment, two annular projections 8187 and 8188 (also referred to as labyrinth projections) are formed at the inner periphery 8166i at a predetermined distance from each other in the axial direction. Each of the labyrinth projections 8187 and 8188 is formed in an annular plate shape continuously extending in the rotating direction. The labyrinth projections 8187 and 8188 are coaxially arranged at an outer periphery 131Co of a brake shaft 131C, on which three annular projections 134, 135 and 8165 of an annular plate shape are formed. Each of the labyrinth projections 8187 and 8188 is arranged in respective spaces formed between the neighboring annular projections 134, 135 and 8165 in the axial direction.

According to the above structure, a sealing gap 8176g of a labyrinth shape is formed between the inner periphery 8166i of the magnetic shielding member 8166A (at which the labyrinth projections 8187 and 8188 are formed) and the outer periphery 131Co of the brake shaft 131C (at which the annular projections 134, 135 and 8165 are formed). The sealing gap 8176g has a radial distance (a gap width) and an axial distance (a gap width) (a value of the gap width is "Wg1" (not shown), which is the same to that of the sixth embodiment) and snakes in the axial direction from the housing-inner side to the housing-outer side. The sealing gap 8176g is communicated to the fluid chamber 114. The intermediate fluid chamber 7178 is formed between the sealing gap 8176g and the fluid sealing member 180, as in the same manner to the tenth embodiment.

According to the eleventh embodiment, the magnetic particles 140p of the magnetic viscous fluid 140, which flow from the fluid chamber 114 into the sealing gap 8176g formed between the magnetic shielding member 8166A and the brake shaft 131C, receive flow resistance in the sealing gap 8176g of the labyrinth shape, which snakes in the axial direction from the housing-inner side to the housing-outer side. The flow of the magnetic particles 140p in the axial direction to the housing-outer side (in the right-hand side direction in FIG. 19) is thereby restricted.

Therefore, while the sealing gap 8176g having the appropriate gap width is formed between the magnetic shielding member 8166A and the brake shaft 131C, the sealing gap 8176g surely restricts the flow of the magnetic particles 140p. In other words, the sealing gap 8176g is surely sealed for the flow of the magnetic particles 140p. The frictional resistance to be applied to the brake shaft 131C can be decreased so as to not only improve durability but also avoid the loss of torque.

(Further Embodiments)

The present disclosure should not be limited to the above embodiments. The present disclosure can be modified in various manners without departing from the spirit thereof.

In a first modification (a modification for the first embodiment and the fourth to eleventh embodiments), any fluid other than the polar liquid (for example, silicon oil or the like), which dissolves slightly in the base fluid of the non-polar liquid, may be used as the intermediate fluid 190, so long as such fluid is made of non-magnetic liquid different from the base fluid for the magnetic viscous fluid 140.

In a second modification (a modification for the second embodiment), any fluid other than the polar liquid (for example, silicon oil or the like) may be used as the base fluid for the magnetic viscous fluid 140, so long as such fluid is made of non-magnetic liquid different from the intermediate fluid 190.

In a third modification (a modification for the third embodiment), instead of the non-polar liquid, the polar liquid may be used as the base fluid for the magnetic viscous fluid 140 and the intermediate fluid 190, so long as the base fluid for the magnetic viscous fluid 140 and the intermediate fluid 190 are identical to each other. For example, the same polar liquid to the intermediate fluid 190 of the first embodiment or the same polar liquid to the base fluid for the magnetic viscous fluid 140 of the second embodiment may be used as the polar liquid for the third modification.

In a fourth modification (a modification for the fourth to eleventh embodiments), the component (the fluid) of the base fluid for the magnetic viscous fluid 140 as well as the component (the fluid) of the intermediate fluid 190 may be changed to one of the components (the fluids) of the second embodiment, the third embodiment and the second and third modifications.

In a fifth modification (a modification for the first to eleventh embodiments), functional fluid other than the magnetic viscous fluid 140, for example, magnetic fluid including magnetic particles having an outer diameter ("φp") larger than that of the magnetic particles 140p of the magnetic viscous fluid 140, may be filled into the fluid chamber 114.

Figure 20:
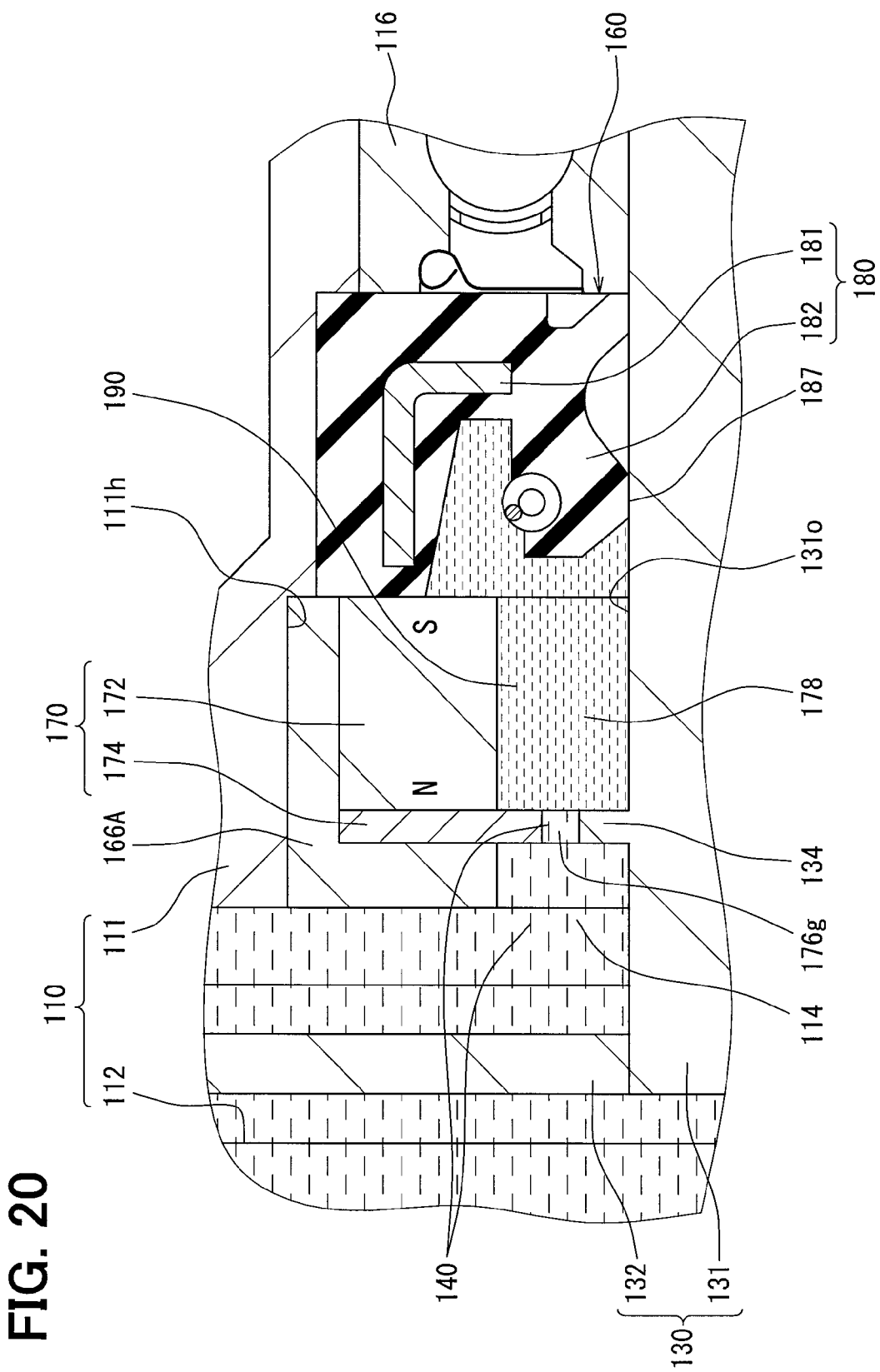
FIG. 20 is a schematically enlarged cross sectional view showing a sealing structure according to a modification of FIG. 5.
Figure 21:
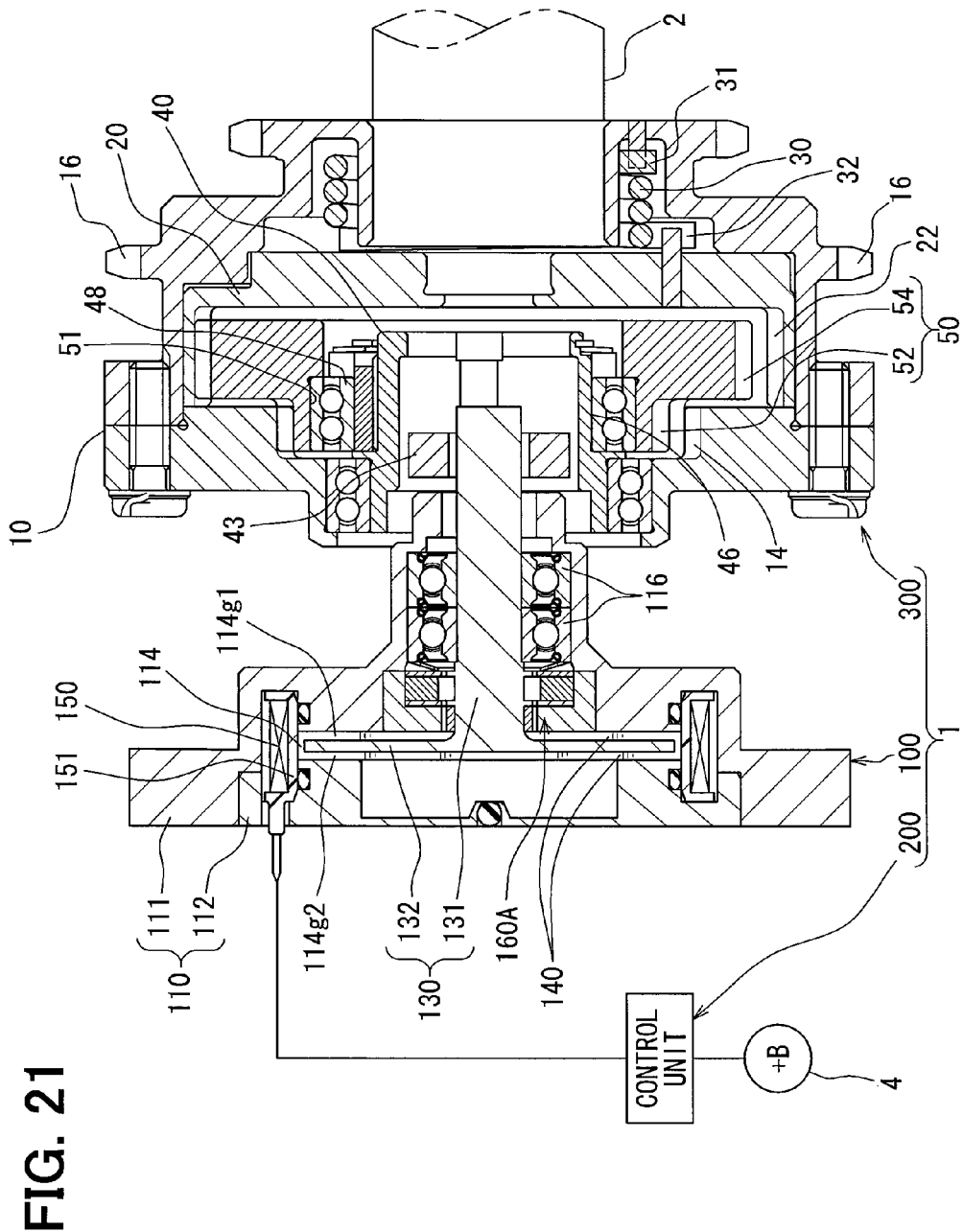
FIG. 21 is a schematic cross sectional view showing a valve timing adjusting apparatus having a hydraulic braking device according to a twelfth embodiment of the present disclosure.

In a sixth modification (a modification for the first to fourth embodiments), one of the annular projections 134 and 135 and/or one of the magnetic-flux guiding plates 174 and 175 may not be always formed. In the modification of FIG. 20 (a modification of the first to third embodiments), the second annular projection 135 and the second magnetic-flux guiding plate 175 are eliminated.

In a seventh modification (a modification for the first to fourth embodiments), multiple magnetic-flux guiding plates may be formed at the housing-inner side and/or the housing-outer side of the permanent magnet 172.

In an eighth modification (a modification for the first to fourth embodiments), the annular projections 134 and 135 may be eliminated.

In a ninth modification (a modification for the first to fourth embodiments), at least one of inner diameters of the inner peripheries of the magnetic-flux guiding plates 174 and 175 may be changed in the axial direction (namely, formed in a tapered shape), as in the same manner to the tenth embodiment (FIGS. 17 and 18). In addition, at least one of the outer diameters of the outer peripheries of the annular projections 134 and 135 may be likewise changed in the axial direction, like the tenth embodiment.

In a tenth modification (a modification for the fifth to eleventh embodiments), the magnetic shielding member 166B, 7166A or 8166A may be made of the magnetic material as a separate or an integral part of the housing 110.

In an eleventh modification (a modification for the fifth, the seventh and the eighth embodiments), a female screw portion may be formed at the inner periphery 2171i, 3171i of the sealing body 2171, 3171, as in the same manner to the ninth embodiment.

In a twelfth modification (a modification for the sixth to eleventh embodiments), the radial distance (the gap width) "Wgs" for the sealing gap 3176g, 7176g, 8176g may be made to be smaller than the outer diameter of the magnetic particles 140p, as in the same manner to the fifth embodiment.

In a thirteenth modification (a modification for the tenth embodiment), the outer diameter of the outer periphery 7164o of the annular projection 7164 may be changed with a change rate, which is different from that for the inner periphery 7166i of the magnetic shielding member 7166A. Alternatively, the outer diameter of the outer periphery 7164o may be maintained at the constant value in the axial direction like the first embodiment.

In a fourteenth modification (a modification for the fifth to eleventh embodiments), any one of the first to eleventh embodiments may be combined to any other one of the fifth to eleventh embodiments.

In a fifteenth modification of the present disclosure, the valve timing adjusting apparatus may be applied to the exhaust valve or both of the intake and exhaust valves. Furthermore, the present disclosure may be applied to various kinds of apparatuses or devices, in which hydraulic braking torque is used.

(Twelfth Embodiment)

A twelfth embodiment of the present disclosure will be explained with reference to the drawings (FIGS. 21 to 24).

Figure 22:
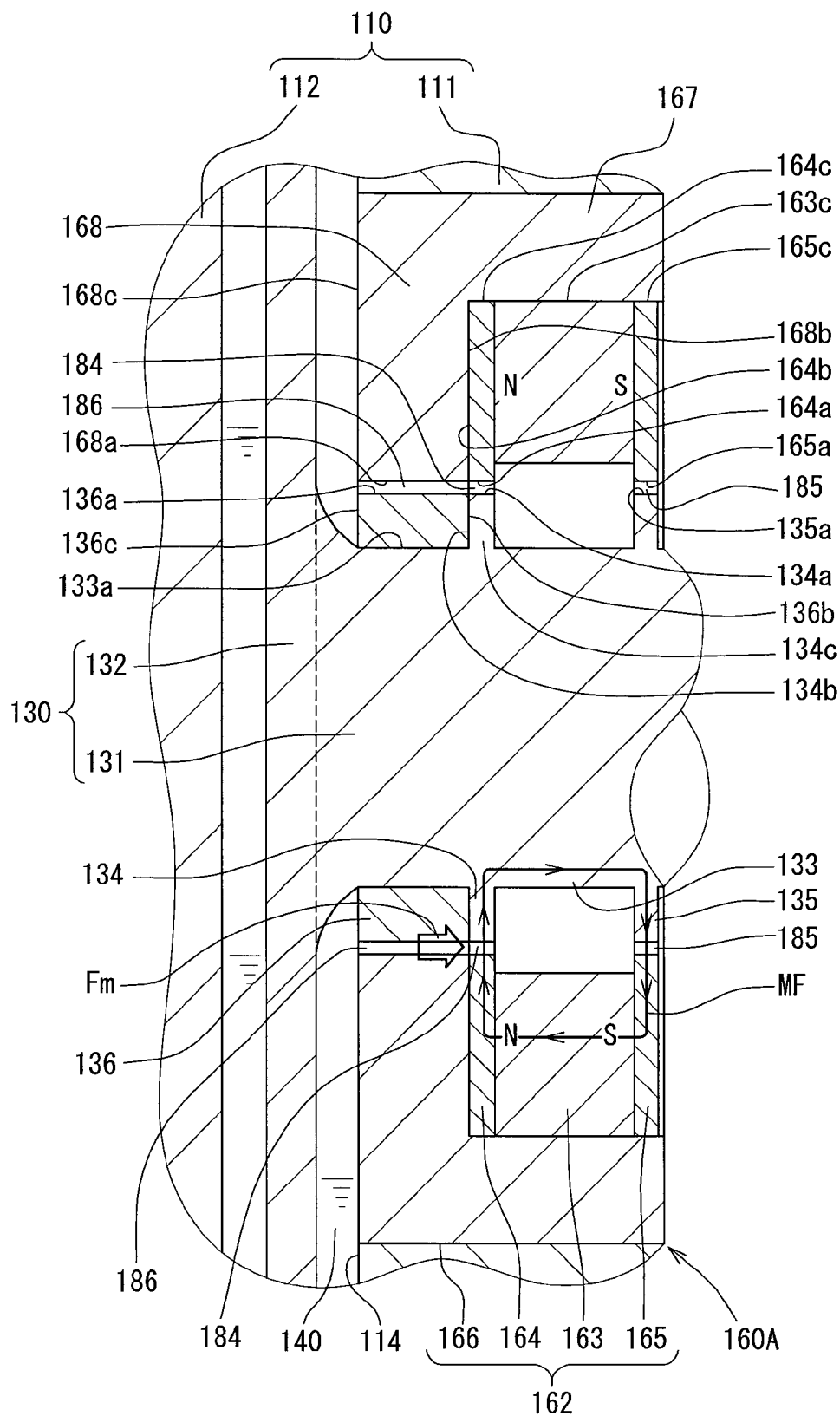
FIG. 22 is a schematically enlarged cross sectional view showing a sealing structure of the hydraulic braking device of FIG. 21.

As shown in FIG. 22, the sealing structure 160A, which seals the fluid chamber 114 (in which the magnetic viscous fluid 140 is filled) from the outside of the housing 110, has a magnetic sealing sleeve unit 162 provided in an inside of the fixed member 111. The magnetic sealing sleeve unit 162 is composed of a magnetic-flux generating member 163 (a permanent magnet 163), a magnetic-flux guiding member including a pair of (first and second) magnetic-flux guiding plates 164 and 165, a first magnetic shielding member 166 of a sleeve-unit side, all of which are coaxially arranged with the brake shaft 131.

Figure 23:
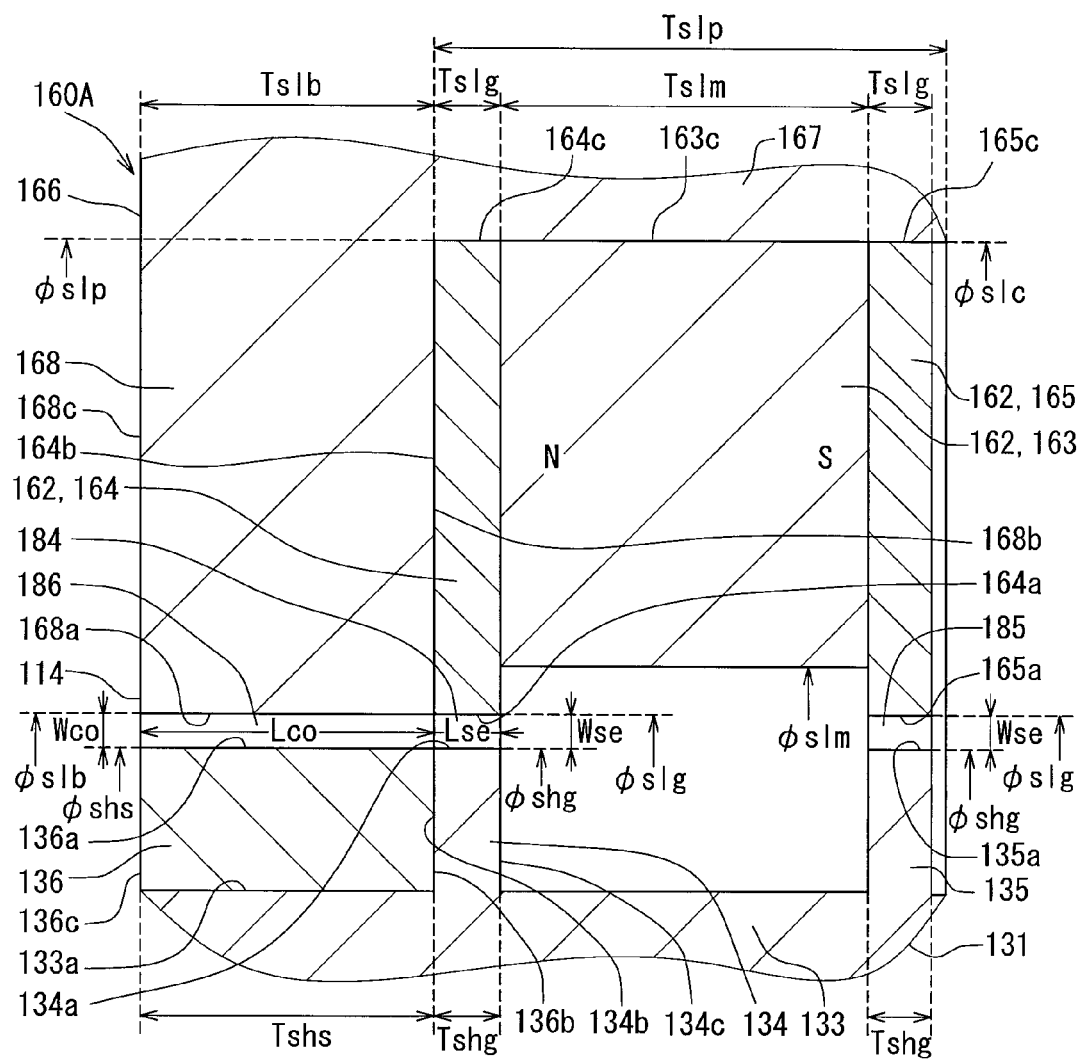
FIG. 23 is a schematically enlarged cross sectional view showing a relevant portion of the sealing structure of FIG. 22.

As shown in FIGS. 22 and 23, the permanent magnet 163 is made of, for example, a ferrite magnet, and formed in a annular disc shape so as to surround the outer periphery 133a of the brake shaft 131. The permanent magnet 163 is magnetized in the axial direction, so that N-pole and S-pole are formed at its axial ends to constantly generate magnetic flux MF between them.

Each of the magnetic-flux guiding plates 164 and 165 is made of magnetic material, such as carbon steel or the like, and formed in an annular disc shape so as to surround the outer periphery 133a of the brake shaft 131. The permanent magnet 163 is interposed between the first and second magnetic-flux guiding plates 164 and 165. A thickness "Tslg" of each magnetic-flux guiding plate 164, 165 is made to be smaller than a thickness "Tslm" of the permanent magnet 163. An inner diameter "φslg" of each magnetic-flux guiding plate 164, 165 is made to be smaller than an inner diameter "φslm" of the permanent magnet 163. An inner peripheral portion 164a, 165a of each magnetic-flux guiding plate 164, 165 is projecting from an inner periphery of the permanent magnet 163 in a radial inward direction toward the outer periphery 133a of the brake shaft 131.

The first magnetic shielding member 166 of the sleeve-unit side is made of non-magnetic material, such as austenitic stainless steel or the like, so as to restrict passing of the magnetic flux MF in the axial direction to the housing-inner side. The first magnetic shielding member 166 is formed in a cylindrical shape having a bottom end (168) so as to surround the outer periphery of the brake shaft 131 in such a way that an open end of a cylindrical wall portion 167 is directed to the housing-outer side while a bottom wall portion 168 (that is, the bottom end) is directed to the housing-inner side. A thickness "Tslp" of the cylindrical wall portion 167 in the axial direction is made to be larger than a total thickness of the magnet 163 and the magnetic-flux guiding plates 164 and 165, that is, "2Tslg+Tslm". An inner diameter "φslp" of the cylindrical wall portion 167 is so made as to be substantially equal to a common outer diameter "φslc" of the magnet 163 and the magnetic-flux guiding plates 164 and 165. The cylindrical wall portion 167 is fitted onto outer peripheral portions 163c, 164c and 165c of the magnet 163 and the magnetic-flux guiding plates 164 and 165.

A thickness "Tslb" of the bottom wall portion 168 in the axial direction is made to be larger than the thickness "Tslg" of the first magnetic-flux guiding plate 164, which is positioned at the housing-inner side of the permanent magnet 163. An inner diameter "φslb" of an inner peripheral portion 168a of the bottom wall portion 168 is made to be substantially equally to the inner diameter "φslg" of the first magnetic-flux guiding plate 164. According to such a structure, an axial end surface 168b of the bottom wall portion 168, which is formed on the housing-outer side of the bottom wall portion 168, is in contact with an axial end surface 164b of the first magnetic-flux guiding plate 164. The axial end surface 164b is formed on the housing-inner side of the first magnetic-flux guiding plate 164. The axial end surface 168b covers all surface area of the axial end surface 164b of the first magnetic-flux guiding plate 164 (which extends from the inner peripheral portion 164a to the outer peripheral portion 164c) from the housing-inner side.

As shown in FIGS. 22 and 23, in addition to the above magnetic sealing sleeve unit 162, the sealing structure 160A has a pair of (first and second) annular projections 134 and 135 formed in the brake shaft 131 and a second magnetic shielding member 136 of a shaft side.

As shown in FIGS. 22 and 23, each of the first and second annular projections 134 and 135 is made of magnetic material, such as the carbon steel or the like, and integrally formed with a shaft body 133 and in an annular disc shape. Each of the annular projections 134 and 135 is respectively surrounded by the first and second magnetic-flux guiding plates 164 and 165. A thickness "Tshg" of each annular projection 134, 135 in the axial direction is made to be substantially equal to the thickness "Tslg" of the magnetic-flux guiding plates 164 and 165. An outer diameter "φshg" of each annular projection 134, 135 in the radial direction is made to be smaller than the inner diameter "φslg" of the magnetic-flux guiding plates 164 and 165.

The first annular projection 134 is projected in a radial outward direction from the outer periphery 133a of the shaft body 133 toward the first magnetic-flux guiding plate 164, so as to form a first annular sealing gap 184 between an outer peripheral portion 134a of the first annular projection 134 and the inner peripheral portion 164a of the first magnetic-flux guiding plate 164. Accordingly, the first annular sealing gap 184 has a constant gap width "Wse" in the radial direction along a circumferential direction of the sealing gap 184. In a similar manner, the second annular projection 135 is projected in a radial outward direction from the outer periphery 133a of the shaft body 133 toward the second magnetic-flux guiding plate 165, so as to form a second annular sealing gap 185 between an outer peripheral portion 135a of the second annular projection 135 and the inner peripheral portion 165a of the second magnetic-flux guiding plate 165. Accordingly, the second annular sealing gap 185 has the constant gap width "Wse" in the radial direction along the circumferential direction of the sealing gap 185.

The second magnetic shielding member 136 of the shaft side is likewise made of non-magnetic material, such as austenitic stainless steel or the like, so as to restrict passing of the magnetic flux MF in the axial direction to the housing-inner side. The second magnetic shielding member 136 is formed in a ring shape and arranged at the outer periphery 133a of the shaft body 133 of the brake shaft 131. The second magnetic shielding member 136 is surrounded by the first magnetic shielding member 166 of the sleeve-unit side. A thickness "Tshs" of the second magnetic shielding member 136 in the axial direction is made to be larger than the thickness "Tshg" of the first annular projection 134, which is positioned on the housing-inner side of the permanent magnet 163. Furthermore, the thickness "Tshs" of the second magnetic shielding member 136 is made to be substantially equal to the thickness "Tslb" of the bottom wall portion 168 of the first magnetic shielding member 166. In addition, an outer diameter "φshs" of the second magnetic shielding member 136 is made to be smaller than the inner diameter "φslb" of the bottom wall portion 168 of the first magnetic shielding member 166, but substantially equal to an outer diameter "φshg" of the first annular projection 134.

According to such a structure, an axial end surface 136b of the second magnetic shielding member 136, which is formed on the housing-outer side of the second magnetic shielding member 136, is in contact with an axial end surface 134b of the first annular projection 134. The axial end surface 134b is formed on the housing-inner side of the first annular projection 134. The axial end surface 136b covers all surface area of the axial end surface 134b of the first annular projection 134 (which extends from the outer peripheral portion 134a to an inner peripheral portion 134c) from the housing-inner side.

In addition, an annular communication gap 186 is formed between an outer peripheral portion 136a of the second magnetic shielding member 136 and the inner peripheral portion 168a of the first magnetic shielding member 166 in the radial direction. The annular communication gap 186 has a constant gap width "Wco" in the radial direction along a circumferential direction of the communication gap 186. The gap width "Wco" is substantially equal to the gap width "Wse" of the first sealing gap 184. The annular communication gap 186 extends in the axial direction from the axial end surface 136b to another axial end surface 136c of the second magnetic shielding member 136, that is, from the axial end surface 168b to another axial end surface 168c of the bottom wall portion 168 of the first magnetic shielding member 166. The annular communication gap 186 has an axial length "Lco", which is larger than an axial length "Lse" of the first sealing gap 184. The fluid chamber 114 is communicated to the first sealing gap 184 via the annular communication gap 186.

As shown in FIG. 22, the magnetic flux MF generated by the permanent magnet 163 is guided from the first magnetic-flux guiding plate 164 to the first annular projection 134 via the first sealing gap 184 and from the second annular projection 135 to the second magnetic-flux guiding plate 165 via the second sealing gap 185. Since each of the magnetic-flux guiding plates 164 and 165 is projected in the radial inward direction and each of the annular projections 134 and 135 is projected in the radial outward direction, the magnetic flux can be intensively guided to the respective sealing gaps 184 and 185.

Figure 24:
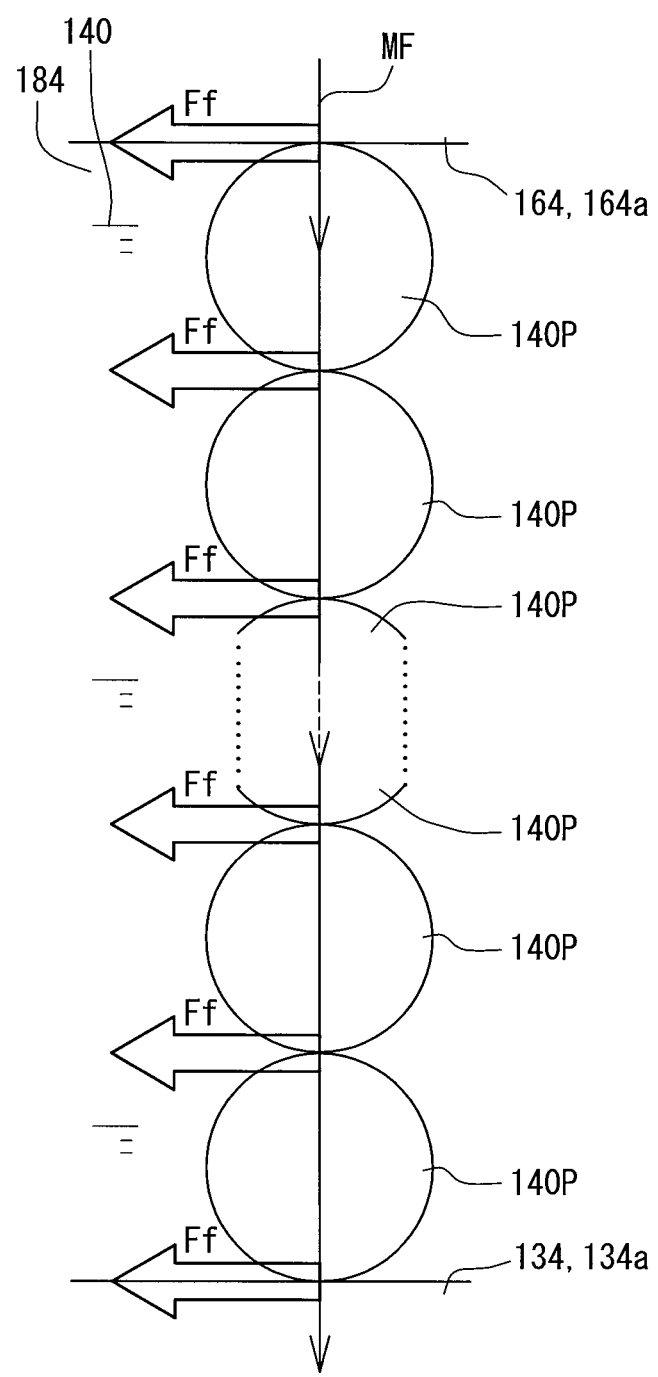
FIG. 24 is a schematic view for explaining sealing function of FIG. 22.

Since the sealing gaps 184 and 185 are communicated to the fluid chamber 114 via the annular communication gap 186, the sealing gaps 184 and 185 are filled with the magnetic viscous fluid 140. The magnetic particles 140p contained in the magnetic viscous fluid 140 are trapped by the magnetic flux MF passing through the respective sealing gaps 184 and 185, to form sealing films having high withstanding pressure, as shown in FIG. 24. The sealing film(s) formed in the sealing gaps 184 and 185 brings out the self-sealing function, according to which flow of the magnetic viscous fluid 140 is restricted by itself in the axial direction from the housing-inner side to the housing-outer side (that is, in the right-hand direction in the drawings).

Since the first magnetic-flux guiding plate 164 is covered by the first magnetic shielding member 166 on the housing-inner side, the magnetic flux MF is allowed to pass from the inner peripheral portion 164a of the first magnetic-flux guiding plate 164 to the sealing gap 184, but the magnetic flux MF is restricted when it is going to pass in the axial direction toward the housing-inner side. In a similar manner, since the first annular projection 134 is covered by the second magnetic shielding member 136 on the housing-inner side, the magnetic flux MF is allowed to pass through from the sealing gap 184 to the outer peripheral portion 134a of the first annular projection 134, but the magnetic flux MF is restricted when it is going to pass in the axial direction toward the housing-inner side. Accordingly, leakage of the magnetic flux MF, which may not pass through the sealing gap 184 (formed between the magnetic-flux guiding plate 164 and the annular projection 134) but may pass through the communication gap 186 (formed between the first and second magnetic shielding members 166 and 136), can be reduced. It is, thereby, possible to suppress a situation that the magnetic particles 140p are collected from the communication gap 186 to such an area neighboring to the sealing gap 184.

Since the communication gap 186 has the axial length "Lco" larger than that "Lse" of the sealing gap 184, and since the communication gap 186 has the gap width "Wco" equal to that "Wse" of the sealing gap 184 over its entire axial length, pressure loss of the magnetic viscous fluid 140 in the communication gap 186 becomes larger than that in the sealing gap 184. It is, therefore, possible to suppress a situation that the magnetic particles 140p in the fluid chamber 114 reach at the outer peripheral portion 134a of the annular projection 134 or the inner peripheral portion 164a of the magnetic-flux guiding plate 164 via the communication gap 186.

According to the above structure and function, a total value of magnetic attracting force "Fm" (FIG. 22) for attracting the magnetic particles 140p in the direction from the housing-inner side to the sealing gap 184 is made to be smaller than a total value of the friction force "Ff" (FIG. 24) acting in the sealing gap 184 between the magnetic-flux guiding plate 164 and the magnetic particles 140p, between the annular projection 134 and the magnetic particles 140p and between the magnetic particles 140p themselves. The leakage of the magnetic particles 140p, which may be caused by the attraction of the magnetic particles 140p from the housing-inner side, can hardly occur in the direction from the sealing gap 184 to the housing-outer side. Accordingly, the magnetic particles 140p are trapped in the sealing gap 184 to form the sealing films and the self-sealing function, which is performed by the sealing films having the high withstanding pressure, can be maintained. Thus, variation of the braking characteristic can be avoided.

In addition, according to the sealing structure 160A of the present embodiment, the annular communication gap 186 is formed between the fluid chamber 114 and the first sealing gap 184 by the inner peripheral portion 168a of the bottom wall portion 168, so that the inner diameter "φslb" of the inner peripheral portion 168a is equal to the inner diameter "φslg" of the first magnetic-flux guiding plate 164 and the gap width "Wco" of the communication gap 186 is equal to the gap width "Wse" of the sealing gap 184. According to such a structure, sliding resistance (frictional resistance) to be generated between the brake shaft 131 and the magnetic particles 140p, which have entered into the respective gaps 186 and 184, can be controlled at an appropriate value. The variation of the braking characteristic, which may be caused by the sliding resistance (the frictional resistance) generated between the brake shaft 131 and the magnetic particles 140p having entered the respective gaps 186 and 184, can be avoided.

In addition, according to the sealing structure 160A of the present embodiment, the whole area of the axial end surface 164b of the first magnetic-flux guiding plate 164 on the housing-inner side (from the inner peripheral portion 164a to the outer peripheral portion 164c) is covered by the first magnetic shielding member 166. As a result, it is possible to prevent the magnetic particles 140p from being trapped at any portion of the axial end surface 164b and thereby prevent the magnetic flux MF passing through the sealing gap 184 from being changed by such magnetic particles 140p. In the similar manner, the whole area of the axial end surface 134b of the first annular projection 134 on the housing-inner side (from the outer peripheral portion 134a to the inner peripheral portion 134c) is covered by the second magnetic shielding member 136. It is, therefore, possible to prevent the magnetic particles 140p from being trapped at any portion of the axial end surface 134b and thereby to prevent the magnetic flux MF passing through the sealing gap 184 from being changed by such magnetic particles 140p. Thus, the sealing films can be stably formed by the passing of the magnetic flux MF in the sealing gap 184, to thereby stably bring out the self-sealing function and to avoid the variation of the braking characteristic.

As a result that the variation of the braking characteristic can be avoided by the hydraulic braking device 100, the valve timing adjusting apparatus 1 can maintain the high accuracy for adjusting the engine operational phase. In addition, since the sealing films are formed by the magnetic viscous fluid 140 in the hydraulic braking device 100 and thereby the sliding resistance (the frictional resistance) to be applied to the brake shaft 131 during its rotation can be reduced, the possible loss of the torque which might be caused by the sliding resistance (in other words, the decrease of the fuel consumption ratio) can be avoided.

(Thirteenth Embodiment)

Figure 25:
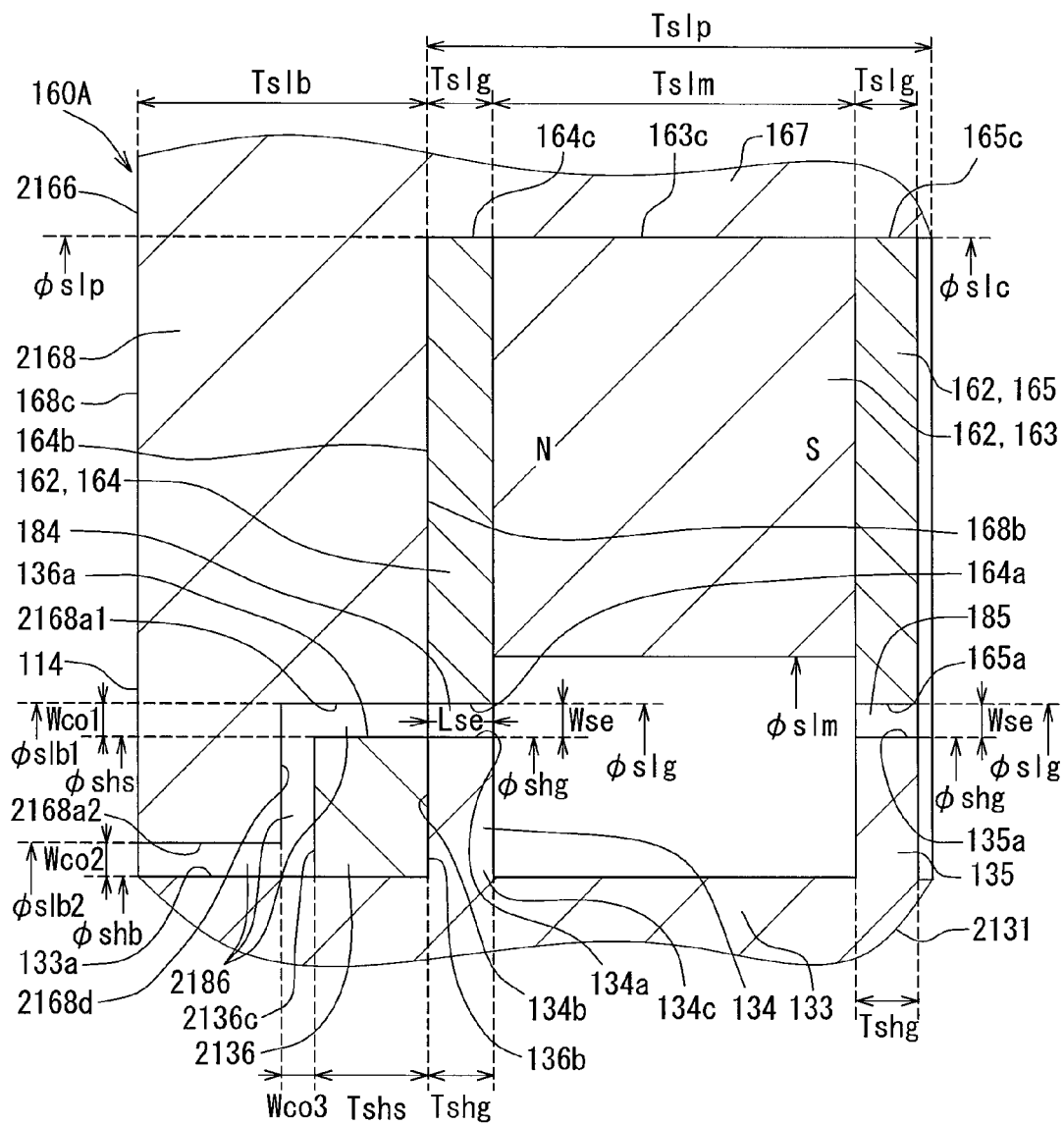
FIG. 25 is a schematically enlarged cross sectional view showing a sealing structure according to a thirteenth embodiment of the present disclosure.

As shown in FIG. 25, a thirteenth embodiment of the present disclosure is a modification of the twelfth embodiment (FIG. 23). In the present embodiment, a bottom wall portion 2168 of a first magnetic shielding member 2166 has a first inner peripheral portion 2168a1 and a second inner peripheral portion 2168a2, which are connected by a radial flat surface 2168d to each other. The first inner peripheral portion 2168a1 has an inner diameter "$\phi slb1$" equal to the inner diameter "$\phi slg$" of the first magnetic-flux guiding plate 164, while the second inner peripheral portion 2168a2 has an inner diameter "$\phi slb2$" smaller than that "$\phi slg$" of the first magnetic-flux guiding plate 164.

In a brake shaft 2131 of the present embodiment, the outer diameter "$\phi shs$" of the outer peripheral portion 136a of a second magnetic shielding member 2136 of the shaft side is made to be larger than the inner diameter "$\phi slb2$" of the second inner peripheral portion 2168a2 of the bottom wall portion 2168, while an outer diameter "$\phi shb$" of the outer periphery 133a of the shaft body 133 is made to be smaller than the inner diameter "$\phi slb2$" of the second inner peripheral portion 2168a2. A thickness "Tshs" of the second magnetic shielding member 2136 in the axial direction is made to be larger than the thickness "Tshg" of the first annular projection 134 but smaller than the thickness "Tslb" of the bottom wall portion 2168. According to the above structure, an annular communication gap 2186 is formed between the outer peripheral portion 136a and the first inner peripheral portion 2168a1, between the outer periphery 133a and the second inner peripheral portion 2168a2, and between the radial flat surface 2168d and an axial end surface 2136c of the second magnetic shielding member 2136 on the housing-inner side.

A gap width "Wco1" of the communication gap 2186, which is formed between the outer peripheral portion 136a of the second magnetic shielding member 2136 and the first inner peripheral portion 2168a1 of the first magnetic shielding member 2166, is made to be substantially equal to the gap width "Wse" of the first sealing gap 184. The gap width "Wco1" is constant in the axial direction as well as in the rotating direction. A gap width "Wco2" of the communication gap 2186, which is formed between the outer periphery 133a of the brake shaft 2131 and the second inner peripheral portion 2168a2, is made to be substantially equal to the gap width "Wse" of the first sealing gap 184. The gap width "Wco2" is likewise constant in the axial direction and in the rotating direction. A gap width (an axial distance) "Wco3" of the communication gap 2186, which is formed between the axial end surface 2136c and the radial flat surface 2168d, is made to be substantially equal to the gap width "Wse" of the first sealing gap 184. The gap width "Wco3" is likewise constant in the radial direction and in the rotating direction.

According to the present embodiment, the communication gap 2186 is formed between the fluid chamber 114 and the first sealing gap 184 in the axial direction and in a labyrinth structure from the axial end surface 168c (of the housing-inner side) to the other axial end surface 168b (of the housing-outer side) of the bottom wall portion 2168. And an axial length of the communication gap 2186 is larger than the axial length "Lse" of the first sealing gap 184. The same function and the same operation to those of the twelfth embodiment can be obtained in the present embodiment. The self-sealing function, which is achieved by the sealing films having the high withstanding pressure, can be maintained so as to avoid the variation of the braking characteristic.

In addition, since the length of the communication gap 2186 is made to be much larger between the fluid chamber 114 and the first sealing gap 184 due to meandering of a fluid passage of the labyrinth structure, the pressure loss can be increased when the magnetic particles pass through the communication gap 2186. The magnetic particles 140p (not shown) of the magnetic viscous fluid can hardly reach at the inner peripheral portion 164a of the magnetic-flux guiding plate 164 or at the outer peripheral portion 134a of the annular projection 134, so that the variation of the braking characteristic can be surely avoided.

In addition, the inner diameters "$\phi slb1$" and "$\phi slb2$" for the first and second inner peripheral portions 2168a1 and 2168a2 of the first magnetic shielding member 2166 are made to be such values, which are equal to or smaller than the inner diameter "$\phi slg$" of the magnetic-flux guiding plate 164. Since the sliding resistance (the frictional resistance), which is applied by the magnetic particles 140p having entered the communication gap 2186 to the brake shaft 2131, can be made smaller, it is possible to avoid the variation of the braking characteristic caused by the sliding resistance (the frictional resistance).

(Fourteenth Embodiment)

Figure 26:
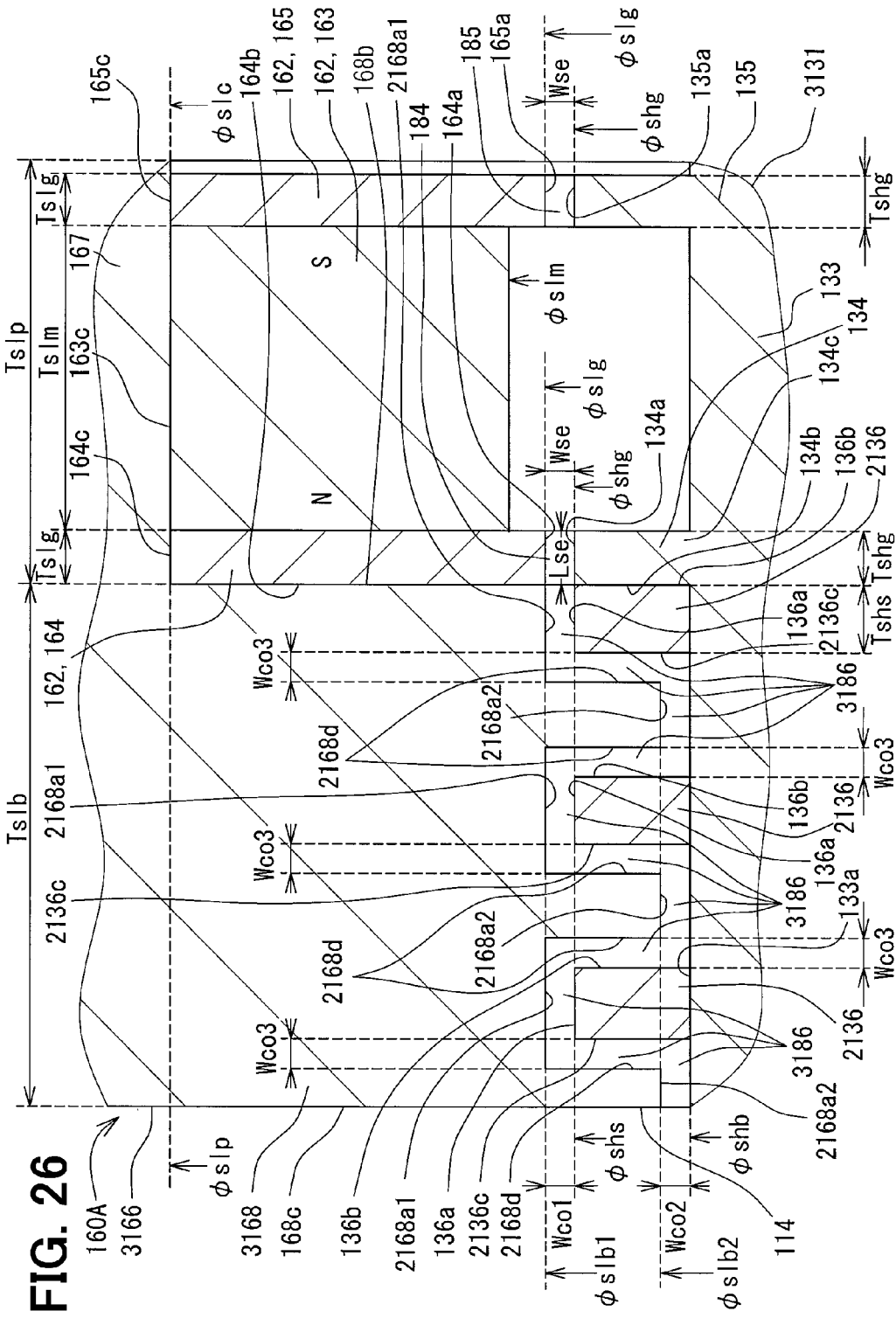
FIG. 26 is a schematically enlarged cross sectional view showing a sealing structure according to a fourteenth embodiment of the present disclosure.

As shown in FIG. 26, a fourteenth embodiment of the present disclosure is a modification of the thirteenth embodiment (FIG. 25). In the present embodiment, a bottom wall portion 3168 of a first magnetic shielding member 3166 has multiple first inner peripheral portions 2168a1 and multiple second inner peripheral portions 2168a2, which are alternately arranged in the axial direction. Each of the first inner peripheral portions 2168a1 has the inner diameter "$\phi slb1$", while each of the second inner peripheral portions 2168a2 has the inner diameter "$\phi slb2$". Each of the first inner peripheral portions 2168a1 and each of the second inner peripheral portions 2168a2 are connected to each other by respective radial flat surfaces 2168d. Multiple second magnetic shielding members 2136 of the shaft side are provided on a brake shaft 3131, wherein each of the second magnetic shielding members 2136 is arranged in an inside space of the respective first inner peripheral portions 2168a1. According to the above structure, a communication gap 3186 is respectively formed between each outer peripheral portion 136a of the second magnetic shielding member 2136 and each of the first inner peripheral portions 2168a1, between the outer periphery 133a of the shaft body 133 and each of the second inner peripheral portions 2168a2, between each radial flat surface 2168d and each axial end surface 2136c of the second magnetic shielding member 2136 on the housing-inner side, and between each radial flat surface 2168d on the other side and each axial end surface 136b of the second magnetic shielding member 2136 on the housing-outer side.

According to the present embodiment, the communication gap 3186 is formed between the fluid chamber 114 and the first sealing gap 184 in the axial direction and in a labyrinth structure from the axial end surface 168c (of the housing-inner side) to the other axial end surface 168b (of the housing-outer side) of the bottom wall portion 3168. And an axial length of the communication gap 3186 is larger than the axial length "Lse" of the first sealing gap 184. The pressure loss can be increased when the magnetic particles pass through the communication gap 3186. The magnetic particles 140p (not shown) of the magnetic viscous fluid can hardly reach at the inner peripheral portion 164a of the magnetic-flux guiding plate 164 or at the outer peripheral portion 134a of the annular projection 134, so that the variation of the braking characteristic can be surely avoided.

(Fifteenth Embodiment)

Figure 27:
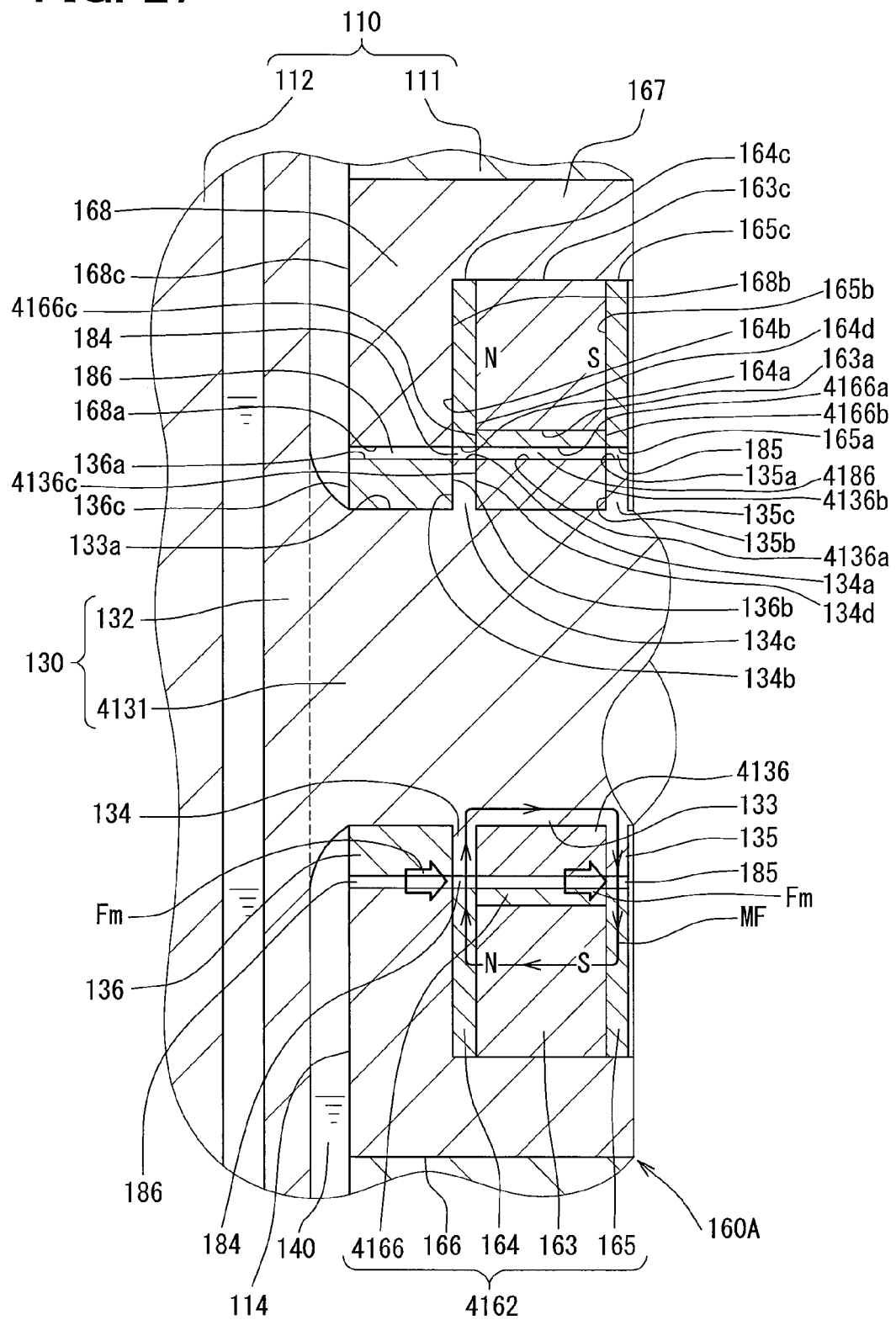
FIG. 27 is a schematically enlarged cross sectional view showing a sealing structure according to a fifteenth embodiment of the present disclosure.
Figure 28:
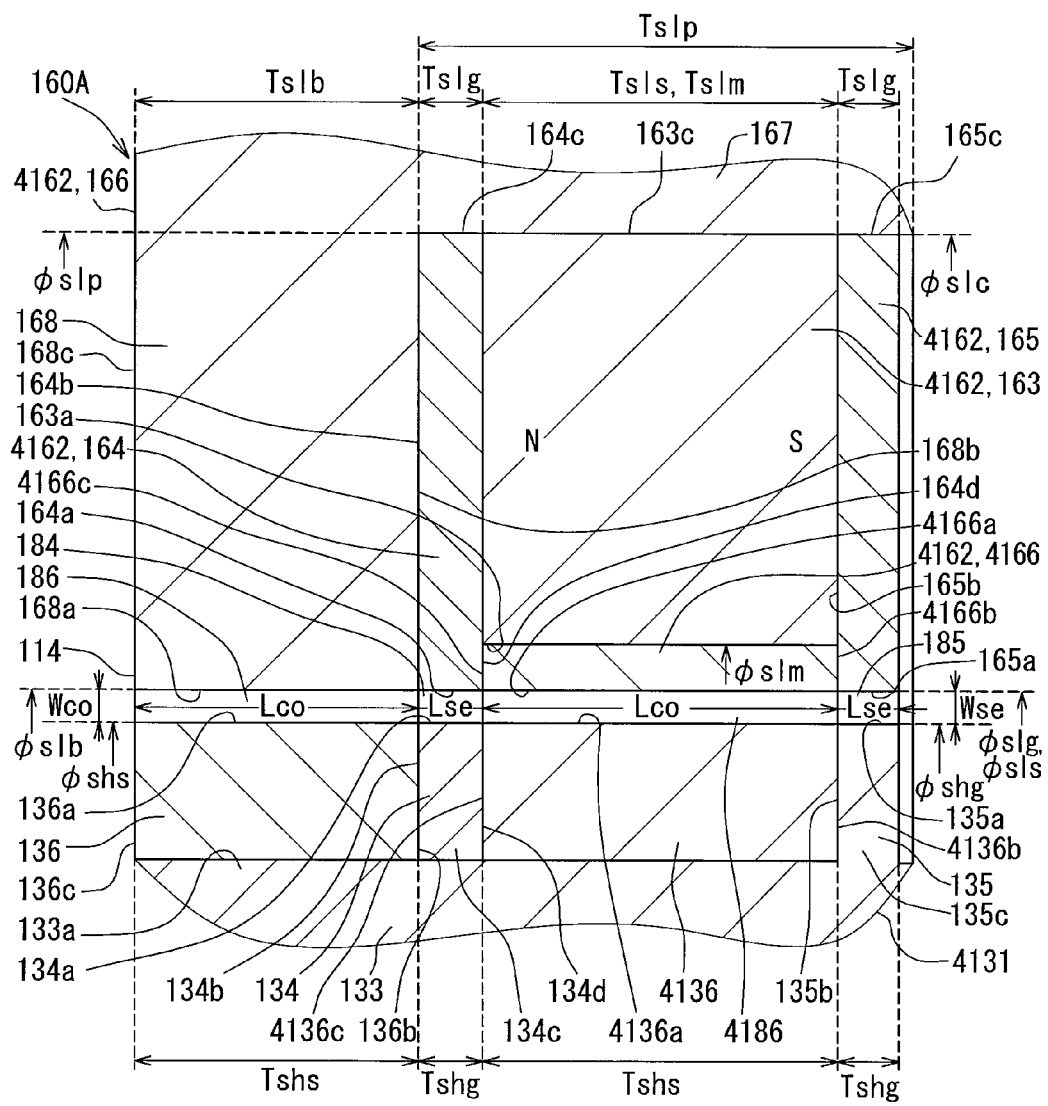
FIG. 28 is a schematically enlarged cross sectional view showing a relevant portion of the sealing structure of FIG. 27.

As shown in FIGS. 27 and 28, a fifteenth embodiment of the present disclosure is a modification of the twelfth embodiment (FIGS. 22 and 23). A magnetic sealing sleeve unit 4162 of the fifteenth embodiment has a third magnetic shielding member 4166 of the sleeve-unit side, which is a separate member from the first magnetic shielding member 166 and formed in a cylindrical shape. The third magnetic shielding member 4166 is arranged at an inner peripheral side of the permanent magnet 163 (that is, in an inside space of the inner periphery 163a of the permanent magnet 163) between the first and second magnetic-flux guiding plates 164 and 165. The third magnetic shielding member 4166 is further coaxially arranged with the shaft body 133 so as to surround the outer periphery 133a of the shaft body 133. A thickness "Tsls" of the third magnetic shielding member 4166 in the axial direction is made to be larger than that "Tslg" of each magnetic-flux guiding plate 164, 165 but to be substantially equal to that "Tslm" of the permanent magnet 163. Furthermore, an inner diameter "φsls" of an inner peripheral portion 4166a of the third magnetic shielding member 4166 is made to be substantially equal to that "φslg" of each magnetic-flux guiding plate 164, 165.

An axial end surface 4166c of the third magnetic shielding member 4166 (that is, a left-hand side surface in the drawings) is in contact with a part of the axial end surface 164d of the first magnetic-flux guiding plate 164 (that is, the axial end surface on the housing-outer side), which is projected in the radial inward direction from the inner periphery 163a of the permanent magnet 163. In other words, the third magnetic shielding member 4166 covers the axial end surface 164d of the first magnetic-flux guiding plate 164 from the housing-outer side, that is the axial end surface 164d of the inner peripheral portion 164a projecting in the radial inward direction.

In a similar manner, an axial end surface 4166b of the third magnetic shielding member 4166 (that is, a right-hand side surface in the drawings) is in contact with a part of the axial end surface 165b of the second magnetic-flux guiding plate 165, that is, the axial end surface 165b of the inner peripheral portion 165a (on the housing-inner side). In other words, the third magnetic shielding member 4166 covers the axial end surface 165b of the second magnetic-flux guiding plate 165 from the housing-inner side (for such an inner peripheral portion 165a projecting in the radial inward direction from the inner periphery 163a of the magnet 163).

A brake shaft 4131 has a fourth magnetic shielding member 4136 of the shaft side, which is a separate member from the second magnetic shielding member 136. The fourth magnetic shielding member 4136 is formed in a cylindrical shape and arranged on the shaft body 133 between the first and second annular projections 134 and 135, each of which is projected in the radial outward direction from the shaft body 133 toward the first and second magnetic-flux guiding plates 164 and 165. The fourth magnetic shielding member 4136 is coaxially arranged with the brake shaft 4131, so that its outer peripheral portion 4136a is surrounded by the third magnetic shielding member 4166 of the sleeve-unit side.

A thickness "Tshs" of the fourth magnetic shielding member 4136 in the axial direction is made to be larger than that "Tshg" of each annular projection 134, 135 but to be substantially equal to that "Tslm" of the permanent magnet 163 as well as that "Tsls" of the third magnetic shielding member 4166 of the sleeve-unit side. In addition, an outer diameter "φshs" of the outer peripheral portion 4136a of the fourth magnetic shielding member 4136 is made to be smaller than an inner diameter "φslb" of an inner peripheral portion 4166a of the third magnetic shielding member 4166 but to be substantially equal to the outer diameter "φshg" of the outer peripheral portion 134a, 135a of each annular projection 134, 135.

An axial end surface 4136c of the fourth magnetic shielding member 4136 (that is, a left-hand side surface in the drawings) is in contact with an axial end surface 134d of the first annular projection 134 (that is, the axial end surface on the housing-outer side thereof), so as to cover the whole axial end surface 134d of the first annular projection 134 from the housing-outer side.

In a similar manner, an axial end surface 4136b of the fourth magnetic shielding member 4136 (that is, a right-hand side surface in the drawings) is in contact with an axial end surface 135b of the second annular projection 135 (that is, the axial end surface on the housing-inner side thereof), so as to cover the whole axial end surface 135b of the second annular projection 135 from the housing-inner side.

An annular communication gap 4186 is formed between the inner peripheral portion 4166a of the third magnetic shielding member 4166 and the outer peripheral portion 4136a of the fourth magnetic shielding member 4136 and formed in an annular shape. A gap width "Wco" of the annular communication gap 4186 in the radial direction is made to be substantially equal to that "Wse" of the second sealing gap 185. The gap width "Wco" is constant in the axial direction as well as in the rotating direction. The annular communication gap 4186 extends in the axial direction between the axial end surfaces 4166b and 4166c of the third magnetic shielding member 4166 and between the axial end surfaces 4136b and 4136c of the fourth magnetic shielding member 4136. The annular communication gap 4186, an axial length "Lco" of which is longer than that "Lse" of each sealing gap 184, 185, is communicated to the fluid chamber 114 via the communication gap 186 and the first sealing gap 184.

Since the inner peripheral portion 165a of the second magnetic-flux guiding plate 165 (which is projected in the radial inward direction from the permanent magnet 163) is covered by the third magnetic shielding member 4166 on the housing-inner side, passing of the magnetic flux MF is restricted in the axial direction from the inner peripheral portion 165a toward the housing-inner side. In a similar manner, since the second annular projection 135 is covered by the fourth magnetic shielding member 4136 on the housing-inner side, the passing of the magnetic flux MF is restricted in the axial direction from the second annular projection 135 toward the housing-inner side. A leakage amount of the magnetic flux MF, which may be leaked from the inner peripheral portion 165a of the second magnetic-flux guiding plate 165 and/or from the outer peripheral portion 135a of the second annular projection 135 to the annular communication gap 4186, can be made smaller. It is, thereby, possible to suppress a situation that the magnetic particles 140*p* (not shown) contained in the magnetic viscous fluid 140 are collected from the communication gap 4186 to such an area neighboring to the second sealing gap 185. In the same manner, it is possible to suppress a situation that the magnetic particles (140*p*) contained in the magnetic viscous fluid 140 are collected from the communication gap 4186 to such an area neighboring to the first sealing gap 184.

In the sealing gaps 184 and 185, the density of the magnetic flux passing therethrough is increased by the annular projections 134 and 135. However, according to the above structure and function of the present embodiment, the magnetic attracting force "Fm" (shown in FIG. 27) for pulling the magnetic particles (140*p*) from the communication gaps 186 and 4186 into the respective sealing gaps 184 and 185 can be suppressed to a smaller value. The self-sealing function is maintained by the sealing films having high withstanding pressure and the variation of the braking characteristic can be avoided.

In addition, since the axial end surfaces 164*d* and 165*b* of the inner peripheral portions 164*a* and 165*a* of the respective magnetic-flux guiding plates 164 and 165 are covered by the third magnetic shielding member 4166 of the sleeve-unit side, the passing of the magnetic flux MF is restricted in a short-circuit path between the inner peripheral portions 164*a* and 165*a* via the magnetic particles (140*p*). In a similar manner, since the axial end surfaces 134*d* and 135*b* of the respective annular projections 134 and 135 are covered by the fourth magnetic shielding member 4136 of the shaft side, a short-circuit of the magnetic flux MF via the magnetic particles (140*p*) is restricted between the annular projections 134 and 135.

Accordingly, the leakage of the magnetic flux MF in the axial direction can be suppressed respectively between the magnetic-flux guiding plates 164 and 165 and between the annular projections 134 and 135. In addition, the collection of the magnetic particles (140*p*) to the areas neighboring to the sealing gaps 184 and/or 185 can be suppressed, as explained above. The magnetic particles (140*p*) can hardly leak from the sealing gaps 184 and 185. The variation of the braking characteristic can be thus avoided.

(Sixteenth Embodiment)

Figure 29:
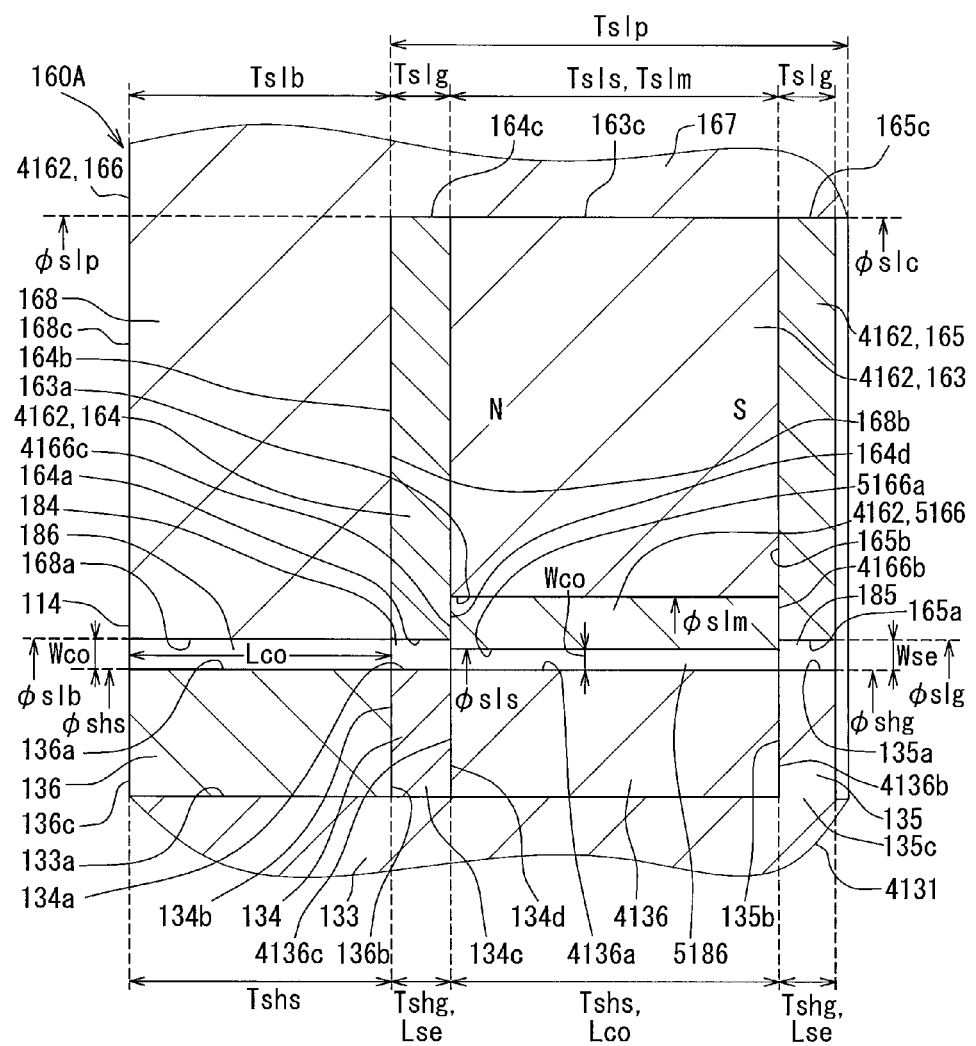
FIG. 29 is a schematically enlarged cross sectional view showing a sealing structure according to a sixteenth embodiment of the present disclosure.

A sixteenth embodiment of the present disclosure is a modification of the fifteenth embodiment (FIG. 28). As shown in FIG. 29, an inner diameter "φsls" of an inner peripheral portion 5166*a* of a third magnetic shielding member 5166 is made to be smaller than that "φslg" of each inner peripheral portion 164*a*, 165*a* of the first and second magnetic-flux guiding plates 164 and 165, but to be larger than that "φshg" of each outer peripheral portion 134*a*, 135*a* of the first and second annular projections 134 and 135. An annular communication gap 5186 is formed between the inner peripheral portion 5166*a* of the third magnetic shielding member 5166 and the outer peripheral portion 4136*a* of the fourth magnetic shielding member 4136. A gap width "Wco" of the communication gap 5186 is, therefore, smaller than that "Wse" of the sealing gap 185. The gap width "Wco" is constant in the axial direction as well as in the rotating direction.

According to the above structure of the present embodiment, the function for restricting the flow and/or movement of the magnetic particles in the axial direction to the second sealing gap 185 is increased due to the narrower communication gap 5186. The self-sealing function is maintained by the sealing films having high withstanding pressure and the variation of the braking characteristic can be avoided.

(Seventeenth Embodiment)

Figure 30:
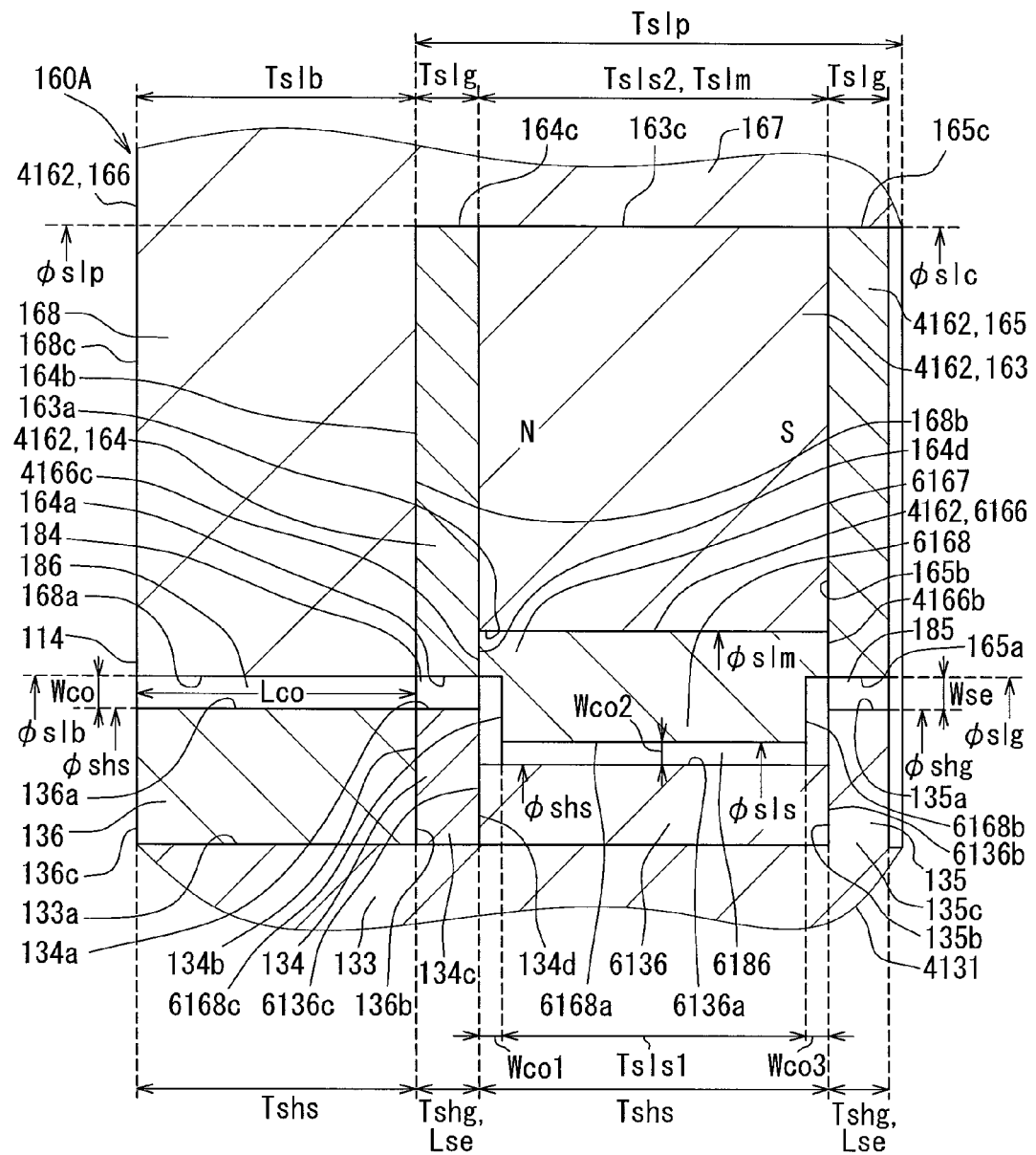
FIG. 30 is a schematically enlarged cross sectional view showing a sealing structure according to a seventeenth embodiment of the present disclosure.

A seventeenth embodiment of the present disclosure is a modification of the fifteenth embodiment (FIG. 28). As shown in FIG. 30, a third magnetic shielding member 6166 of a cylindrical shape has a main body portion 6167 (which is substantially identical to the third magnetic shielding member 4166 of the fourth embodiment) and a projecting portion 6168 projecting from the main body portion 6167 in a radial inward direction. A thickness "Tsls1" of the projecting portion 6168 in the axial direction is made to be smaller than that "Tsls2" of the main body portion 6167. An inner diameter "φsls" of an inner peripheral portion 6168*a* of the projecting portion 6168 is made to be smaller than that "φshg" of each outer peripheral portion 134*a*, 135*a* of the annular projections 134 and 135. The projecting portion 6168 is, therefore, projected into a space between the first and second annular projections 134 and 135.

A fourth magnetic shielding member 6136 of the shaft side is formed in a cylindrical shape. An outer diameter "φshs" of an outer peripheral portion 6136*a* of the fourth magnetic shielding member 6136 is made to be smaller than the inner diameter "φsls" of the inner peripheral portion 6168*a* of the projecting portion 6168 and the outer diameter "φshg" of each annular projection 134, 135. The structure of the fourth magnetic shielding member 6136, except for the above dimension, is the same to that of the fourth magnetic shielding member 4136 of the fifteenth embodiment.

An axial end surface 6136*c* of the fourth magnetic shielding member 6136 (that is, a left-hand side surface in the drawing) is in contact with a part of the axial end surface 134*d* of the first annular projection 134, more exactly, in contact with the axial end surface 134*d* of the inner peripheral portion 134*c* of the first annular projection 134 in the radial and rotating direction. In a similar manner, an axial end surface 6136*b* of the fourth magnetic shielding member 6136 (that is, a right-hand side surface in the drawing) is in contact with a part of the axial end surface 135*b* of the second annular projection 135, more exactly, in contact with the axial end surface 135*b* of the inner peripheral portion 135*c* of the second annular projection 135 in the radial and rotating direction.

A communication gap 6186 is respectively formed between the axial end surface 134*d* of the first annular projection 134 and an axial end surface 6168*c* of the projecting portion 6168, between the outer peripheral portion 6136*a* of the fourth magnetic shielding member 6136 and the inner peripheral portion 6168*a* of the projecting portion 6168, and between the axial end surface 135*b* of the second annular projection 135 and an axial end surface 6168*b* of the projecting portion 6168.

A gap width "Wco1" in the axial direction between the axial end surfaces 134*d* and 6168*c* is made to be smaller than the gap width "Wse" of the sealing gap 185. The gap width "Wco1" is constant in the radial and rotating direction. A gap width "Wco2" in the radial direction between the outer peripheral portion 6136*a* and the inner peripheral portion 6168*a* is made to be smaller than the gap width "Wse" of the sealing gap 185. The gap width "Wco2" is constant in the axial and rotating direction. A gap width "Wco3" in the axial direction between the axial end surfaces 135*b* and 6168*b* is made to be smaller than the gap width "Wse" of the sealing gap 185. The gap width "Wco3" is constant in the radial and rotating direction.

The communication gap 6186, which is formed between the axial end surfaces 4166*b* and 4166*c* of the main body portion 6167 of the third magnetic shielding member 6166, is formed in a labyrinth structure snaking between them. An axial length of the communication gap 6186 is larger than the axial length "Lse" of the sealing gap 185. Therefore, as in the same manner to the fifteenth embodiment, the self-sealing function is maintained by the sealing films having high withstanding pressure and the variation of the braking characteristic can be avoided.

In addition, since the third magnetic shielding member 6166 of the sleeve-unit side is projected into the space between the first and second annular projections 134 and 135, the passing of the magnetic flux MF in the short-circuit path via the magnetic particles 140p (not shown) can be restricted between the first and second annular projections 134 and 135. The leakage of the magnetic flux MF in the axial direction between the first and second magnetic-flux guiding plates 164 and 165 and between the first and second annular projections 134 and 135 can be suppressed. It is also possible to avoid the situation that the magnetic particles (140p) are collected to the areas neighboring to the sealing gaps 184 and 185. Since the leakage of the magnetic particles (140p) from the sealing gaps 184 and 185 can be suppressed, the variation of the braking characteristic can be avoided.

(Eighteenth Embodiment)

Figure 31:
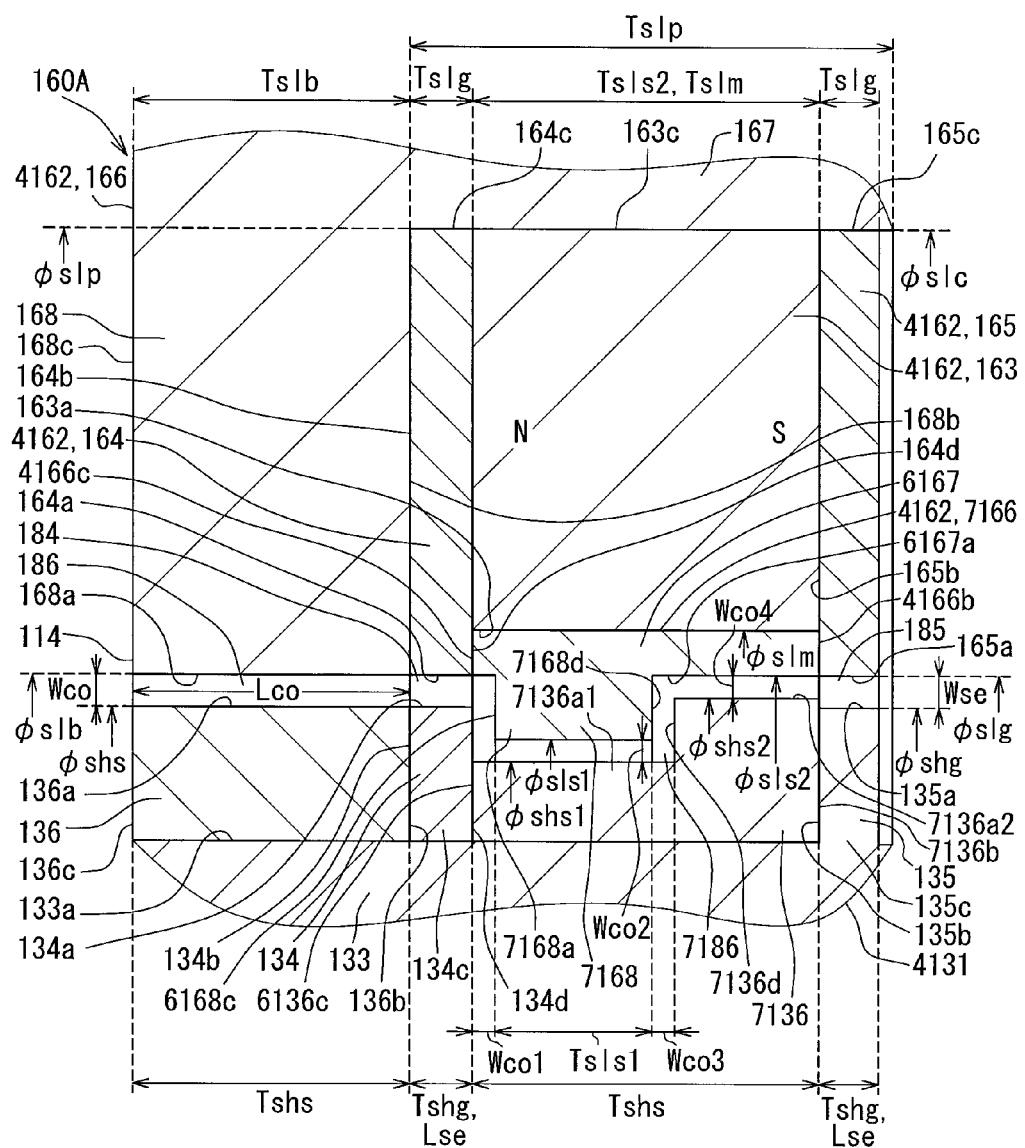
FIG. 31 is a schematically enlarged cross sectional view showing a sealing structure according to an eighteenth embodiment of the present disclosure.

An eighteenth embodiment of the present disclosure is a modification of the seventeenth embodiment (FIG. 30). As shown in FIG. 31, a third magnetic shielding member 7166 of the sleeve-unit side also has a projecting portion 7168. An inner diameter "φsls1" of an inner peripheral portion 7168a of the projecting portion 7168 is made to be smaller than the outer diameter "φshg" of each annular projection 134, 135. An inner diameter "φsls2" of an inner peripheral portion 6167a of the main body portion 6167 of the third magnetic shielding member 7166 is made to be substantially equal to the inner diameter "φslg" of each magnetic-flux guiding plate 164, 165. The inner peripheral portion 7168a of the projecting portion 7168 and the inner peripheral portion 6167a of the main body portion 6167 are connected to each other via a radial flat surface 7168d in the radial direction.

A fourth magnetic shielding member 7136 of the shaft side has a small diameter portion (a left-hand side portion in the drawing) and a large diameter portion (a right-hand side portion in the drawing). An outer diameter "φshs1" of an outer peripheral portion 7136a1 of the small diameter portion is made to be smaller than the outer diameter "φshg" of each annular projection 134, 135, while an outer diameter "φshs2" of an outer peripheral portion 7136a2 of the large diameter portion is made to be larger than the outer diameter "φshg" of each annular projection 134, 135. The outer peripheral portion 7136a1 of the small diameter portion and the outer peripheral portion 7136a2 of the large diameter portion are connected to each other via a radial flat surface 7136d in the radial direction. An axial end surface 7136b of the fourth magnetic shielding member 7136 (that is, a right-hand side surface in the drawing) is in contact with the axial end surface 135b of the second annular projection 135 in the radial and rotating direction, so as to cover the whole surface area thereof from the housing-inner side.

A communication gap 7186 is respectively formed between the axial end surface 134d of the first annular projection 134 and an axial end surface 6168c of the projecting portion 7168, between the outer peripheral portion 7136a1 of the fourth magnetic shielding member 7136 and the inner peripheral portion 7168a of the projecting portion 7168, between the radial flat surfaces 7168d and 7136d, and between the outer peripheral portion 7136a2 of the fourth magnetic shielding member 7136 and the inner peripheral portion 6167a of the main body portion 6167.

A gap width "Wco1" in the axial direction between the axial end surfaces 134d and 6168c is made to be smaller than the gap width "Wse" of the sealing gap 185. The gap width "Wco1" is constant in the radial and rotating direction. A gap width "Wco2" in the radial direction between the outer peripheral portion 7136a1 and the inner peripheral portion 7168a is made to be smaller than the gap width "Wse" of the sealing gap 185. The gap width "Wco2" is constant in the axial and rotating direction. A gap width "Wco3" in the axial direction between the radial flat surfaces 7168d and 7136d is made to be smaller than the gap width "Wse" of the sealing gap 185. The gap width "Wco3" is constant in the radial and rotating direction. A gap width "Wco4" in the radial direction between the outer peripheral portion 7136a2 and the inner peripheral portion 6167a is made to be smaller than the gap width "Wse" of the sealing gap 185. The gap width "Wco4" is constant in the axial and rotating direction.

The communication gap 7186 is formed between the axial end surfaces 4166b and 4166c of the main body portion 6167 of the third magnetic shielding member 7166 in a labyrinth structure snaking between them. An axial length of the communication gap 7186 is larger than the axial length "Lse" of the sealing gap 185. Therefore, as in the same manner to the seventeenth embodiment, the self-sealing function is maintained by the sealing films having high withstanding pressure and the variation of the braking characteristic can be avoided.

(Nineteenth Embodiment)

Figure 32:
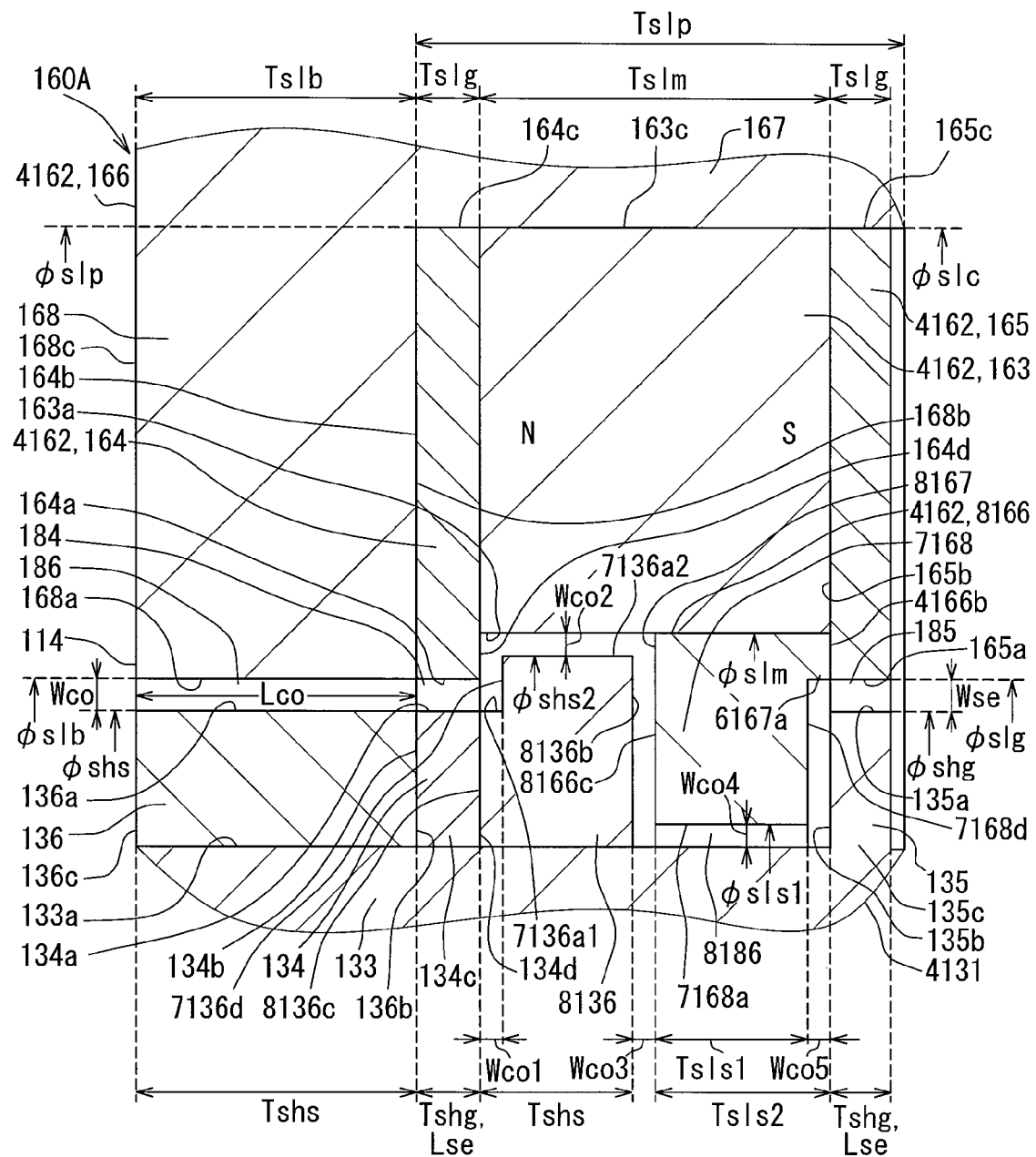
FIG. 32 is a schematically enlarged cross sectional view showing a sealing structure according to a nineteenth embodiment of the present disclosure.

A nineteenth embodiment of the present disclosure is a modification of the eighteenth embodiment (FIG. 31). As shown in FIG. 32, a third magnetic shielding member 8166 of the sleeve-unit side has a main body portion 8167 and a projecting portion 7168 projecting from the main body portion 8167 in a radial inward direction. A thickness "Tsls2" of the main body portion 8167 in the axial direction is made to be larger than the thickness "Tslg" of each magnetic-flux guiding plate 164, 165, but smaller than the thickness "Tslm" of the permanent magnet 163. The axial end surface 4166b of the main body portion 8167 (that is, a right-hand side surface thereof in the drawing) is in contact with the axial end surface 165b of the second magnetic-flux guiding member 165. An axial end surface 8166c of the third magnetic shielding member 8166 (that is, a left-hand side surface in the drawing) is separated from the axial end surface 164d of the first magnetic-flux guiding plate 164 in the axial direction toward the housing-outer side.

A fourth magnetic shielding member 8136 of the shaft side has a small diameter portion (a left-hand side portion in the drawing) and a large diameter portion (a right-hand side portion in the drawing). A thickness "Tshs" of the fourth magnetic shielding member 8136 in the axial direction is made to be larger than the thickness "Tslg" of each annular projection 134, 135, but smaller than the thickness "Tslm" of the permanent magnet 163. An axial end surface 8136c of the fourth magnetic shielding member 8136 (that is, a left-hand side surface thereof in the drawing) is in contact with the axial end surface 134d of the first annular projection 134. An axial end surface 8136b of the fourth magnetic shielding member 8136 (that is, a right-hand side surface in the drawing) is separated from the axial end surface 135b of the second annular projection 135 in the axial direction toward the housing-inner side. An outer diameter "φshs2" of the outer peripheral portion 7136a2 of the large diameter portion is made to be larger than the inner diameter "φslg" of each inner peripheral portion 164a, 165a of the magnetic-flux guiding plates 164 and 165, so that the large diameter portion of the fourth magnetic shielding member 8136 is projected into a space between the first and second magnetic-flux guiding plates 164 and 165.

A communication gap 8186 is respectively formed between the axial end surface 164d of the first magnetic-flux guiding plate 164 and the radial flat surface 7136d of the large diameter portion of the fourth magnetic shielding member 8136, between the outer peripheral portion 7136a2 of the fourth magnetic shielding member 8136 and the inner peripheral portion 163a of the permanent magnet 163, between the axial end surfaces 8136b and 8166c, between the outer periphery 133a of the brake shaft 4131 and the inner peripheral portion 7168a of the projecting portion 7168, and between the radial flat surface 7168d of the projecting portion 7168 and the axial end surface 135b of the second annular projection 135.

A gap width "Wco1" in the axial direction between the axial end surfaces 164d and the radial flat surface 7136d is made to be smaller than the gap width "Wse" of the sealing gap 185. The gap width "Wco1" is constant in the radial and rotating direction. A gap width "Wco2" in the radial direction between the outer peripheral portion 7136a2 and the inner periphery 163a is made to be smaller than the gap width "Wse" of the sealing gap 185. The gap width "Wco2" is constant in the axial and rotating direction. A gap width "Wco3" in the axial direction between the axial end surfaces 8136b and 8166c is made to be smaller than the gap width "Wse" of the sealing gap 185. The gap width "Wco3" is constant in the radial and rotating direction. A gap width "Wco4" in the radial direction between the outer periphery 133a and the inner peripheral portion 7168a is made to be smaller than the gap width "Wse" of the sealing gap 185. The gap width "Wco4" is constant in the axial and rotating direction. A gap width "Wco5" in the axial direction between the radial flat surface 7168d and the axial end surface 135b is made to be smaller than the gap width "Wse" of the sealing gap 185. The gap width "Wco5" is constant in the radial and rotating direction.

The communication gap 8186 is formed between the sealing gaps 184 and 185 in a labyrinth structure snaking between them. An axial length of the communication gap 8186 is larger than the axial length "Lse" of the sealing gap 185. Therefore, as in the same manner to the seventeenth embodiment, the self-sealing function is maintained by the sealing films having high withstanding pressure and the variation of the braking characteristic can be avoided.

(Twentieth Embodiment)

Figure 33:
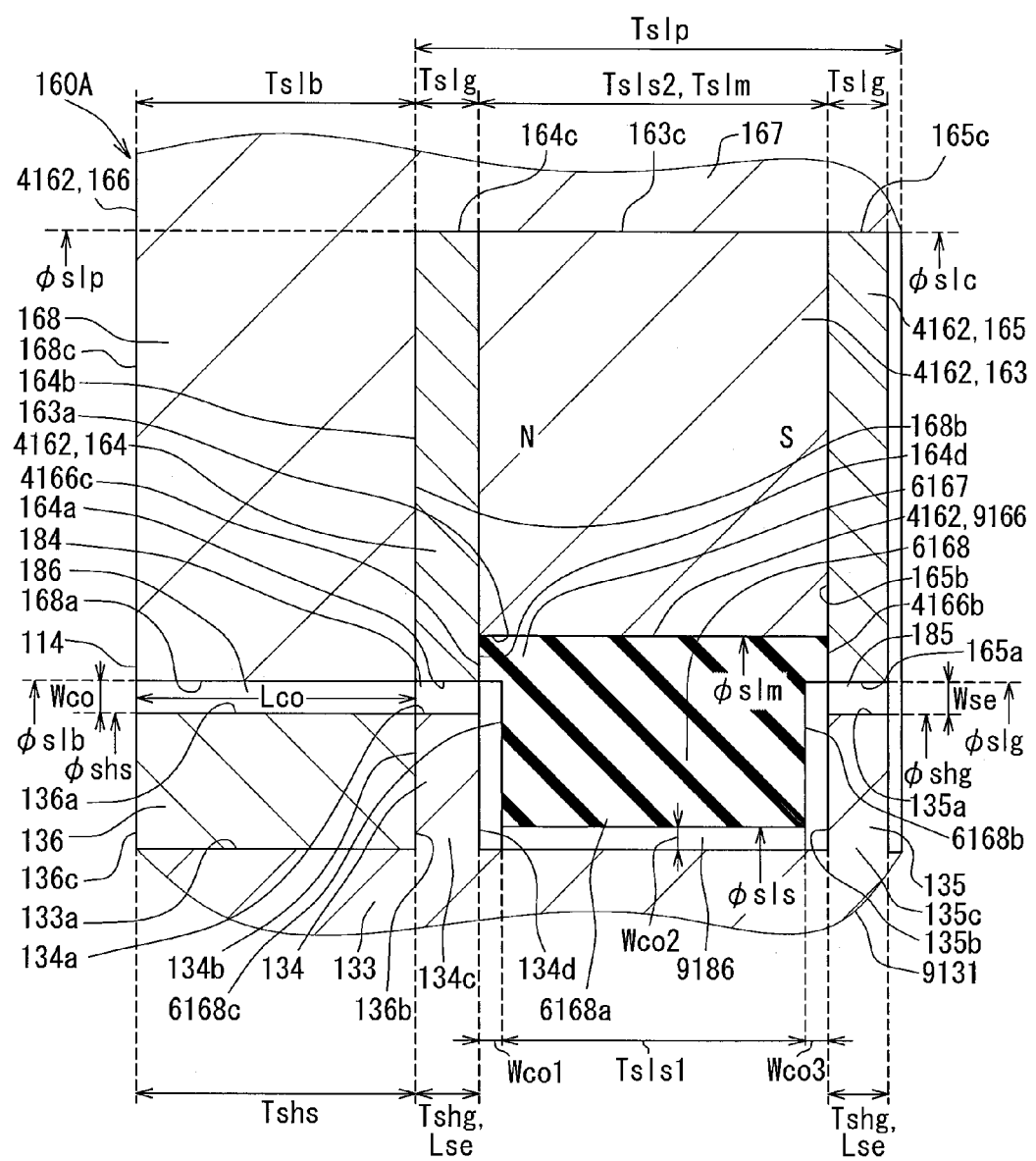
FIG. 33 is a schematically enlarged cross sectional view showing a sealing structure according to a twentieth embodiment of the present disclosure.

A twentieth embodiment of the present disclosure is a modification of the seventeenth embodiment (FIG. 30). As shown in FIG. 33, a member corresponding to the fourth magnetic shielding member 6136 of the seventeenth embodiment (FIG. 30) is not provided for a brake shaft 9131 of the present embodiment. A third magnetic shielding member 9166 of the sleeve-unit side is made of non-magnetic material, such as, rubber or the like. A communication gap 9186 is respectively formed between the axial end surface 134d of the first annular projection 134 and the axial end surface 6168c of the projecting portion 6168 (of the third magnetic shielding member 9166), between the outer periphery 133a of the brake shaft 9131 and the inner peripheral portion 6168a of the projecting portion 6168, and between the axial end surface 135b of the second annular projection 135 and the axial end surface 6168b of the projecting portion 6168. A gap width "Wco2" formed between the outer periphery 133a and the inner peripheral portion 6168a is made to be smaller than the gap width "Wse" of the sealing gap 185. The gap width "Wco2" in the radial direction is constant in the axial and rotating direction.

The communication gap 9186 is formed between the sealing gaps 184 and 185 in a labyrinth structure snaking between them. An axial length of the communication gap 9186 is larger than the axial length "Lse" of the sealing gap 185. Therefore, as in a similar manner to the seventeenth embodiment (except for the function of the fourth magnetic shielding member 4136 of the fifteenth embodiment or the fourth magnetic shielding member 6136 of the seventeenth embodiment), the self-sealing function is maintained by the sealing films having high withstanding pressure and the variation of the braking characteristic can be avoided.

(Further Embodiments)

The present disclosure should not be limited to the above embodiments (for example, the twelfth to the twentieth embodiments). The present disclosure can be further modified in various manners without departing from the spirits of the present disclosure.

For example, in the above embodiments (for example, the twelfth to the twentieth embodiments), the first magnetic shielding member (166, 2166, 3166) is composed of the cylindrical wall portion (167) and the bottom wall portion (168, 2168, 3168). However, the cylindrical wall portion may be removed from the first magnetic shielding member.

Figure 34:
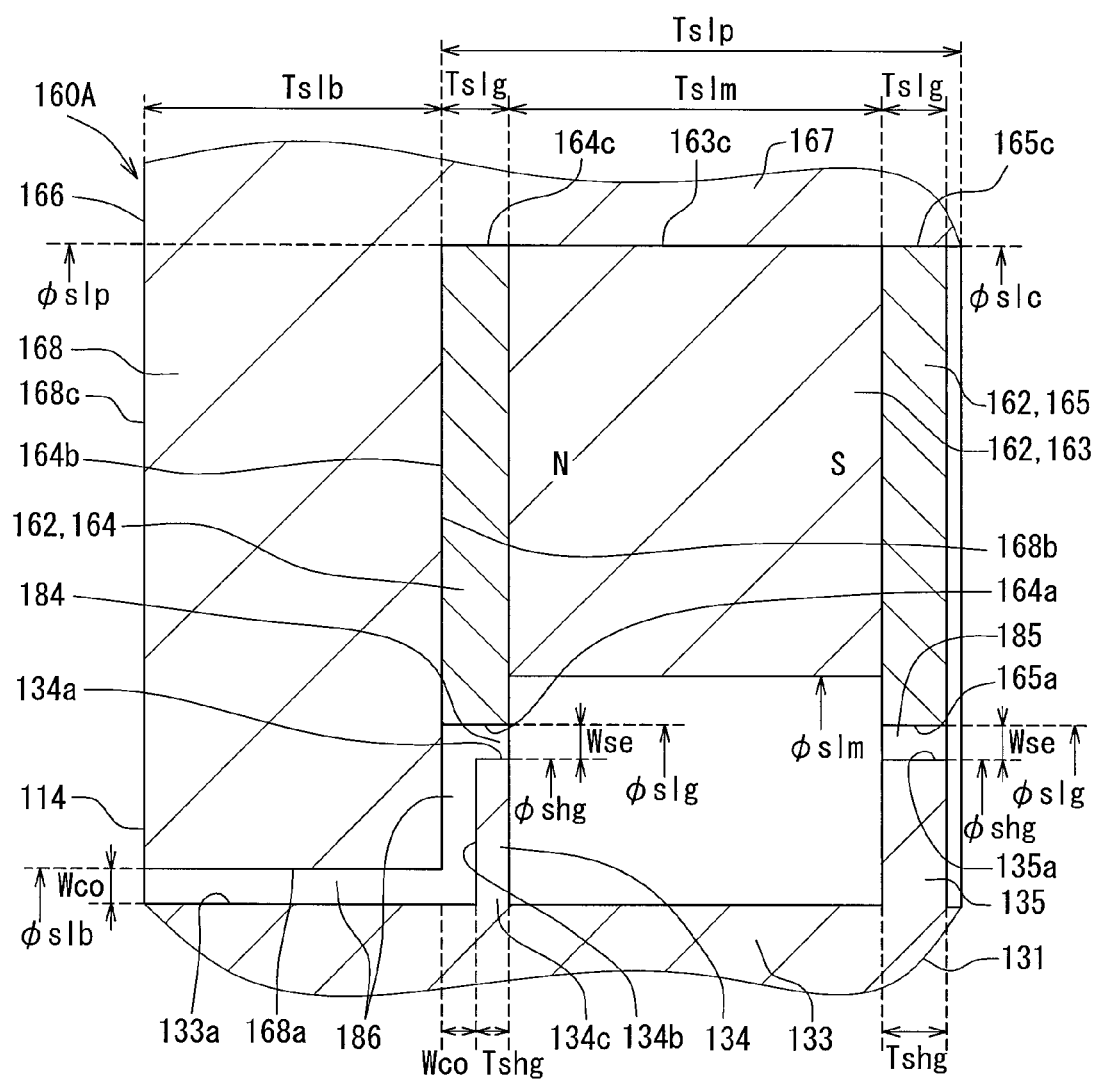
FIG. 34 is a schematically enlarged cross sectional view showing a sealing structure according to a modification of the twelfth embodiment (FIG. 23) of the present disclosure.

FIG. 34 shows a modification of the twelfth embodiment (FIG. 23). In the modification, the second magnetic shielding member 136 of the shaft side (FIG. 23) is not provided. Instead, the bottom wall portion 168 is extended in the radial inward direction so as to form a part of the communication gap 186 (having the gap width "Wco" in the radial direction) between the inner peripheral portion 168a of such extended bottom wall portion 168 and the outer periphery 133a of the shaft body 133. A thickness of the first annular projection 134 in the axial direction is reduced ("Tshg" for the projection 134<"Tslg" for the plate 164), so as to form another part of the communication gap 186 (having the gap width "Wco" in the axial direction) between the axial end surface 168b of the bottom wall portion 168 (on the housing-outer side, that is, on the right-hand side in the drawing) and the axial end surface 134b of the first annular projection 134 (on the housing-inner side).

Figure 35:
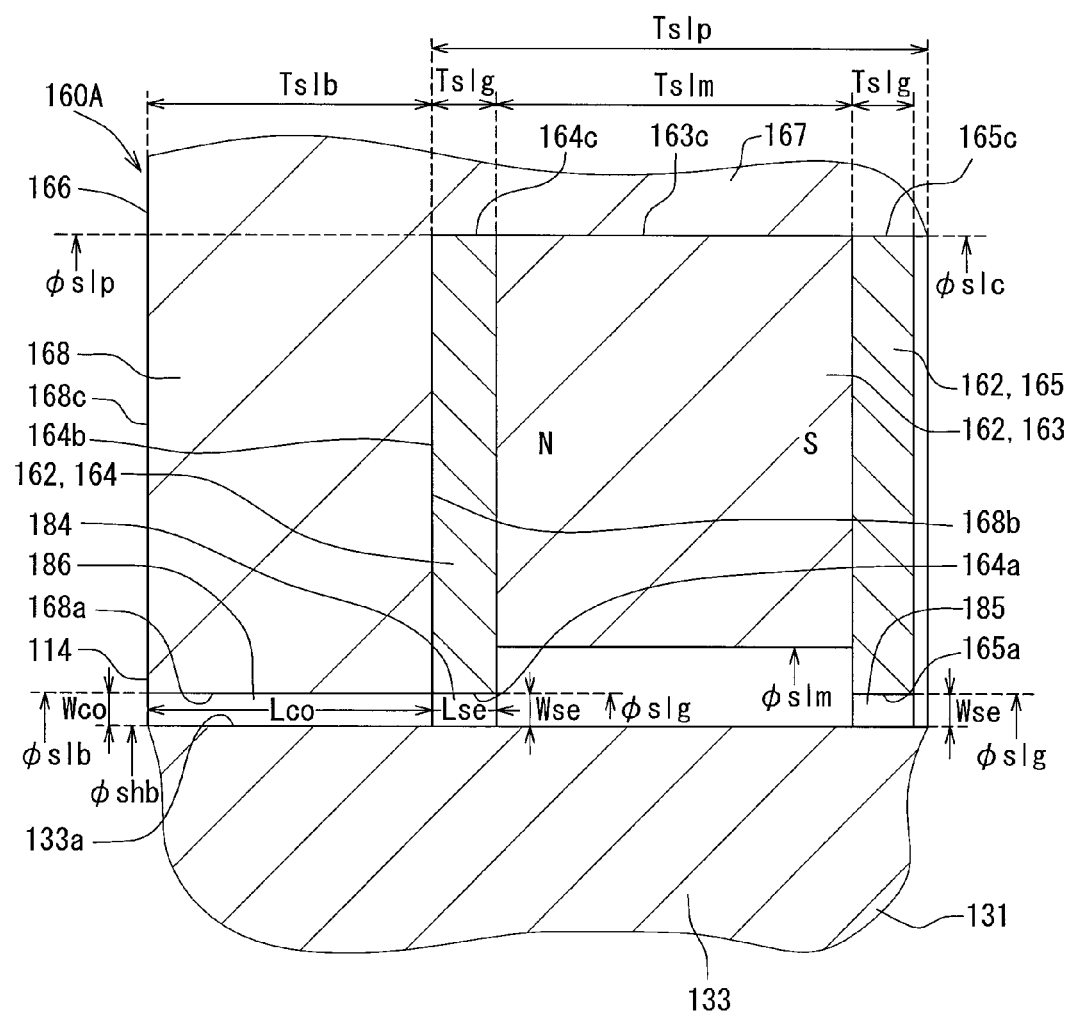
FIG. 35 is a schematically enlarged cross sectional view showing a sealing structure according to another modification of the twelfth embodiment (FIG. 23) of the present disclosure.

FIG. 35 shows another modification of the twelfth embodiment (FIG. 23). In the modification, the first and second annular projections 134 and 135 of the twelfth embodiment are not provided in the brake shaft 131. Instead, the inner peripheral portion of each magnetic-flux guiding plate 164, 165 is extended in the radial inward direction, so as to respectively form the annular sealing gaps 184 and 185 between the inner peripheral portions 164a and 165a of the first and second magnetic-flux guiding plates 164 and 165 and the outer periphery 133a of the shaft body 133. Each of the sealing gaps 184 and 185 has the gap width "Wse" in the radial direction.

In a similar manner to FIG. 34, the second magnetic shielding member 136 of the twelfth embodiment (FIG. 23) is not provided in the modification of FIG. 35. Instead, the bottom wall portion 168 is extended in the radial inward direction so as to form the annular communication gap 186 between the inner peripheral portion 168a of the bottom wall portion 168 and the outer periphery 133a of the shaft body 133.

Figure 36:
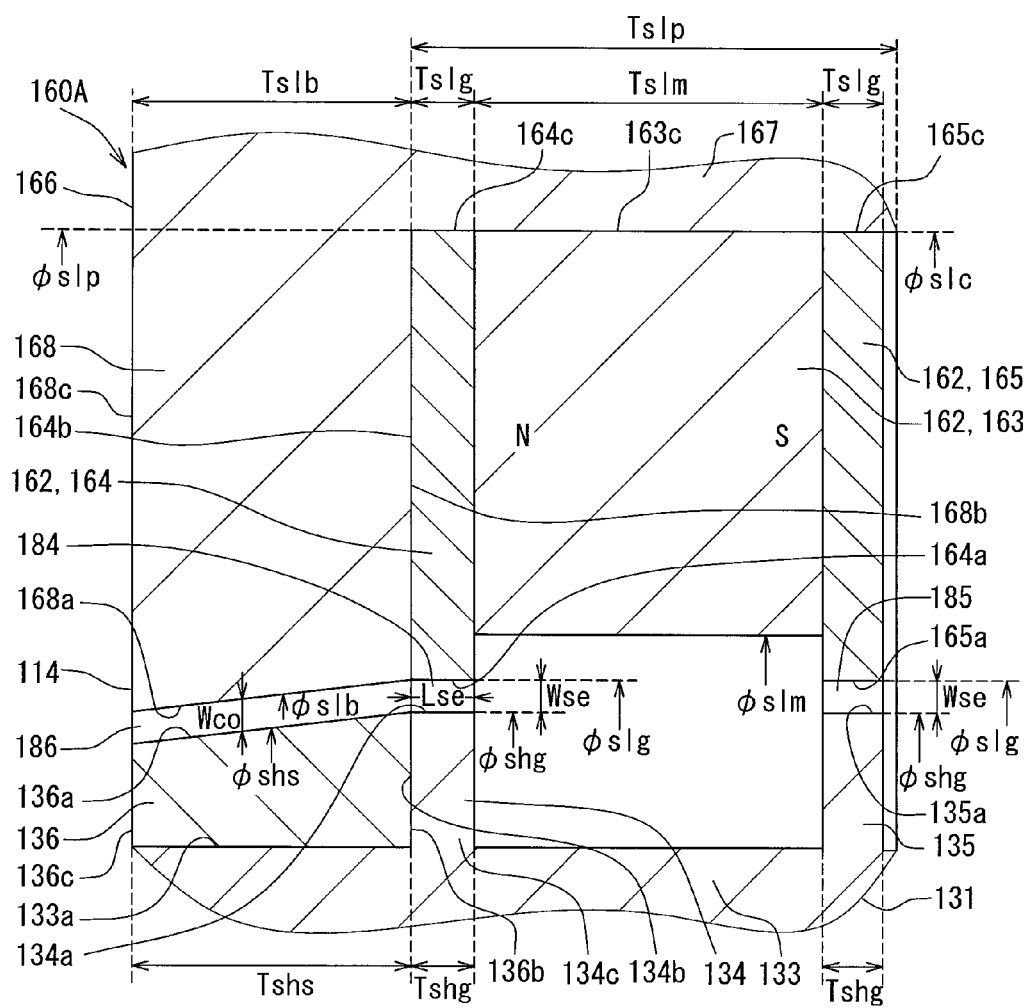
FIG. 36 is a schematically enlarged cross sectional view showing a sealing structure according to a further modification of the twelfth embodiment (FIG. 23) of the present disclosure.
Figure 37:
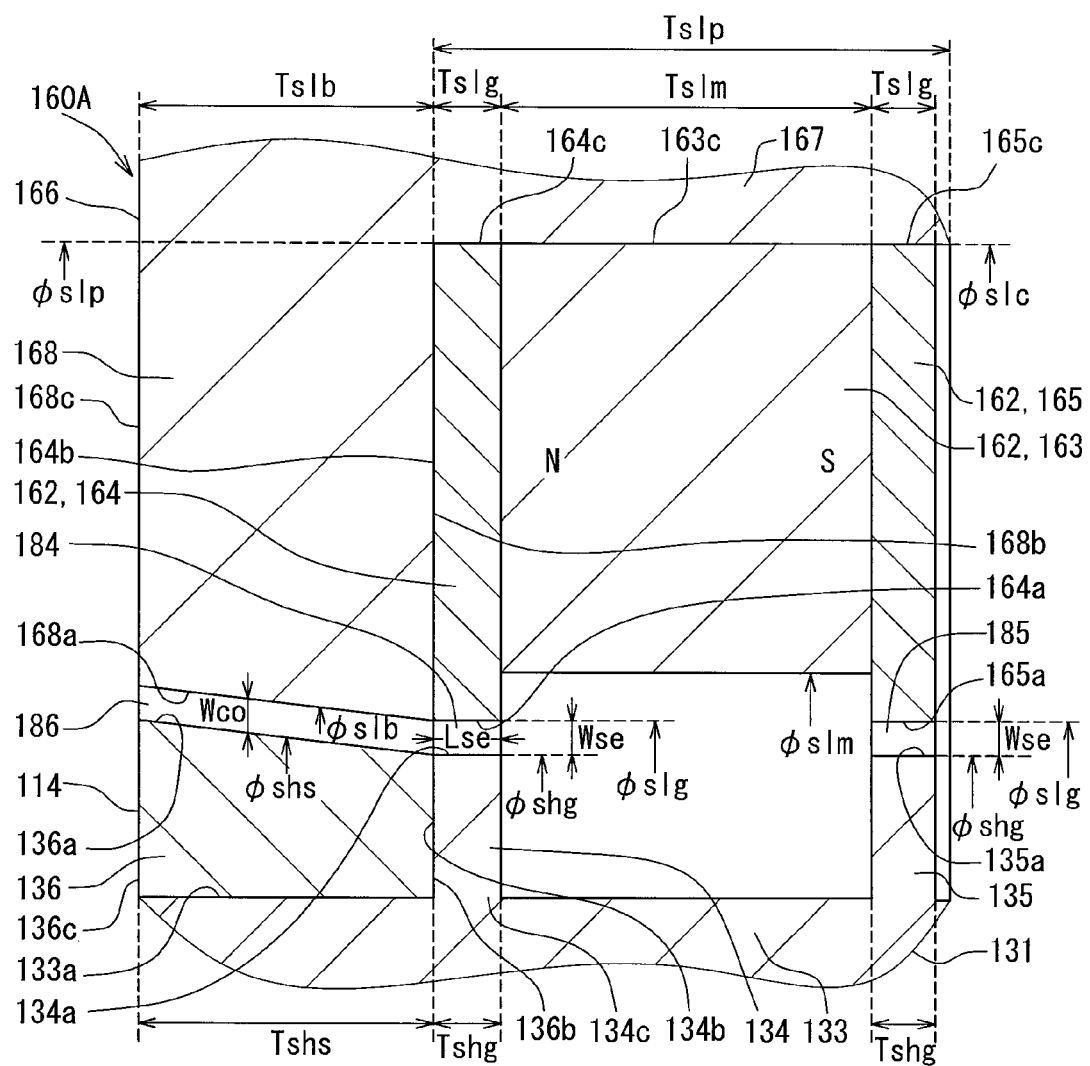
FIG. 37 is a schematically enlarged cross sectional view showing a sealing structure according to a still further modification of the twelfth embodiment (FIG. 23) of the present disclosure.

FIGS. 36 and 37 show further modifications of the twelfth embodiment (FIG. 23). The annular communication gap 186, which is formed between the inner peripheral portion 168a of the bottom wall portion 168 of the first magnetic shielding member 166 and the outer peripheral portion 136a of the second magnetic shielding member 136, is inclined with a center axis of the brake shaft 131. For example, each of the inner peripheral portion 168a of the first magnetic shielding member 166 and the outer peripheral portion 136a of the second magnetic shielding member 136 is formed in a tapered shape in such a way that the inner diameter "φslb" and the outer diameter "φshs" thereof are made to become larger in the axial direction to the housing-outer side (that is, in the right-hand direction in the drawing), as shown in FIG. 36. Alternatively, the inner diameter "φslb" and the outer diameter "φshs" thereof are made to become smaller in the axial direction to the housing-outer side (that is, in the right-hand direction in the drawing), as shown in FIG. 37. The gap width "Wco" is constant in the axial and rotating direction.

Figure 38:
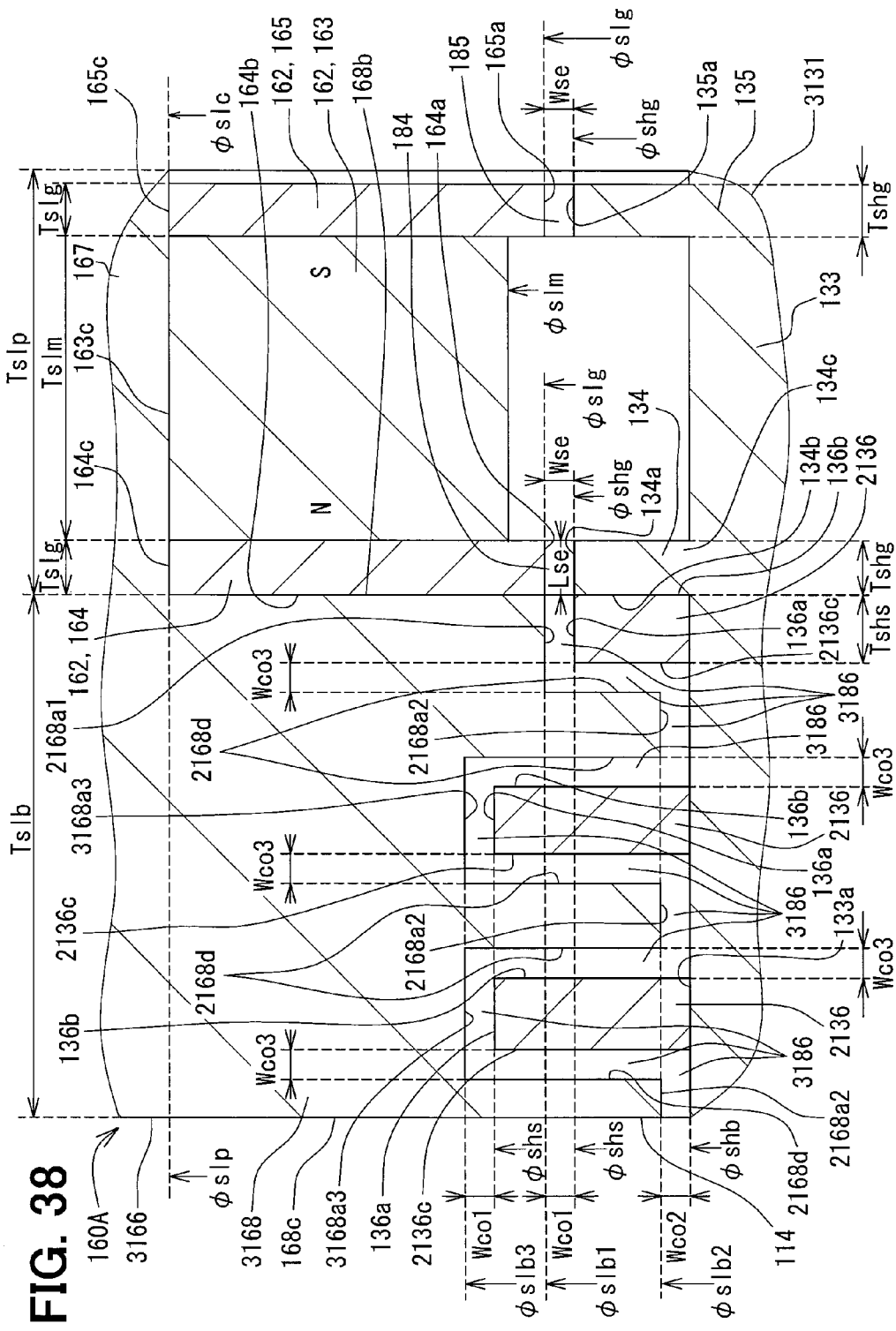
FIG. 38 is a schematically enlarged cross sectional view showing a sealing structure according to a modification of the fourteenth embodiment (FIG. 26) of the present disclosure.

FIG. 38 shows a modification of the fourteenth embodiment (FIG. 26). At least one of the second magnetic shielding members 2136 (two members 2136 in the modification of FIG. 38) is extended in the radial outward direction, so that the outer diameter "φshs" of the outer peripheral portion 136a of such extended magnetic shielding member 2136 is made to be larger than the outer diameter "φshg" of the first annular projection 134. An inner diameter "φslb3" of each inner peripheral portion 3168a 3 is made to be correspondingly larger, so that the communication gap 3186 has the gap width "Wco1" in the axial direction between the respective inner peripheral portion 3168a3 of the first magnetic shielding member 3166 and the respective outer peripheral portion 136a of the second magnetic shielding member 2136.

Figure 39:
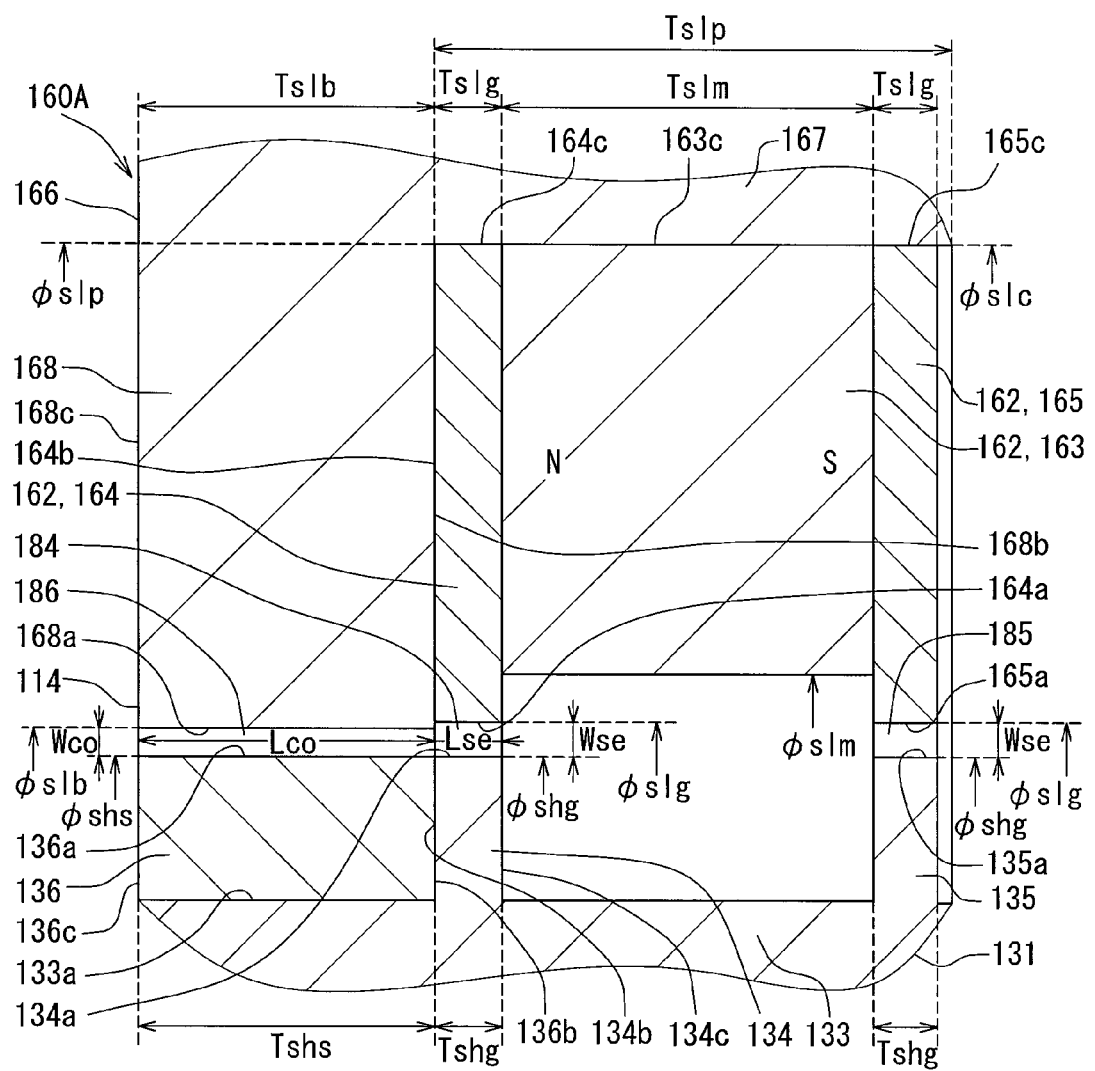
FIG. 39 is a schematically enlarged cross sectional view showing a sealing structure according to a still further modification of the twelfth embodiment (FIG. 23) of the present disclosure.
Figure 40:
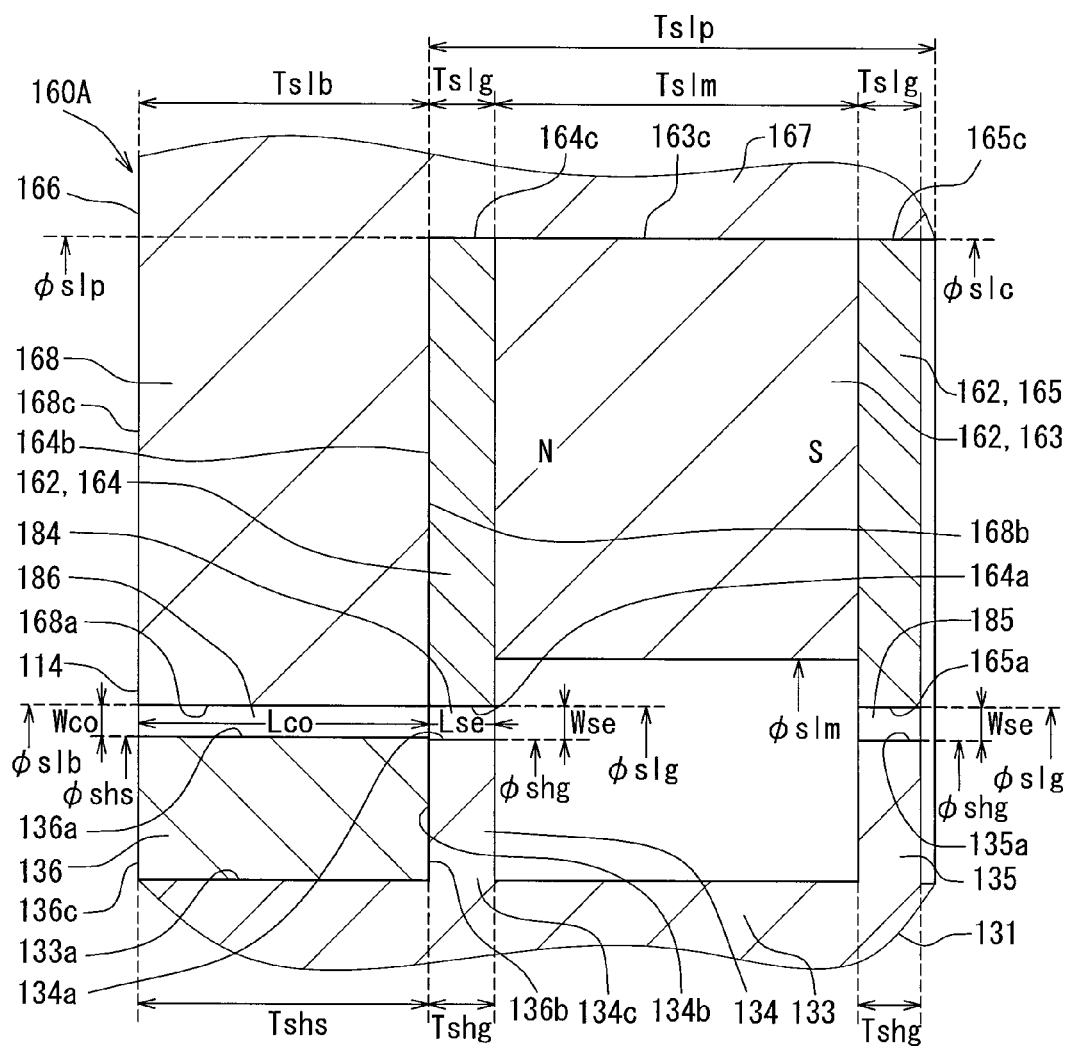
FIG. 40 is a schematically enlarged cross sectional view showing a sealing structure according to a still further modification of the twelfth embodiment (FIG. 23) of the present disclosure.

FIGS. 39 and 40 show further modifications of the twelfth embodiment (FIG. 23). In the twelfth embodiment, the gap width "Wco" of the communication gap 186 is made to be substantially equal to the gap width "Wse" of the sealing gap 184. In the modification of FIG. 39 or 40, the gap width "Wco" of the communication gap 186 is made to be smaller than the gap width "Wse" of the sealing gap 184. In FIG. 39, the inner diameter "φslb" of the bottom wall portion 168 is made smaller than that "φslg" of the magnetic-flux guiding plate 164. In FIG. 40, the outer diameter "φshs" of the second magnetic shielding member 136 is made larger than that "φshg" of the annular projection 134.

In a modification of the embodiments (the thirteenth to the twentieth embodiments) other than the above twelfth embodiment, the gap width in the axial direction and/or in the radial direction ("Wco", "Wco1", "Wco2" and/or "Wco3") of the communication gap (186, 2186, 3186) may be likewise made to be smaller than the gap width "Wse" of the sealing gap 184 or 185.

Figure 41:
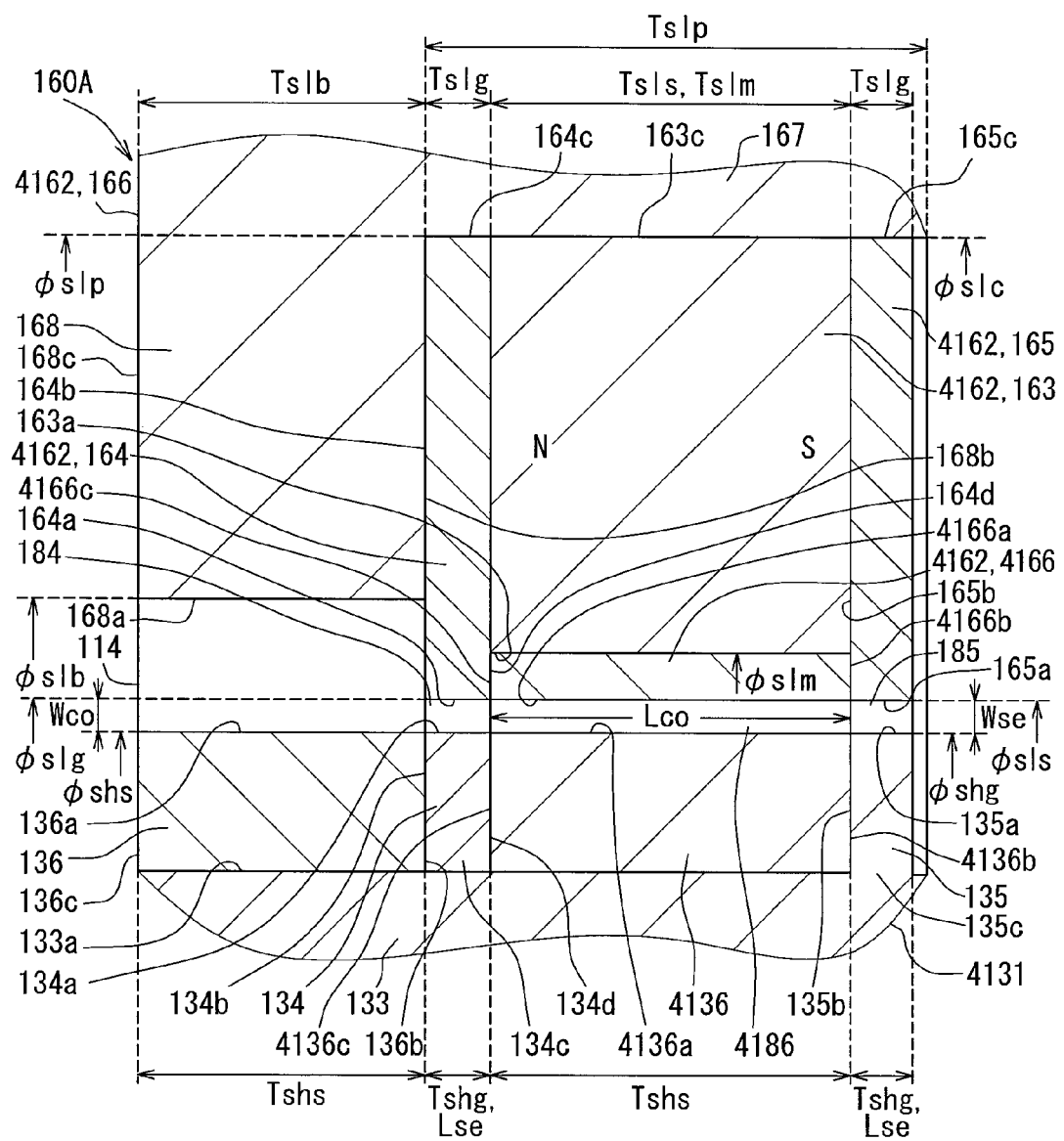
FIG. 41 is a schematically enlarged cross sectional view showing a sealing structure according to a modification of the fifteenth embodiment (FIG. 28) of the present disclosure.

FIG. 41 shows a modification of the fifteenth embodiment (FIGS. 27 and 28). In the modification, the inner diameter "φslb" of the inner peripheral portion 168a of the bottom wall portion 168 is made larger than that "φslg" of the first magnetic-flux guiding plate 164. Furthermore, the first magnetic shielding member 166 itself may be eliminated. The modification of FIG. 41 may be also applied to the other embodiments.

Figure 42:
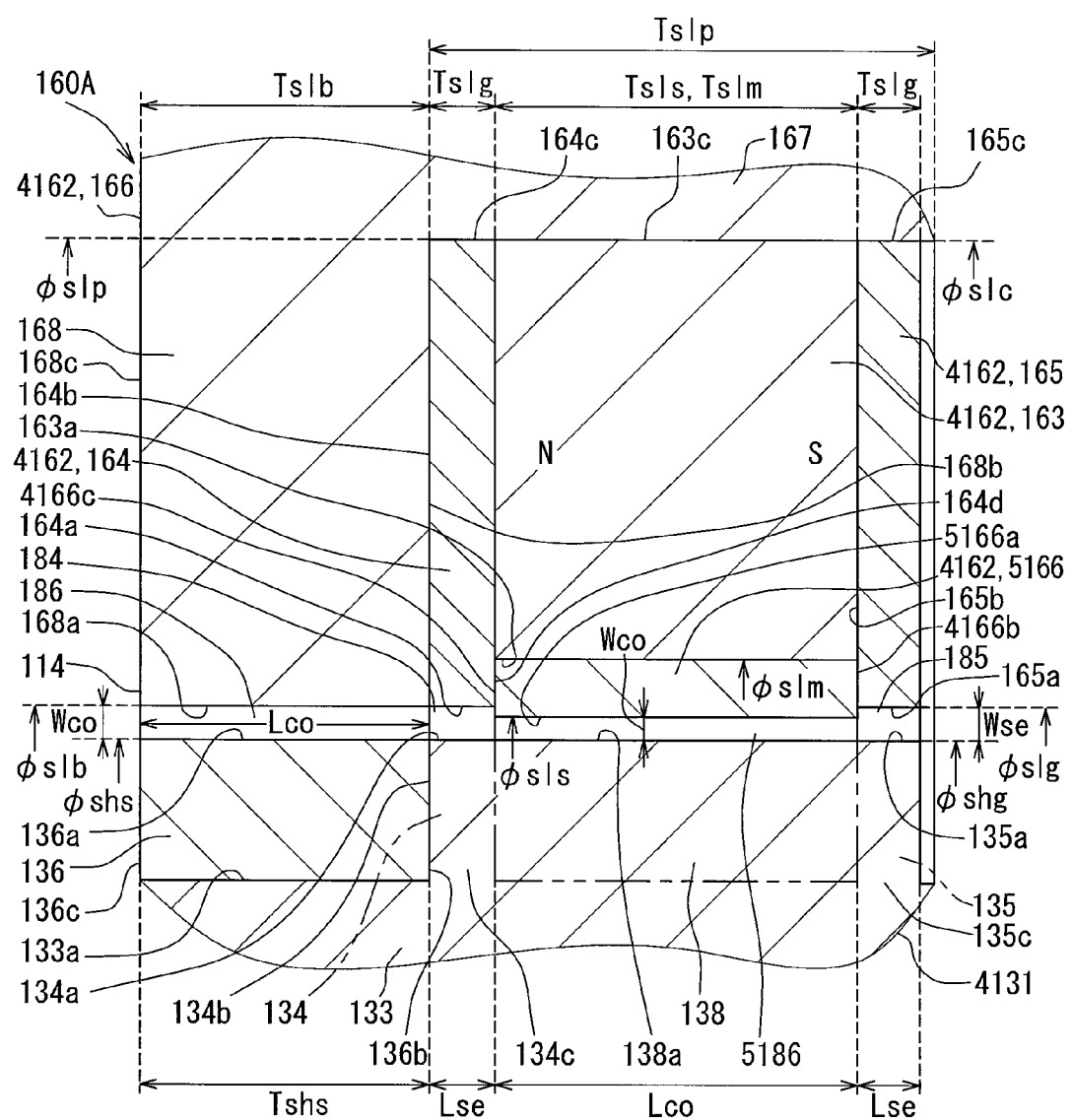
FIG. 42 is a schematically enlarged cross sectional view showing a sealing structure according to a modification of the sixteenth embodiment (FIG. 29) of the present disclosure.

FIG. 42 shows a modification of the sixteenth embodiment (FIG. 29). In the modification, the fourth magnetic shielding member 4136 made of the non-magnetic material is not provided. Instead, a magnetic-flux guiding member 138 made of magnetic material is provided between the first and second annular projections 134 and 135 of the brake shaft 4131. The magnetic-flux guiding member 138 may be made of a separate member from the brake shaft 4131 or may be formed as an integral part of the brake shaft 4131. In the modification of FIG. 42, the magnetic-flux guiding member 138 is integrally formed with the brake shaft 4131. The first and second sealing gaps 184 and 185 are respectively formed between the inner peripheral portion 164a of the first magnetic-flux guiding plate 164 and the magnetic-flux guiding member 138 (a portion corresponding to the first annular projection 134 of the sixteenth embodiment) and between the inner peripheral portion 165a of the second magnetic-flux guiding plate 165 and the magnetic-flux guiding member 138 (a portion corresponding to the second annular projection 135 of the sixteenth embodiment). Each of the first and second sealing gaps 184 and 185 of the annular shape has the gap width "Wse". The annular communication gap 5186 is formed between the inner peripheral portion 5166a of the third magnetic shielding member 5166 and an outer peripheral portion 138a of the magnetic-flux guiding member 138. The annular communication gap 5186 has the gap width "Wco" in the radial direction, which is smaller than that "Wse" of the sealing gap 184 or 185. The modification of FIG. 42 can be also applied to the fifteenth embodiment (FIG. 28).

Figure 43:
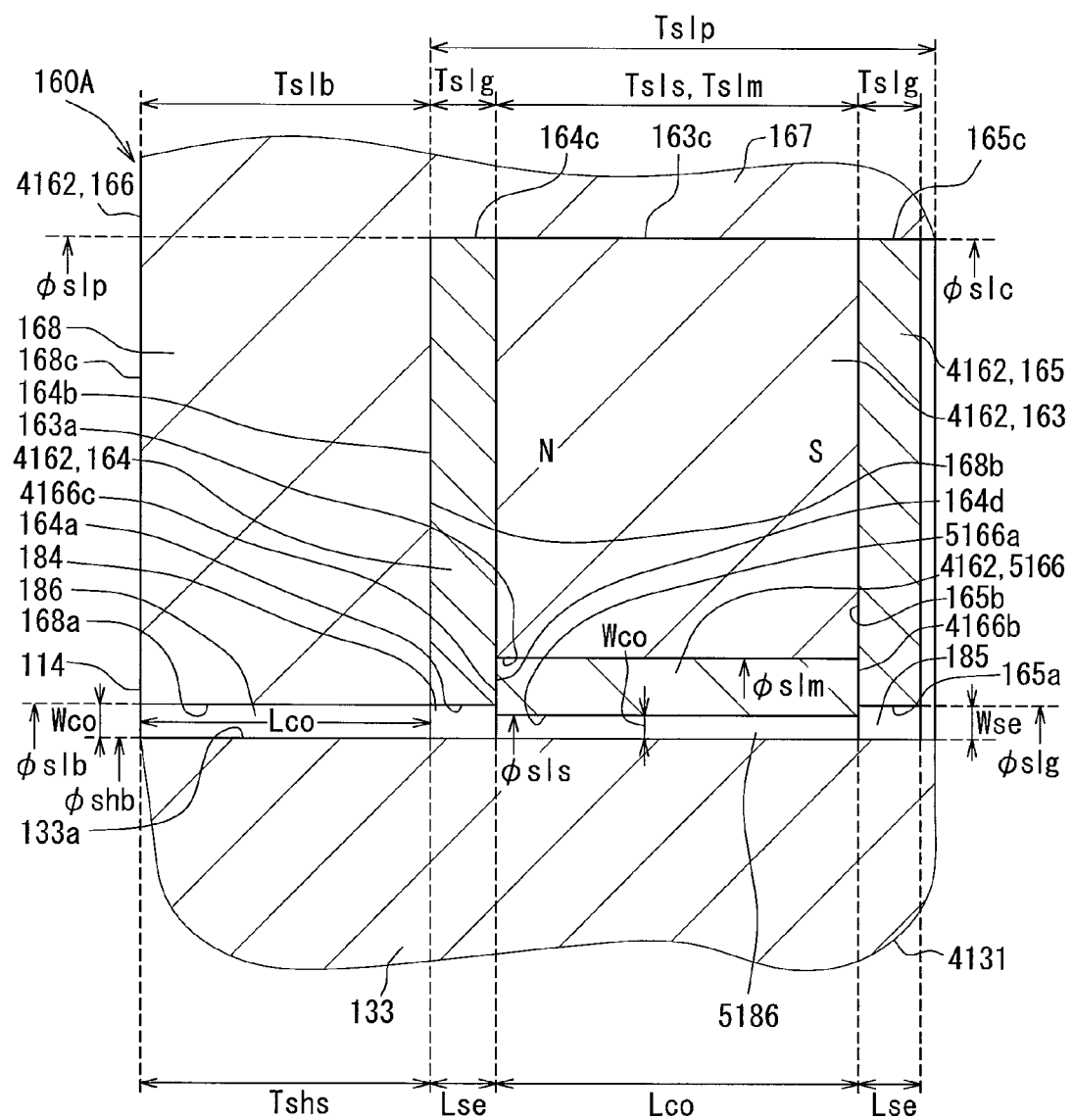
FIG. 43 is a schematically enlarged cross sectional view showing a sealing structure according to another modification of the sixteenth embodiment (FIG. 29) of the present disclosure.

FIG. 43 shows another modification of the sixteenth embodiment (FIG. 29). In the modification, not only the fourth magnetic-flux shielding member 4136 but also the first and second annular projections 134 and 135 are removed. The first and second sealing gaps 184 and 185 of the annular shape are respectively formed between the inner peripheral portion 164a of the first magnetic-flux guiding plate 164 and the outer periphery 133a of the shaft body 133 and between the inner peripheral portion 165a of the second magnetic-flux guiding plate 165 and the outer periphery 133a of the shaft body 133. The annular communication gap 5186 is formed between the inner peripheral portion 5166a of the third magnetic shielding member 5166 and the outer periphery 133a of the shaft body 133. The annular communication gap 5186 has the gap width "Wco" in the radial direction, which is smaller than that "Wse" of the sealing gap 184 or 185. The modification of FIG. 43 can be also applied to the fifteenth embodiment (FIG. 28).

Figure 44:
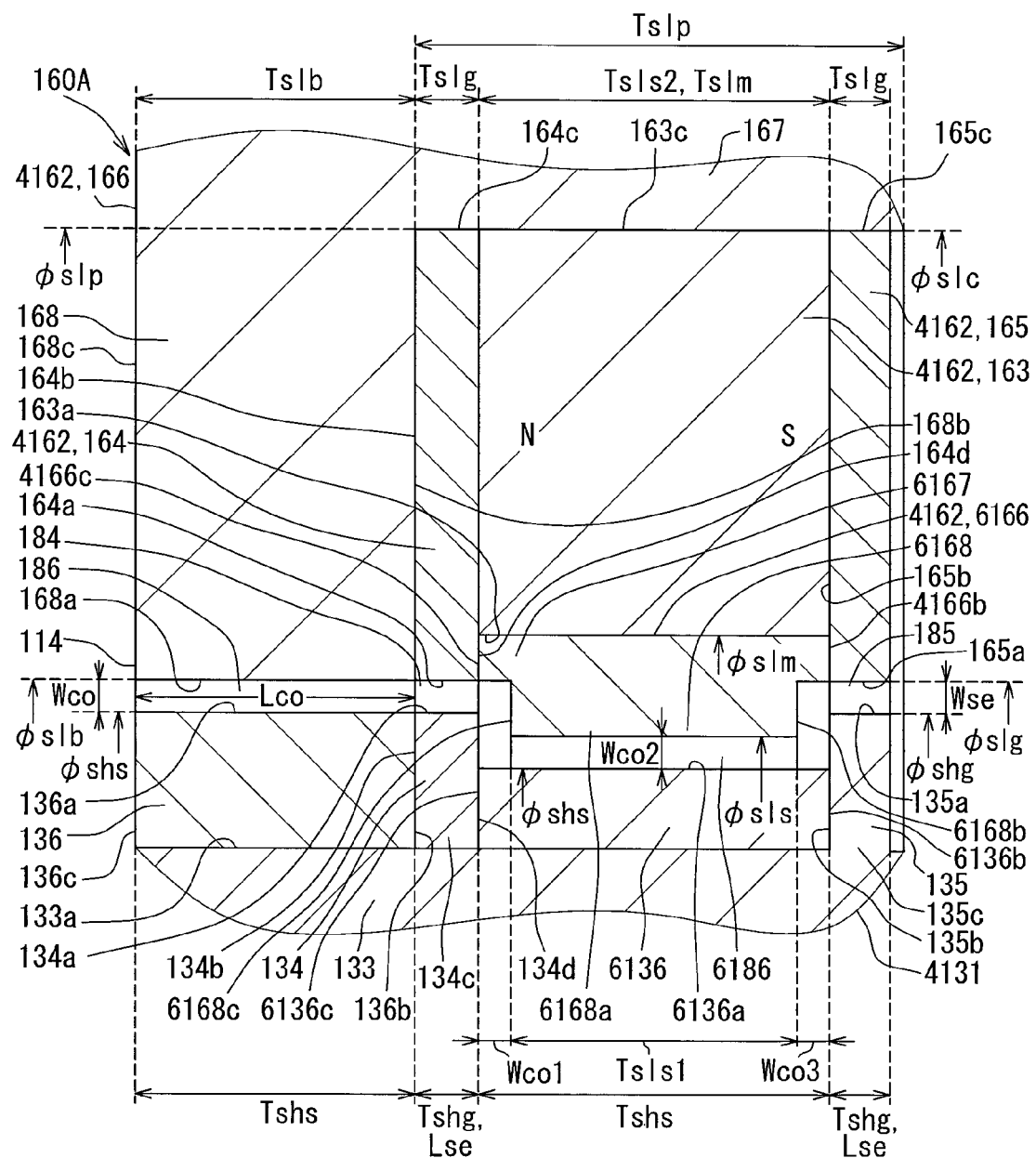
FIG. 44 is a schematically enlarged cross sectional view showing a sealing structure according to a modification of the seventeenth embodiment (FIG. 30) of the present disclosure.

FIG. 44 is a modification of the seventeenth embodiment (FIG. 30). In the seventeenth embodiment, the gap width in the radial direction and/or in the axial direction ("Wco1", "Wco2", "Wco3") of the communication gap 6186 is made to be smaller than the gap width "Wse" of the sealing gap 184 or 185. In the modification, the gap width in the radial direction and/or in the axial direction ("Wco1", "Wco2", "Wco3") of the communication gap 6186 may be made to be substantially equal to the gap width "Wse" of the sealing gap 184 or 185. The modification of FIG. 44 can be also applied to the other embodiments (for example, the eighteenth to twentieth embodiments).

Figure 45:
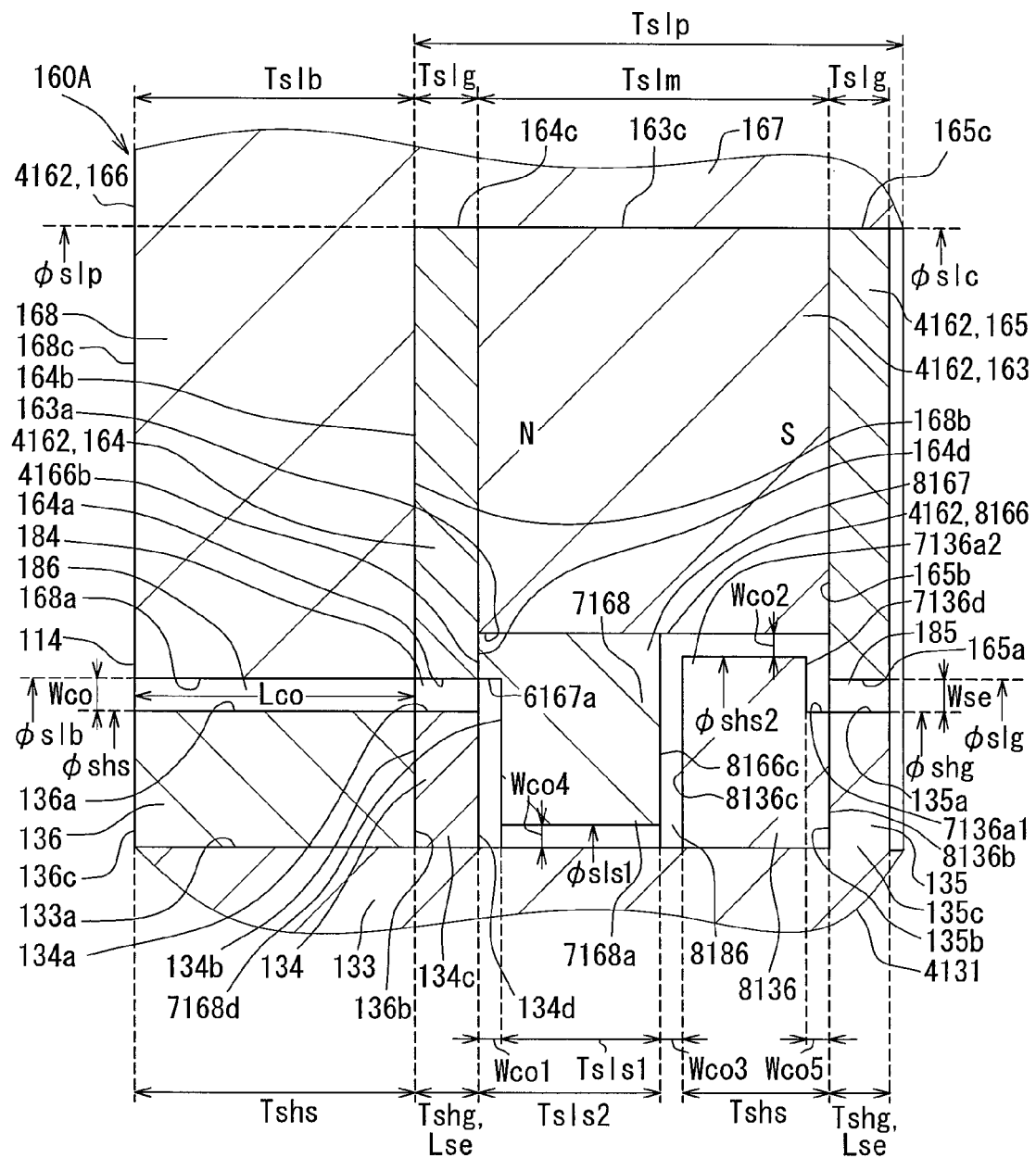
FIG. 45 is a schematically enlarged cross sectional view showing a sealing structure according to a modification of the nineteenth embodiment (FIG. 32) of the present disclosure.

FIG. 45 shows a modification of the nineteenth embodiment (FIG. 32). In the modification, the right and left positions for the third and fourth magnetic shielding members 7168 and 8136 are reversed from the right and left positions in the nineteenth embodiment.

Figure 46:
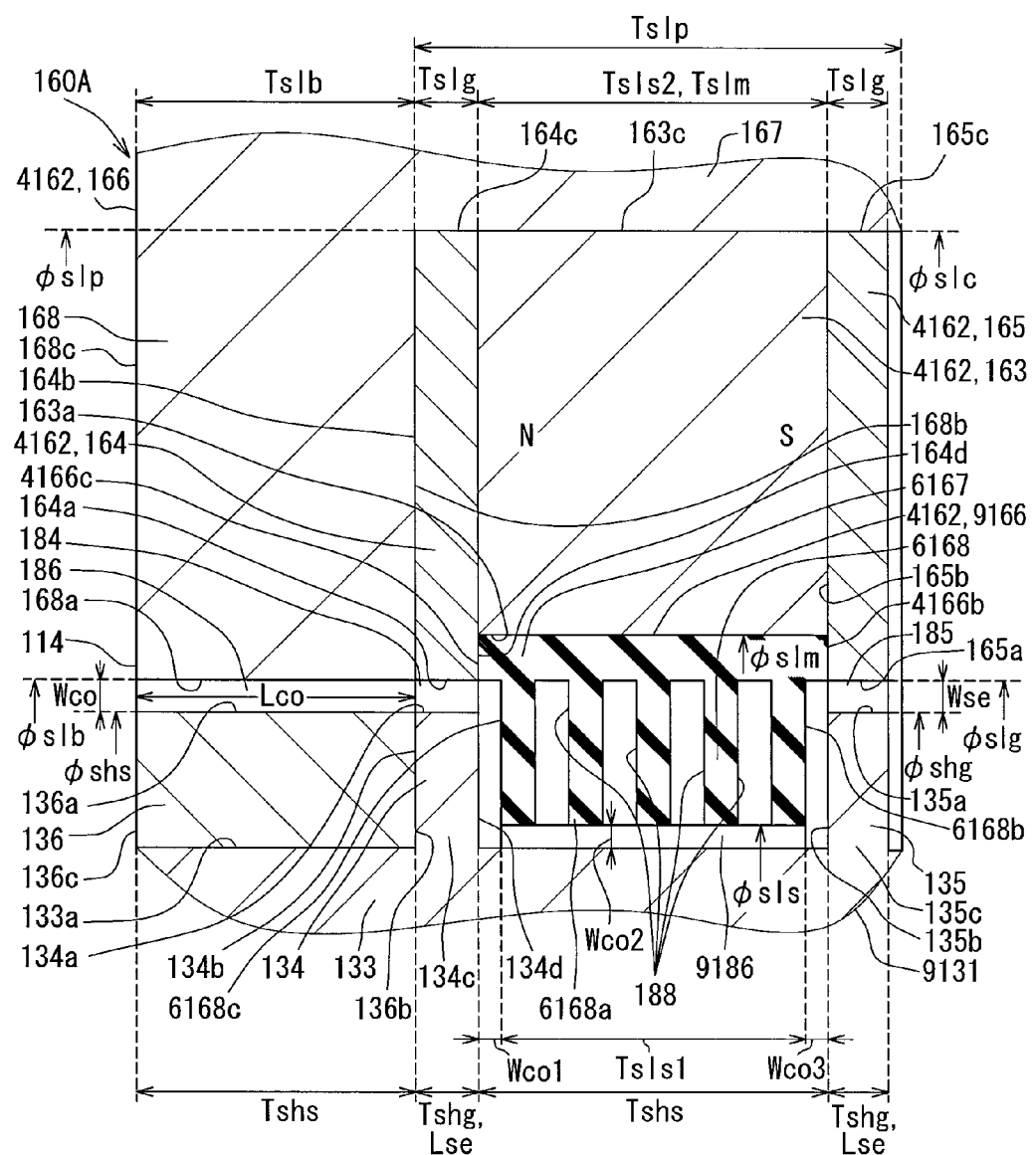
FIG. 46 is a schematically enlarged cross sectional view showing a sealing structure according to a modification of the twentieth embodiment (FIG. 33) of the present disclosure.

FIG. 46 shows a modification of the twentieth embodiment (FIG. 33). In the modification, multiple slits 188 extending in the radial inward direction are formed in the third magnetic shielding member 9166 of the sleeve-unit side. One or multiple slits may be formed not only in the third magnetic shielding member but also in the fourth magnetic shielding member. The modification of FIG. 46 can be applied to the other embodiments (for example, the fifteenth to nineteenth embodiments).

(Twenty-First Embodiment)

A twenty-first embodiment will be explained with reference to FIGS. 47 to 50.

Figure 47:
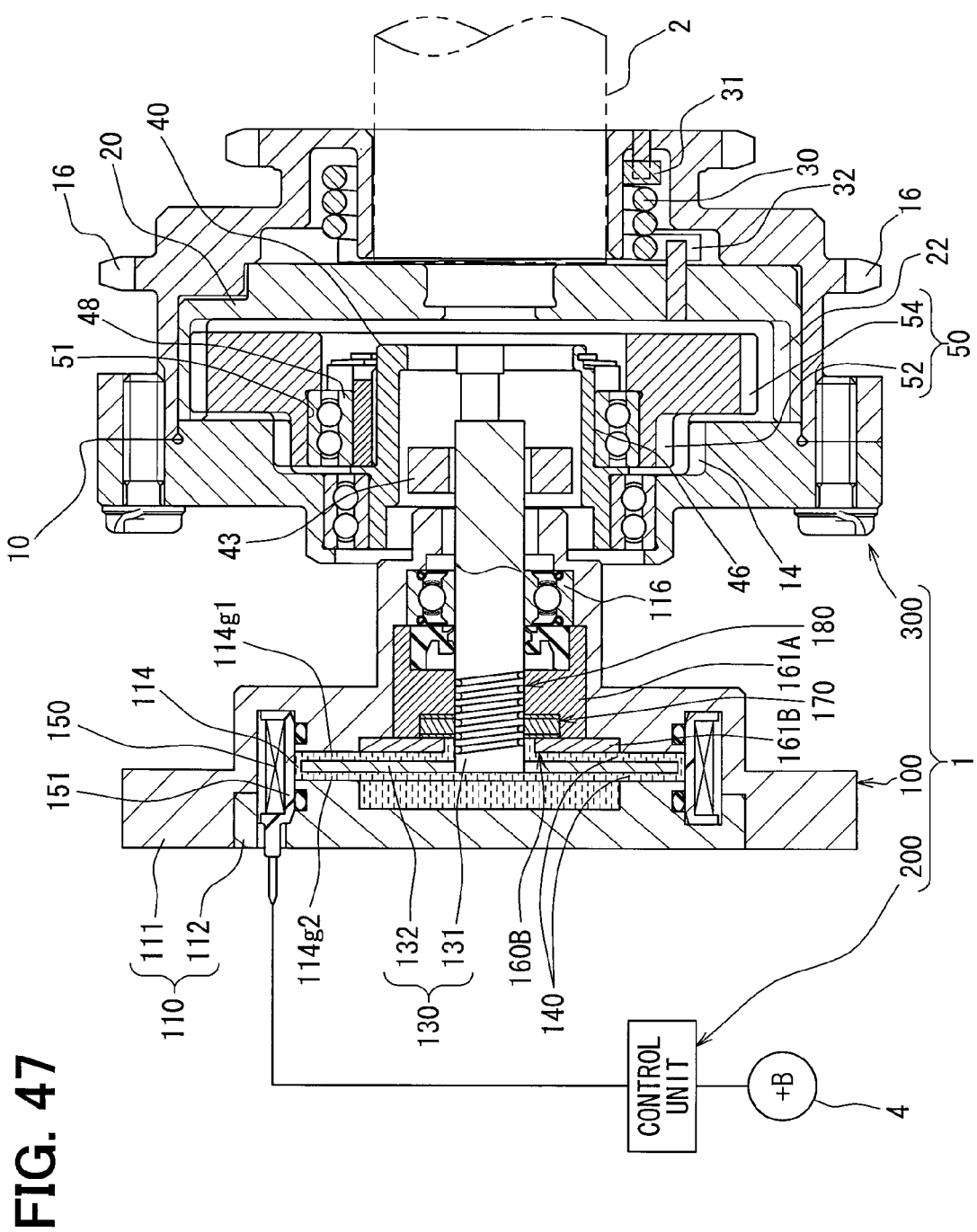
FIG. 47 is a schematic cross sectional view showing a valve timing adjusting apparatus according to a twenty-first embodiment of the present disclosure.
Figure 48:
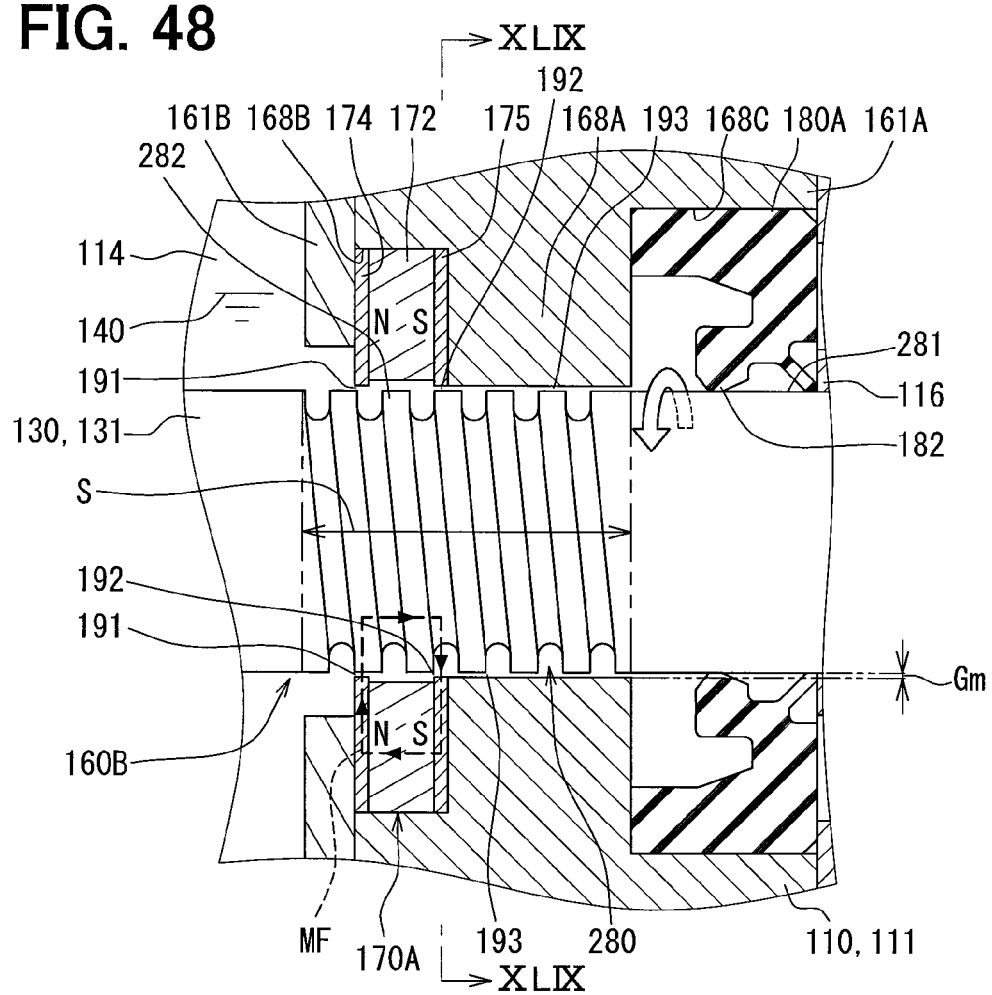
FIG. 48 is a schematically enlarged cross sectional view showing a relevant portion of a hydraulic braking device of FIG. 47.

As shown in FIGS. 47 and 48, a sealing structure 160B is composed of a pair of (first and second) magnetic sealing members 161A and 161B provided in the fixed member 111 of the housing 110, a magnetic sealing sleeve unit 170A, a magnetic sealing shaft 280 formed in the brake shaft 131 of the brake rotating member 130, and so on.

As shown in FIG. 48, the first magnetic sealing member 161A, which is made of non-magnetic material, for example, austenitec stainless steel, and formed in a cylindrical shape, is coaxially fitted into a space formed by an inner peripheral wall of the fixed member 111 so as to surround an outer periphery of the magnetic sealing shaft 280 in its rotating direction. The first magnetic sealing member 161A is composed of a partitioning portion 168A, a sleeve-unit fixing portion 168B and a sealing-member fixing portion 168C. The partitioning portion 168A is provided at an axially intermediate portion of the first magnetic sealing member 161A and formed in a ring plate shape extending in a radial inward direction. The sleeve-unit fixing portion 168B is formed at one axial end of the first magnetic sealing member 161A, that is, an axial end of the partitioning portion 168A closer to the inside of the housing 110 (the housing-inner side). The sleeve-unit fixing portion 168B is formed in a cylindrical shape having a closed bottom end, which is formed by the axial end of the partitioning portion 168A. The sealing-member fixing portion 168C is likewise formed at the other axial end of the first magnetic sealing member 161A, that is, the other axial end of the partitioning portion 168A opposite to (away from) the inside of the housing 110 (the housing-outer side). The sealing-member fixing portion 168C is formed in a cylindrical shape having a closed bottom end, which is formed by the other axial end of the partitioning portion 168A.

The second magnetic sealing member 161B, which is made of non-magnetic material, for example, austenitec stainless steel, and formed in a disc shape, is coaxially fitted into the space formed by the inner peripheral wall of the fixed member 111 so as to surround the outer periphery of the magnetic sealing shaft 280 in its rotating direction. The second magnetic sealing member 161B is arranged at a housing-inner side of the sleeve-unit fixing portion 168B but separated from the partitioning portion 168A in the axial direction of the housing 110.

The magnetic sealing sleeve unit 170A, which is accommodated in the sleeve-unit fixing portion 168B, is composed of a permanent magnet 172 and a pair of magnetic-flux guiding plates 174 and 175. A fluid sealing member 180A is accommodated in the sealing-member fixing portion 168C.

The permanent magnet 172, which is made of, for example, ferrite magnet and formed in a cylindrical shape, is coaxially inserted into the sleeve-unit fixing portion 168B so as to surround the outer periphery of the magnetic sealing shaft 280 in its rotating direction. Magnetic poles (N-pole and S-pole) are formed at axial ends of the permanent magnet 172. In other words, the magnet 172 is magnetized in the axial direction. As schematically shown in FIG. 48, the magnetic flux MF is constantly generated between the magnetic poles N and S.

As shown in FIG. 48 (and shown in FIG. 49 for the plate 175), each of the magnetic-flux guiding plates 174 and 175, which is made of magnetic material, for example, carbon steel, and formed in a disc shape, is coaxially inserted into the sleeve-unit fixing portion 168B so as to surround the outer periphery of the magnetic sealing shaft 280 in its rotating direction. The first and second magnetic-flux guiding plates 174 and 175 are separated from each other in the axial direction so as to interpose the permanent magnet 172 between them. In the present embodiment, the first magnetic-flux guiding plate 174 is arranged at a position contacting to the axial side surface of the second magnetic sealing member 161B (the right-hand side surface in FIG. 48), while the second magnetic-flux guiding plate 175 is arranged at a position contacting to the axial side surface of the partitioning portion 168A (the left-hand side surface in FIG. 48). Each of the magnetic-flux guiding plates 174 and 175 is protruding in the radial inward direction from the permanent magnet 172.

The fluid sealing member 180A is an oil sealing member made of, for example, synthetic rubber and having a sealing lip 182. The fluid sealing member 180A is coaxially inserted into the sealing-member fixing portion 168C so as to surround the outer periphery of the magnetic sealing shaft 280 in its rotating direction, more exactly a portion of the outer periphery of the magnetic sealing shaft 280 on a side toward the phase adjusting device 300. The fluid sealing member 180A is, therefore, arranged between the partitioning portion 168A and the bearing 116. The sealing lip 182 of the fluid sealing member 180A is in a sliding contact with a contacting portion 281 of a cylindrical surface of the magnetic sealing shaft 280, so as to fluid-tightly seal a gap between the magnetic sealing member 161A and the magnetic sealing shaft 280.

The magnetic sealing shaft 280 has a magnetic screw portion 282 at a side of the contacting portion 281 in the axial direction toward the inside of the housing 110.

The magnetic screw portion 282 is formed as a portion of the brake shaft 131 and made of magnetic material, for example, chrome molybdenum steel. The magnetic screw portion 282 is formed in an axial area S, which axially extends from a left-hand end of the second magnetic sealing member 161B to a right-hand end of the partitioning portion 168A. In other words, the magnetic screw portion 282 is coaxially surrounded by the second magnetic sealing member 161B, the first magnetic-flux guiding plate 174, the permanent magnet 172, the second magnetic-flux guiding plate 175 and the partitioning portion 168A (hereinafter, those parts are collectively or individually referred to as outer-periphery surrounding part(s) for the axial area S).

Figure 49:
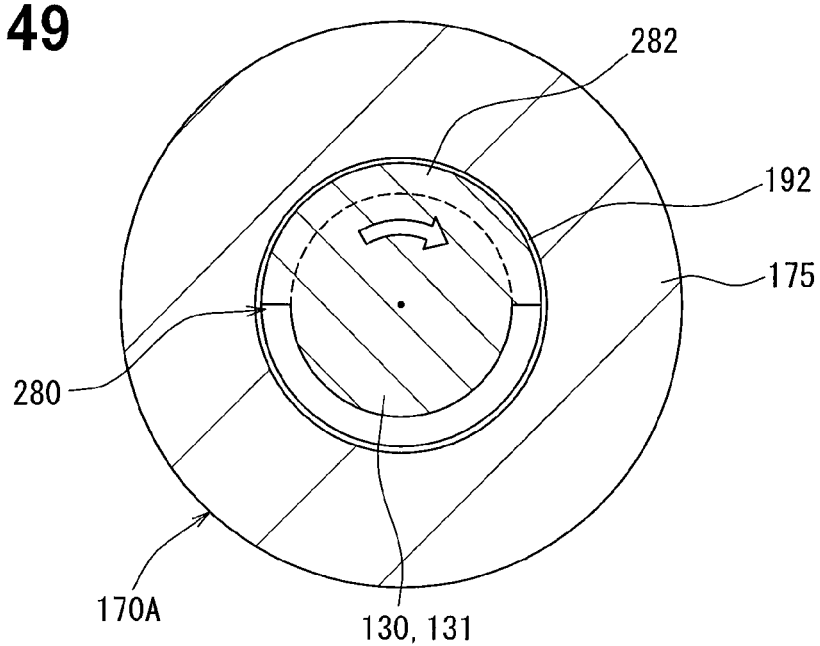
FIG. 49 is a schematic cross sectional view taken along a line XLIX-XLIX in FIG. 48.

As shown in FIGS. 48 and 49, the magnetic screw portion 282 has a spiral projection of a male-screw shape, wherein the spiral projection is projected in a radial outward direction and spirally comes away from the left-hand side (the housing-inner side) toward the right-hand side (the housing-outer side) when tracing the spiral projection in the shaft rotating direction (indicated by an arrow in FIGS. 48 and 49).

A cross section of the spiral projection on a plane including a center axis of the brake shaft 131 has mountain portions and valley portions, which are formed in almost rectangular shapes in the present embodiment. However, the shapes of the mountain portions and the valley portions may be formed in different shapes, for example, in triangular shapes. The magnetic screw portion 282 is formed by a cutting process for the brake shaft 131, so that an outer diameter of a mountain top (that is, an outer diameter of the magnetic screw portion 282) is substantially constant over its area S in the axial direction.

The outer diameter of the mountain top for the magnetic screw portion 282 is made smaller than an inner diameter of each part of the outer-periphery surrounding parts (161B, 174, 172, 175, 168A) for the axial area S. More exactly, the inner diameters of the magnetic-flux guiding plates 174 and 175 and the partitioning portion 168A are made to be substantially equal to each other, while the inner diameter of the second magnetic sealing member 161B and the inner diameter of the permanent magnet 172 are made to be larger than the inner diameters of the magnetic-flux guiding plates 174 and 175 and the partitioning portion 168A. According to the above structure, a first sealing gap 191 is formed between the first magnetic-flux guiding plate 174 and the magnetic screw portion 282, a second sealing gap 192 is formed between the second magnetic-flux guiding plate 175 and the magnetic screw portion 282, and a shielding gap 193 is further formed between the partitioning portion 168A and the magnetic screw portion 282, wherein each gap 191, 192 and 193 is formed in the radial direction. More in detail, the first sealing gap 191 is communicated with the second sealing gap 192 via an inner peripheral space of the permanent magnet 172 in the axial direction, while the second sealing gap 192 is directly communicated with the shielding gap 193 in the axial direction.

In each of the gaps 191, 192 and 193, a distance in a radial direction between each of the outer-periphery surrounding parts 174, 175 and 168A and the magnetic screw portion 282, that is, a radial gap width, becomes a minimum value (a minimum radial gap width "Gm"), when the radial distance is measured between the respective outer-periphery surrounding parts 174, 175 and 168A and the respective mountain tops of the magnetic screw portion 282.

Figure 50:
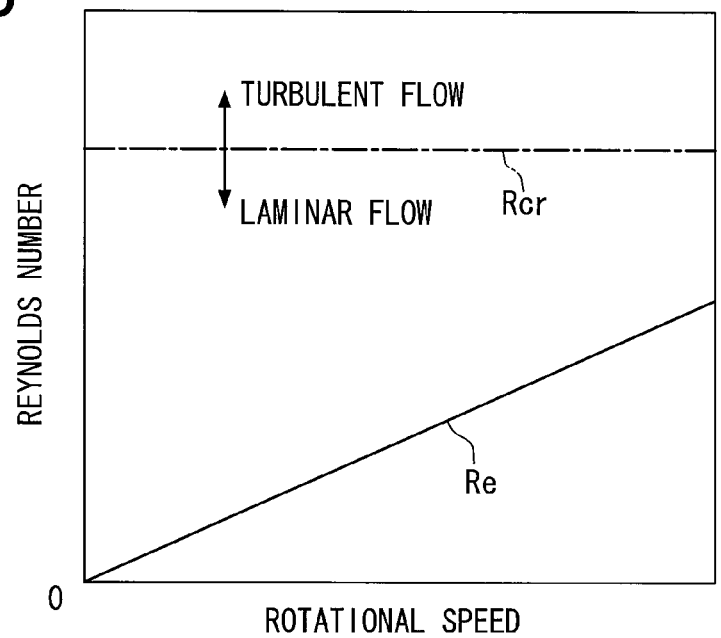
FIG. 50 is a characteristic curve for explaining characteristic of a sealing structure of FIG. 48.

The minimum radial gap widths "Gm" for the respective gaps 191, 192 and 193 are set to be substantially the same to one another, so that Reynolds number "Re" for the non-magnetic fluid of the magnetic viscous fluid 140 is suppressed to be smaller than critical Reynolds number "Rcr" when the non-magnetic fluid passes through the respective gaps 191, 192 and 193, as shown in FIG. 50.

More in detail, in the case that the cross section of the spiral projection of the magnetic screw portion 282 is formed in the rectangular shape, the minimum radial gap width "Gm" and an average radial gap width "Gav" for the respective gaps 191, 192 and 193 satisfy the following formula 1:

"Gav"=[Ar·Gm+Ag·(Gm+H)]/(Ar+Ag)  [Formula 1]

In the formula 1, "Ar" is a width of the mountain portion, "Ag" is a width of the valley portion, and "H" is a height of the mountain top from the valley bottom.

In addition, the Reynolds number "Re" of the non-magnetic fluid and the average radial gap width "Gav" for the respective gaps 191, 192 and 193 satisfy the following formula 2:

"Re"=(F·Gav)/v  [Formula 2]

In the formula 2, "F" is flow speed of the non-magnetic fluid passing through the respective gaps 191, 192 and 193, and "v" is a minimum viscosity of the magnetic viscous fluid in operation.

Furthermore, the critical Reynolds number "Rcr" and the average radial gap width "Gav" satisfy the following formula 3, wherein the critical Reynolds number "Rcr" corresponds to the Reynolds number of the non-magnetic flow when the flow of the non-magnetic fluid is changed from a laminar flow to a turbulent flow in the respective gaps 191, 192, 193, as shown in FIG. 50:

"Rcr"=41.1√(0.5D/Gav)  [Formula 3]

In the formula 3, "D" is an outer diameter of the mountain top for the magnetic screw portion 282.

In the present embodiment, in which the above formulas 1 to 3 are satisfied, the following formula 4 is further satisfied for all range of rotational speed of the magnetic screw portion 282, when the minimum radial gap width "Gm" is set in advance. As shown in FIG. 50, the Reynolds number "Re" is in proportion to the rotational speed of the magnetic screw portion 282, which decides the flow speed of the non-magnetic fluid. The rotational speed of the magnetic screw portion 282 is equal to that of the cam shaft 2, which is rotated together with the brake shaft 131 having the magnetic screw portion 282.

"Re"<"Rcr"  [Formula 4]

According to the above sealing structure 160B, as shown in FIG. 48, the magnetic flux MF of the permanent magnet 172 is guided by the first and second magnetic-flux guiding plates 174 and 175 so as to pass through the magnetic screw portion 282 via the first and second sealing gaps 191 and 192, which are communicated to the fluid chamber 114. As a result, the viscosity of the magnetic viscous fluid 140, which is magnetically attracted to the first and second sealing gaps 191 and 192 from the fluid chamber 114, is increased to thereby form sealing films. In the above sealing structure 160B, the self-sealing function is brought out for restricting, by the fluid itself, the leakage of the magnetic viscous fluid 140 to the outside of the housing 110.

In the above sealing structure 160B, as already explained above, the magnetic screw portion 282 has the spiral projection of the male-screw shape, which is spirally projected so as to come away from the left-hand side (the housing-inner side) toward the right-hand side (the housing-outer side) when tracing the spiral projection in the shaft rotating direction. The magnetic screw portion 282 thereby applies such a moment to the magnetic viscous fluid 140, that the magnetic viscous fluid 140 is magnetically attracted in the axial direction toward the housing-inner side at the respective sealing gaps 191 and 192 as well as the shielding gap 193. The above moment is realized by visco-seal function based on hydrodynamic effect for pumping up the magnetic viscous fluid 140 by repeating compression and expansion and based on viscous effect by the viscosity increase. In the sealing structure 160B having the visco-seal function, the non-magnetic fluid of the magnetic viscous fluid 140, which may be separated from the magnetic particles trapped in the respective sealing gaps 191 and 192 by the magnetic attracting force and which may have leaked in the direction toward the housing-outer side, is pushed back in the direction to the housing-inner side.

(Advantages)

Advantages of the twenty-first embodiment (FIGS. 47 to 50) will be explained.

In the present embodiment, the second sealing gap 192, which is communicated to the first sealing gap 191, is formed in the radial direction between the magnetic screw portion 282 and the second magnetic-flux guiding plate 175. The second magnetic-flux guiding plate 175 is arranged at a position, which is more outer side of the housing 110 in the axial direction than the first magnetic-flux guiding plate 174. In other words, the second magnetic-flux guiding plate 175 is arranged at the housing-outer side of the permanent magnet 172. When the brake rotating member 130 is not rotating, the non-magnetic fluid may be separated from the magnetic viscous fluid 140 in the first sealing gap 191 (through which the magnetic flux MF passes from the first magnetic-flux guiding plate 174 to the magnetic screw portion 282) and such non-magnetic fluid is going to be leaked toward the second sealing gap 192.

In addition, the shielding gap 193, which is communicated to the second sealing gap 192, is formed in the radial direction between the magnetic screw portion 282 and the partitioning portion 168A. The partitioning portion 168A is arranged at a position, which is more outer side of the housing 110 in the axial direction than the second magnetic-flux guiding plate 175. In other words, the partitioning portion 168A is arranged at the housing-outer side of the second magnetic-flux guiding plate 175. When the brake rotating member 130 is not rotating, the non-magnetic fluid may be separated from the magnetic viscous fluid 140 in the second sealing gap 192 (through which the magnetic flux MF passes from the magnetic screw portion 282 to the second magnetic-flux guiding plate 175) and such non-magnetic fluid is going to be leaked toward the shielding gap 193.

The second magnetic-flux guiding plate 175 as well as the partitioning portion 168A is provided on the housing-inner side of the fluid sealing member 180A, which is brought into the sliding contact with an outer peripheral surface of the contacting portion 281 of the brake rotating member 130 so as to bring out a fluid-tight sealing function. According to such a structure, the non-magnetic fluid leaking in the housing-outer direction is kept by the fluid sealing member 180A in the respective gaps (the second sealing gap 192 and the shielding gap 193) formed between the second magnetic-flux guiding plate 175 and the magnetic screw portion 282 and between the partitioning portion 168A and the magnetic screw portion 282. When the brake rotating member 130 starts its rotation, the visco-seal function is brought out by the magnetic screw portion 282 (the spiral projection thereof) to the non-magnetic fluid in the respective gaps 192 and 193. Since the Reynolds number "Re" for the non-magnetic fluid passing through the respective gaps 192 and 193 is suppressed to be smaller than the critical Reynolds number "Rcr" by the minimum radial gap width "Gm", the turbulent flow (which may cause the leakage of the non-magnetic fluid in the housing-outer direction) hardly occurs. The non-magnetic fluid is pushed back in the housing-inner direction from the respective gaps 192 and 193 in the laminar flow. It is, therefore, possible to suppress the variation of the braking characteristic, which may be caused by the leakage of the non-magnetic fluid of the magnetic viscous fluid 140 in the housing-outer direction.

In the present embodiment, as in the same manner to the second sealing gap 192, the Reynolds number "Re" for the non-magnetic fluid passing through the first sealing gap 191 is suppressed to be smaller than the critical Reynolds number "Rcr" by setting the minimum radial gap width "Gm". The turbulent flow is hardly generated in the fluid flow of the non-magnetic fluid, which is pushed back to the first sealing gap 191 from the second sealing gap 192 via the inner peripheral side of the permanent magnet 172. It increases the effect for suppressing the variation of the braking characteristic, which may be caused by the leakage of the non-magnetic fluid in the housing-outer direction. The same thing can be applied to the flow of the non-magnetic fluid, which is pushed back from the shielding gap 193 to the second sealing gap 192.

The magnetic flux MF passes through not only the first sealing gap 191 of the housing-inner side but also the second sealing gap 192 of the housing-outer side. When the magnetic particles are caught up by the non-magnetic fluid and thereby the magnetic particles are going to flow out from the magnetic viscous fluid 140 in the first sealing gap 191 toward the second sealing gap 192 on the housing-outer side, the magnetic particles can be trapped by magnetic attraction in the second sealing gap 192. It is, therefore, possible to suppress the variation of the braking characteristic, which may be caused by the leakage of the magnetic particles from the magnetic viscous fluid 140 in the housing-outer direction.

As above, it is possible to precisely adjust the engine operational phase by the valve timing adjusting apparatus 1, which can suppress the variation of the braking characteristic. In addition, since the sealing films of the magnetic viscous fluid 140 are formed in the respective sealing gaps 191 and 192 and thereby the leakage of the non-magnetic fluid (which may catch up the magnetic particles) in the housing-outer direction can be suppressed, it is possible to make smaller density of the magnetic flux necessary for trapping the magnetic particles. It is possible to reduce frictional resistance, which is applied by the sealing films to the magnetic screw portion 282 of the brake rotating member 130. Durability of the hydraulic braking device can be thereby increased. It is further possible to avoid torque loss, which may cause decrease of fuel consumption ratio for the engine due to the frictional resistance.

In the above twenty-first embodiment, in a case that the first magnetic-flux guiding plate 174 functions as "a magnetic-flux guiding portion", the first sealing gap 191 functions as "a sealing gap portion", and at least one of the second magnetic-flux guiding plate 175 and the partitioning portion 168A functions as "a magnetic-flux restricting portion", then at least one of the second sealing gap 192 and the shielding gap 193 functions as "a fluid pooling gap portion".

In addition, in a case that the second magnetic-flux guiding plate 175 functions as "the magnetic-flux guiding portion", the second sealing gap 192 functions as "the sealing gap portion", and the partitioning portion 168A functions as "the magnetic-flux restricting portion", then the shielding gap 193 functions as "the fluid pooling gap portion".

(Twenty-Second Embodiment)

Figure 51:
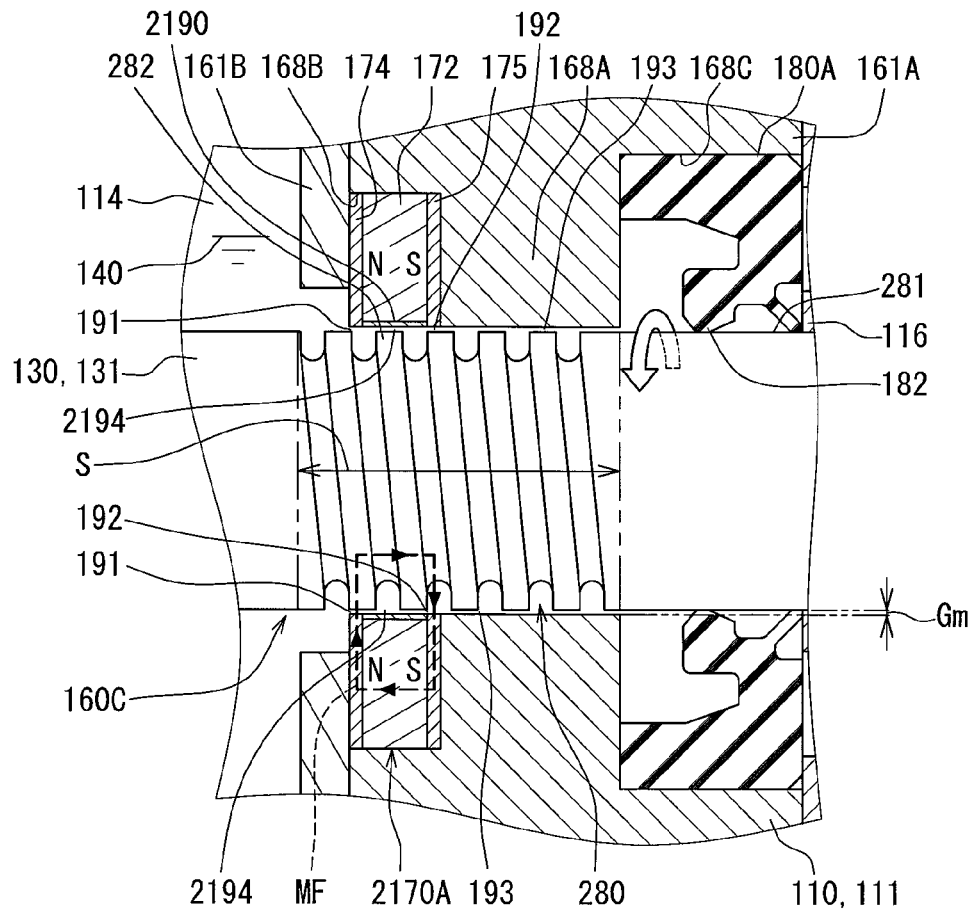
FIG. 51 is a schematically enlarged cross sectional view showing a relevant portion of a hydraulic braking device according to a twenty-second embodiment of the present disclosure.

A twenty-second embodiment of the present disclosure shown in FIG. 51 is a modification of the twenty-first embodiment (FIG. 48). In the twenty-second embodiment, a magnetic-flux shielding member 2190 is provided in a magnetic sealing sleeve unit 2170A of a magnetic sealing structure 160C.

The magnetic-flux shielding member 2190, which is made of non-magnetic material, for example, austenitec stainless steel, and formed in a cylindrical shape, is coaxially fitted into the inner peripheral portion of the permanent magnet 172 so as to surround the outer periphery of the magnetic screw portion 282 of the magnetic sealing shaft 280 in its rotating direction. The magnetic-flux shielding member 2190 is arranged between the first and second magnetic-flux guiding plates 174 and 175, that is, between the housing-outer side of the first magnetic-flux guiding plate 174 and the housing-inner side of the second magnetic-flux guiding plate 175. The magnetic-flux shielding member 2190 restricts short-circuit of the magnetic flux MF directly passing from the first magnetic-flux guiding plate 174 to the second magnetic-flux guiding plate 175. In other words, the magnetic-flux shielding member 2190 prevents the magnetic flux MF from passing not through the magnetic screw portion 282 but in a short-circuit path between the first and second magnetic-flux guiding plates.

An inner diameter of the magnetic-flux shielding member 2190 is substantially equal to that of the first and second magnetic-flux guiding plates 174 and 175 and the partitioning portion 168A. The inner diameter of the magnetic-flux shielding member 2190 is larger than the outer diameter of the mountain top of the magnetic screw portion 282. A magnetic-flux shielding gap 2194 is formed in the radial direction between the magnetic-flux shielding member 2190 and the magnetic screw portion 282. The magnetic-flux shielding gap 2194 is directly communicated to the first and second sealing gaps 191 and 192 in the axial direction.

A radial distance of the magnetic-flux shielding gap 2194 between the magnetic-flux shielding member 2190 and the mountain top of the magnetic screw portion 282 is equal to the minimum radial gap width "Gm". Therefore, the Reynolds number "Re" of the non-magnetic fluid is made to be smaller than the critical Reynolds number "Rcr", when the non-magnetic fluid of the magnetic viscous fluid 140 passes through the magnetic-flux shielding gap 2194. In other words, in the twenty-second embodiment, the formula 4 is satisfied under the condition that the formulas 1 to 3 are satisfied.

In the twenty-second embodiment, the same advantages to the twenty-first embodiments can be obtained. In addition, since the short-circuit of the magnetic flux MF is suppressed, the density of the magnetic flux MF passing through the sealing gaps 191 and 192 is increased. The magnetic particles of the magnetic viscous fluid 140 can be surely trapped in the sealing gaps 191 and 192.

Although the magnetic particles contained in the magnetic viscous fluid 140 are strongly trapped in the first sealing gap 191, the non-magnetic fluid may flow out of the magnetic viscous fluid 140 and may leak to the magnetic-flux shielding gap 2194. According to the present embodiment, however, the non-magnetic fluid is kept in the magnetic-flux shielding gap 2194 when the brake rotating member 130 is not rotated. The non-magnetic fluid is then pushed back to the first sealing gap 191 in the laminar flow, when the brake rotating member 130 is rotated.

In the twenty-second embodiment, it is likewise possible to suppress the variation of the braking characteristic, which may be caused by the leakage of the non-magnetic fluid of the magnetic viscous fluid 140 in the housing-outer direction.

In the twenty-second embodiment, in the case that the first magnetic-flux guiding plate 174 functions as "the magnetic-flux guiding portion", the first sealing gap 191 functions as "the sealing gap portion", and at least one of the second magnetic-flux guiding plate 175 and the partitioning portion 168A functions as "the magnetic-flux restricting portion" together with the magnetic-flux shielding member 2190, then at least one of the second sealing gap 192 and the shielding gap 193 functions as "the fluid pooling gap portion" together with the magnetic-flux shielding gap 2194.

(Twenty-Third & Twenty-Fourth Embodiments)

Figure 52:
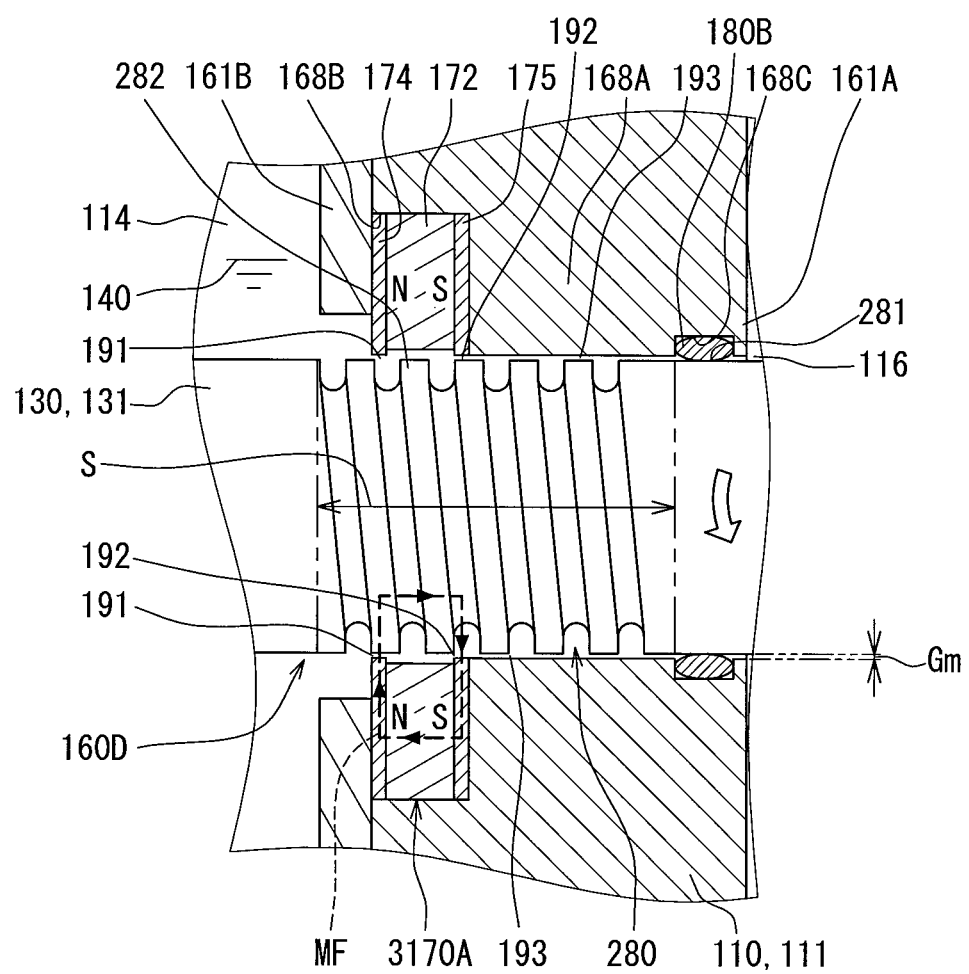
FIG. 52 is a schematically enlarged cross sectional view showing a relevant portion of a hydraulic braking device according to a twenty-third embodiment of the present disclosure.
Figure 53:
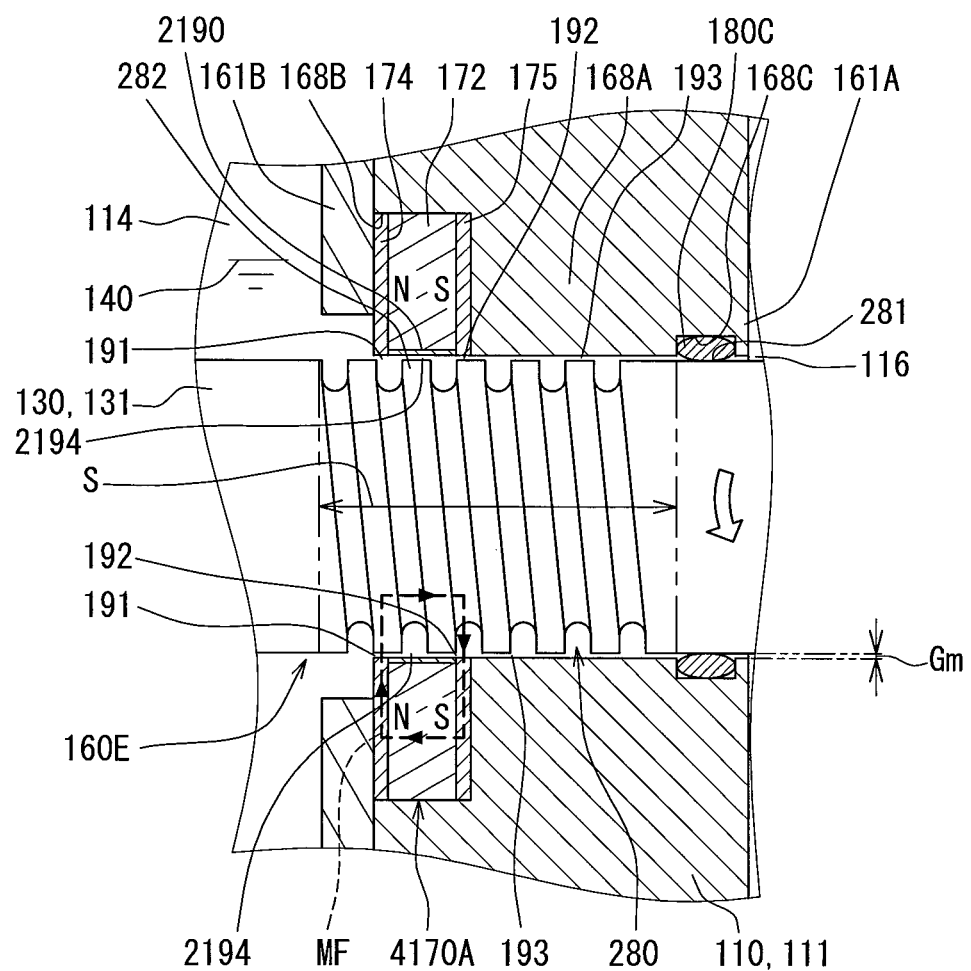
FIG. 53 is a schematically enlarged cross sectional view showing a relevant portion of a hydraulic braking device according to a twenty-fourth embodiment of the present disclosure.

As shown in FIGS. 52 and 53, each of a twenty-third embodiment and a twenty-fourth embodiment of the present disclosure is respectively a modification of the twenty-first and twenty-second embodiments. In the twenty-third and twenty-fourth embodiments, a magnetic sealing sleeve unit 3170A, 4170A of a magnetic sealing structure 160D, 160E has a fluid sealing member 180B, 180C, which is composed of an O-ring made of synthetic rubber. The fluid sealing member 180B, 180C of the O-ring is in a sliding contact with the outer peripheral surface of the contacting portion 281 of the magnetic sealing shaft 280, so as to fluid-tightly seal a gap between the magnetic sealing member 161A and the magnetic sealing shaft 280. The same advantages to the twenty-first and twenty-second embodiments can be obtained in the twenty-third and twenty-fourth embodiments.

(Further Modifications)

The present disclosure should not be limited to the above explained embodiments (for example, the twenty-first to the twenty-fourth embodiments). The present disclosure may be further modified in various manners without departing from the spirit of the present disclosure.

Figure 54:
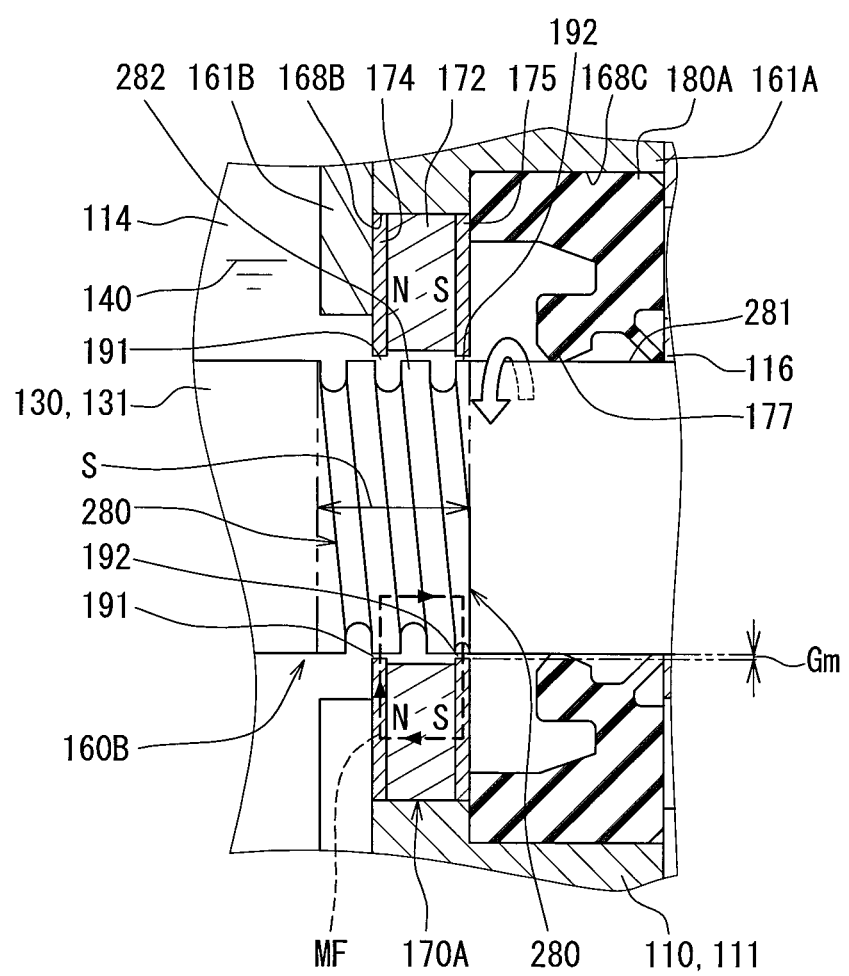
FIG. 54 is a schematic cross sectional view showing a modification of FIG. 48.

For example, FIG. 54 is a modification of the twenty-first embodiment (FIG. 48) showing a relevant portion of the magnetic sealing structure 160B, in which the partitioning portion 168A is removed. In the twenty-second to the twenty-fourth embodiments, the partitioning portion 168A can be likewise removed.

In the modifications of the twenty-first and twenty-third embodiments, in which the partitioning portion 168A is removed, the first magnetic-flux guiding plate 174 functions as "the magnetic-flux guiding portion", the first sealing gap 191 functions as "the sealing gap portion", the second magnetic-flux guiding plate 175 functions as "the magnetic-flux restricting portion", and the second sealing gap 192 functions as "the fluid pooling gap portion".

On the other hand, in the modifications of the twenty-second and twenty-fourth embodiments, in which the partitioning portion 168A is removed, the first magnetic-flux guiding plate 174 functions as "the magnetic-flux guiding portion", the first sealing gap 191 functions as "the sealing gap portion", the second magnetic-flux guiding plate 175 and the magnetic-flux shielding member 2190 function as "the magnetic-flux restricting portion", and the second sealing gap 192 and the magnetic-flux shielding gap 2194 function as "the fluid pooling gap portion".

Figure 55:
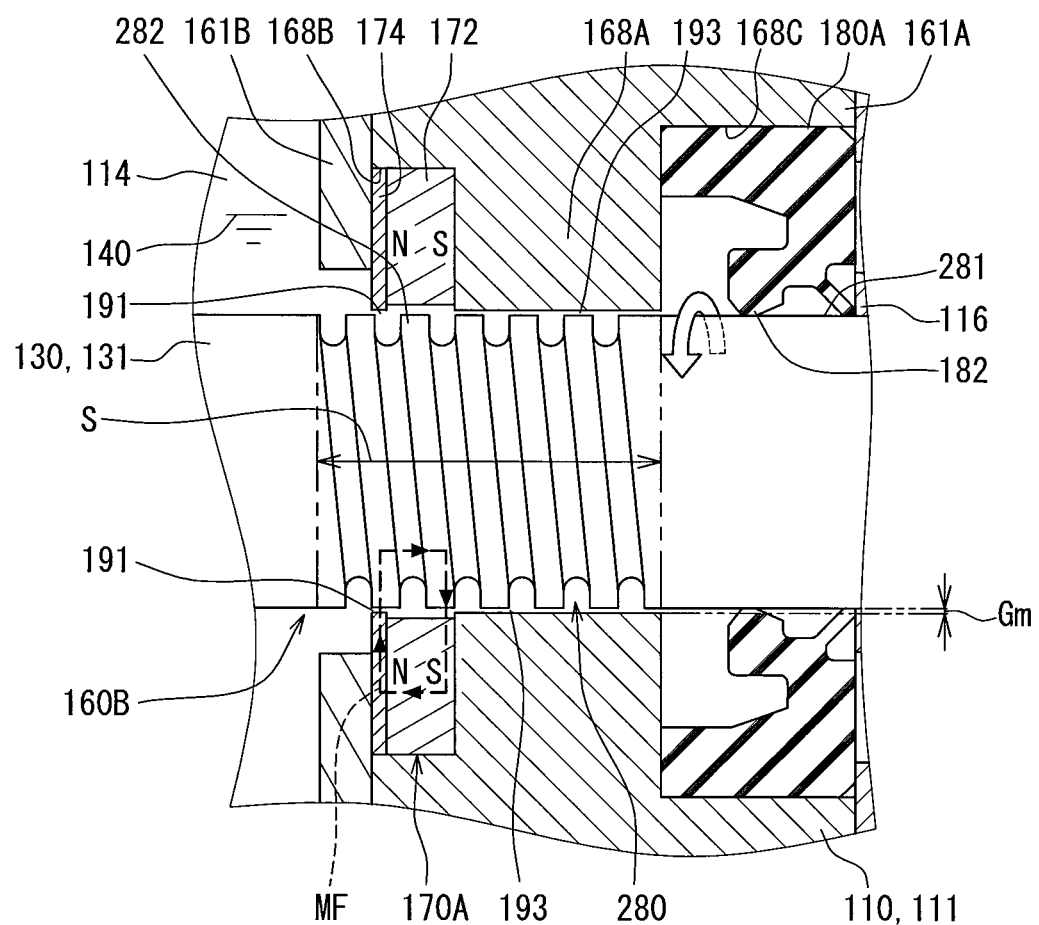
FIG. 55 is a schematic cross sectional view showing another modification of FIG. 48.

In addition, FIG. 55 is another modification of the twenty-first embodiment (FIG. 48) showing a relevant portion of the magnetic sealing structure 160B, in which the second magnetic-flux guiding plate 175 is removed. In the twenty-second to the twenty-fourth embodiments, the second magnetic-flux guiding plate 175 can be likewise removed.

In the modifications of the twenty-first and twenty-third embodiments, in which the second magnetic-flux guiding plate 175 is removed, the first magnetic-flux guiding plate 174 functions as "the magnetic-flux guiding portion", the first sealing gap 191 functions as "the sealing gap portion", the partitioning portion 168A functions as "the magnetic-flux restricting portion", and the shielding gap 193 functions as "the fluid pooling gap portion".

On the other hand, in the modifications of the twenty-second and twenty-fourth embodiments, in which the second magnetic-flux guiding plate 175 is removed, the first magnetic-flux guiding plate 174 functions as "the magnetic-flux guiding portion", the first sealing gap 191 functions as "the sealing gap portion", the partitioning portion 168A and the magnetic-flux shielding member 2190 function as "the magnetic-flux restricting portion", and the shielding gap 193 and the magnetic-flux shielding gap 2194 function as "the fluid pooling gap portion".

In addition, in the twenty-first and twenty-third embodiments (FIGS. 48 and 52), the minimum radial gap width "Gm" for the first and second sealing gaps 191 and 192 may be set at a different value from the minimum radial gap width "Gm" for shielding gap 193, to the extend that the formula 4 is satisfied. Furthermore, in the twenty-first and twenty-third embodiments, the minimum radial gap width "Gm" for one of the first and second sealing gaps 191 and 192 may be set at any optional value, independently from whether the formula 4 is satisfied or not.

For example, when the minimum radial gap width "Gm" for the second sealing gap 192 is set at such a value that the formula 4 is not satisfied, the first magnetic-flux guiding plate 174 functions as "the magnetic-flux guiding portion", the first sealing gap 191 functions as "the sealing gap portion", the partitioning portion 168A functions as "the magnetic-flux restricting portion", and the shielding gap 193 functions as "the fluid pooling gap portion".

In addition, in the twenty-second and twenty-fourth embodiments (FIGS. 51 and 53), the minimum radial gap width "Gm" for the first and second sealing gaps 191 and 192, the minimum radial gap width "Gm" for the shielding gap 193 and the minimum radial gap width "Gm" for the magnetic-flux shielding gap 2194 may be set at such values, which are different from one another, to the extend that the formula 4 is satisfied. Furthermore, in the twenty-second and twenty-fourth embodiments, the minimum radial gap width "Gm" for at least one of the first and second sealing gaps 191 and 192 and the magnetic-flux shielding gap 2194 may be set at any optional value, independently from whether the formula 4 is satisfied or not.

For example, when the minimum radial gap width "Gm" for one of the second sealing gap 192 and the magnetic-flux shielding gap 2194 is set at such a value that the formula 4 is not satisfied, the first magnetic-flux guiding plate 174 functions as "the magnetic-flux guiding portion", the first sealing gap 191 functions as "the sealing gap portion", at least the partitioning portion 168A functions as "the magnetic-flux restricting portion", and at least the shielding gap 193 functions as "the fluid pooling gap portion".

In addition, the magnetic screw portion 282 may be formed in a truncated corn shape, so that the mountain top of the radial projection is increased or decreased in the axial direction from the housing-inner side (the left-hand side) to the housing-outer side (right-hand side). In such a modification, the radial distances of the respective gaps (191, 192, 193, 2194) between the magnetic screw portion 282 and the outer-periphery surrounding parts (174, 175, 168A, 2190) are changed in the axial direction. A maximum distance of the respective gaps is set as the minimum radial gap width "Gm".

In addition, one of the first and second magnetic sealing members 161A and 161B may be integrally formed with the housing 110, which is made of magnetic material.

The present disclosure may be applied to a valve timing adjusting apparatus for an exhaust valve or to a valve timing adjusting apparatus for the intake and exhaust valves. The present disclosure can be further applied to any other apparatuses having the hydraulic braking devices.

What is claimed is:

1. A hydraulic braking device comprising:
   a housing having a fluid chamber;
   magnetic viscous fluid filled in the fluid chamber and made of non-magnetic base fluid into which magnetic particles are dispersed, so that viscosity of the magnetic viscous fluid is changed depending on density of magnetic flux passing through the magnetic viscous fluid;
   a viscosity controlling unit for controlling the density of the magnetic flux passing through the magnetic viscous fluid in order to change the viscosity of the magnetic viscous fluid;
   a brake rotating member having a brake shaft passing through an inside of the housing in its axial direction and outwardly extending from the housing, the brake rotating member being in contact with the magnetic viscous fluid in the fluid chamber so that braking torque depending on the viscosity of the magnetic viscous fluid is applied to the brake rotating member; and
   a sealing structure for fluid-tightly sealing a gap between the housing and the brake rotating member,
   wherein the sealing structure comprises;
   a permanent magnet for generating magnetic flux;
   a magnetic-flux guiding member provided in the housing and surrounding the brake shaft, so that a sealing gap communicated to the fluid chamber is formed between the magnetic-flux guiding member and the brake shaft, the magnetic-flux guiding member guiding the magnetic flux generated at the permanent magnet to the brake shaft;
   a fluid sealing member provided in the housing at a housing-outer side more remote from the magnetic-flux guiding member in the axial direction and being in contact with the brake shaft so as to fluid-tightly seal a gap between the housing and the brake shaft;
   an intermediate fluid chamber formed in the housing between the sealing gap and the fluid sealing member; and
   an intermediate fluid made of non-magnetic liquid and filled in the intermediate fluid chamber.

2. The hydraulic braking device according to claim 1, wherein
   the intermediate fluid is made of liquid different from the base fluid of the magnetic viscous fluid.

3. The hydraulic braking device according to claim 2, wherein
   the base fluid of the magnetic viscous fluid is made of one of polar liquid and non-polar liquid, and
   the intermediate fluid is made of the other of the polar liquid and the non-polar liquid.

4. The hydraulic braking device according to claim 1, wherein
   the intermediate fluid is made of the same liquid to the base fluid of the magnetic viscous fluid.

5. The hydraulic braking device according to claim 1, wherein
   the magnetic-flux guiding member of the sealing structure comprises;
   a first magnetic-flux guiding plate for guiding the magnetic flux of the permanent magnet to the sealing gap formed between the first magnetic-flux guiding plate and the brake shaft; and
   a second magnetic-flux guiding plate, which is provided in the housing at a housing-outer side more remote from the first magnetic-flux guiding plate in the axial direction, and which surrounds the brake shaft so as to form a trapping gap between the second magnetic-flux guiding plate and the brake shaft, the trapping gap being communicated to the intermediate fluid chamber, and the second magnetic-flux guiding plate guiding the magnetic flux of the permanent magnet to the trapping gap.

6. The hydraulic braking device according to claim 5, wherein
   the permanent magnet is interposed between the first and second magnetic-flux guiding plates and surrounds the brake shaft so as to form a part of the intermediate fluid chamber between the permanent magnet and the brake shaft in a radial direction.

7. A valve timing adjusting apparatus for adjusting a valve timing of an operating valve for an internal combustion engine, wherein the operating valve is opened and/or closed by a cam shaft to which torque is transmitted from a crankshaft of the engine, comprising:
   the hydraulic braking device according to claim 1; and
   a phase adjusting device arranged at an outside of the hydraulic braking device and coupled to the brake shaft for adjusting a relative phase between the crankshaft and the cam shaft of the engine depending on the braking torque applied to the brake rotating member of the hydraulic braking device.

8. A hydraulic braking device comprising:
   a housing having a fluid chamber;
   functional fluid filled in the fluid chamber and made of base fluid into which magnetic particles are dispersed, so that viscosity of the functional fluid is changed depending on density of magnetic flux passing through the functional fluid;
   a viscosity controlling unit for controlling the density of the magnetic flux passing through the functional fluid in order to change the viscosity of the functional fluid;
   a brake rotating member having a brake shaft passing through an inside of the housing in its axial direction and outwardly extending from the housing, the brake rotating member being in contact with the functional fluid in the fluid chamber so that braking torque depending on the viscosity of the functional fluid is applied to the brake rotating member; and
   a sealing structure for fluid-tightly sealing a gap between the housing and the brake rotating member,
   wherein the sealing structure comprises;
   a particle sealing member for forming a sealing gap, which is communicated to the fluid chamber, between the particle sealing member and the brake shaft, wherein the particle sealing member seals the sealing gap so as to restrict movement of the magnetic particles in an axial direction from a housing-inner side to a housing-outer side;

a fluid sealing member provided in the housing at the housing-outer side more remote from the particle sealing member in the axial direction and being in contact with the brake shaft so as to fluid-tightly seal a gap between the housing and the brake shaft;

an intermediate fluid chamber formed in the housing between the sealing gap and the fluid sealing member in the axial direction; and an intermediate fluid made of liquid and filled in the intermediate fluid chamber.

9. The hydraulic braking device according to claim 8, wherein the intermediate fluid is made of liquid different from the base fluid of the functional fluid.

10. The hydraulic braking device according to claim 9, wherein the base fluid of the functional fluid is made of one of polar liquid and non-polar liquid, and the intermediate fluid is made of the other of the polar liquid and the non-polar liquid.

11. The hydraulic braking device according to claim 8, wherein the intermediate fluid is made of the same liquid to the base fluid of the functional fluid.

12. The hydraulic braking device according to claim 8, wherein each of the base fluid of the functional fluid and the intermediate fluid is made of non-magnetic liquid, and the particle sealing member comprises;

a magnet for generating magnetic flux; and a magnetic-flux guiding member provided in the housing so as to surround the brake shaft, to thereby form the sealing gap between the magnetic-flux guiding member and the brake shaft, the magnetic-flux guiding member guiding the magnetic flux of the magnet to the brake shaft via the sealing gap.

13. The hydraulic braking device according to claim 12, wherein the magnetic-flux guiding member of the particle sealing member comprises;

a first magnetic-flux guiding plate for guiding the magnetic flux of the magnet to the sealing gap formed between the first magnetic-flux guiding plate and the brake shaft; and a second magnetic-flux guiding plate, which is provided in the housing at a housing-outer side more remote from the first magnetic-flux guiding plate in the axial direction, and which surrounds the brake shaft so as to form a trapping gap between the second magnetic-flux guiding plate and the brake shaft, the trapping gap being communicated to the intermediate fluid chamber, and the second magnetic-flux guiding plate guiding the magnetic flux of the magnet to the trapping gap.

14. The hydraulic braking device according to claim 13, wherein the magnet is interposed between the first and second magnetic-flux guiding plates and surrounds the brake shaft so as to form a part of the intermediate fluid chamber between the magnet and the brake shaft in a radial direction.

15. The hydraulic braking device according to claim 8, wherein the particle sealing member is provided in the housing so as to surround the brake shaft, and the particle sealing member also functions as a gap adjusting member for adjusting a radial gap distance of the sealing gap formed between the particle sealing member and the brake shaft in such a way that the radial gap distance becomes smaller than an outer diameter of the magnetic particles.

16. The hydraulic braking device according to claim 8, wherein the particle sealing member is provided in the housing so as to surround the brake shaft to thereby form the sealing gap between the particle sealing member and the brake shaft, and the particle sealing member is made of a filter member for trapping the magnetic particles so as to restrict flow of the magnetic particles in the axial direction from a housing-inner side to a housing-outer side via the sealing gap.

17. The hydraulic braking device according to claim 8, wherein the particle sealing member is provided in the housing so as to surround the brake shaft to thereby form the sealing gap between the particle sealing member and the brake shaft, and a female-screw shaped portion is so formed at an inner periphery of the particle sealing member that a spiral groove of the female-screw shaped portion comes away in the axial direction from a housing-inner side to a housing-outer side when traced the spiral groove along a rotating direction of the brake shaft, wherein the particle sealing member formed with the female-screw shaped portion functions as visco-seal.

18. The hydraulic braking device according to claim 8, wherein the particle sealing member is provided in the housing so as to surround the brake shaft to thereby form the sealing gap between an inner periphery of the particle sealing member and the brake shaft, and an inner diameter of the inner periphery is increased in the axial direction from a housing-outer side to a housing-inner side.

19. The hydraulic braking device according to claim 8, wherein the particle sealing member is provided in the housing so as to surround the brake shaft to thereby form the sealing gap between an inner periphery of the particle sealing member and the brake shaft, and the sealing gap is formed in a labyrinth structure.

20. A valve timing adjusting apparatus for adjusting a valve timing of an operating valve for an internal combustion engine, wherein the operating valve is opened and/or closed by a cam shaft to which torque is transmitted from a crankshaft of the engine, comprising:

the hydraulic braking device according to claim 8; and a phase adjusting device arranged at an outside of the hydraulic braking device and coupled to the brake shaft for adjusting a relative phase between the crankshaft and the cam shaft of the engine depending on the braking torque applied to the brake rotating member of the hydraulic braking device.

21. A hydraulic braking device comprising:

a housing having a fluid chamber;

magnetic viscous fluid filled in the fluid chamber and made of non-magnetic base fluid into which magnetic particles are dispersed, so that viscosity of the magnetic viscous fluid is changed depending on density of magnetic flux passing through the magnetic viscous fluid;

a viscosity controlling unit for controlling the density of the magnetic flux passing through the magnetic viscous fluid in order to change the viscosity of the magnetic viscous fluid;

a brake rotating member having a brake shaft passing through an inside of the housing in its axial direction and outwardly extending from the housing, the brake rotating member being in contact with the magnetic viscous fluid in the fluid chamber so that braking torque depending on the viscosity of the magnetic viscous fluid is applied to the brake rotating member; and a magnetic sealing sleeve unit provided in the housing so as to surround an outer periphery of the brake shaft, wherein the magnetic sealing sleeve unit comprises;

a magnetic-flux generating member for generating magnetic flux to be guided to the brake shaft, a magnetic-flux guiding member provided at, at least, one of axial ends of a housing-inner side and a housing-outer side of the magnetic-flux generating member, the magnetic-flux guiding member having an inner peripheral portion for forming a sealing gap between the inner peripheral portion and the brake shaft, so that the magnetic flux of the magnetic-flux generating member is guided from the magnetic-flux guiding member to the brake shaft via the sealing gap, or vice versa; and a magnetic shielding member of a sleeve-unit side having an axial end surface, which is in contact with an axial end surface of the inner peripheral portion on a housing-inner side of the magnetic-flux guiding member, for restricting passing of the magnetic flux of the magnetic-flux generating member in the axial direction to the housing-inner side of the magnetic-flux guiding member, wherein the magnetic shielding member forms a communication gap between the magnetic shielding member and the brake shaft so that the fluid chamber is communicated to the sealing gap via the communication gap, and wherein a gap width of the communication gap is made to be equal to or smaller than a gap width of the sealing gap.

22. The hydraulic braking device according to claim 21, wherein
the magnetic shielding member has an inner peripheral portion to form the communication gap between the inner peripheral portion of the magnetic shielding member and the brake shaft, and
an inner diameter of the magnetic shielding member is made to be equal to or smaller than an inner diameter of the magnetic-flux guiding member.

23. The hydraulic braking device according to claim 22, wherein
the inner diameter of the magnetic shielding member is made to be equal to the inner diameter of the magnetic-flux guiding member, and
the gap width of the communication gap is made to be equal to the gap width of the sealing gap.

24. The hydraulic braking device according to claim 21, wherein
the communication gap extends in the axial direction between both axial ends of the magnetic shielding member, and
an axial length of the communication gap is larger than a thickness of the sealing gap in the axial direction.

25. The hydraulic braking device according to claim 21, wherein
the communication gap is formed by the magnetic shielding member in a labyrinth shape snaking between the fluid chamber and the sealing gap.

26. The hydraulic braking device according to claim 21, wherein
the axial end surface of the magnetic shielding member is in contact with the axial end surface of the magnetic-flux guiding member so as to cover a whole area of the axial end surface of the magnetic-flux guiding member from the housing-inner side thereof.

27. The hydraulic braking device according to claim 21, wherein
the brake shaft has;
an annular projection projecting in a radial outward direction to the magnetic-flux guiding member so as to form the sealing gap between the inner peripheral portion of the magnetic-flux guiding member and an outer peripheral portion of the annular projection, so that the magnetic flux of the magnetic-flux generating member is guided from the magnetic-flux guiding member to the annular projection via the sealing gap, or vice versa; and
a magnetic shielding member of a shaft side having an axial end surface, which is in contact with an axial end surface of the outer peripheral portion on the housing-inner side of the annular projection, for restricting the passing of the magnetic flux generated by the magnetic-flux generating member in the axial direction to the housing-inner side.

28. The hydraulic braking device according to claim 21, wherein
the magnetic-flux generating member is composed of a permanent magnet.

29. The hydraulic braking device according to claim 28, wherein
the magnetic-flux guiding member is arranged at the housing-inner side of the permanent magnet, and
the magnetic shielding member is arranged at the housing-inner side of the magnetic-flux guiding member and exposed to the fluid chamber, to thereby form the communication gap between the fluid chamber and the sealing gap, wherein the gap width of the communication gap is made to be equal to or smaller than the gap width of the sealing gap for its entire axial length.

30. The hydraulic braking device according to claim 28, wherein
the magnetic-flux guiding member is arranged at a housing-outer side of the permanent magnet,
the magnetic-flux guiding member has an inner peripheral portion projecting in a radial inward direction, and
the magnetic shielding member of the sleeve-unit side is arranged in an inside of the permanent magnet and in contact with an axial end surface of the inner peripheral portion of the magnetic-flux guiding member so as to cover the axial end surface from the housing-inner side of the magnetic-flux guiding member.

31. The hydraulic braking device according to claim 28, wherein
the magnetic-flux guiding member is composed of a first and a second magnetic-flux guiding plates arranged at respective axial ends of the permanent magnet, each of the first and second magnetic-flux guiding plates having an inner peripheral portion projecting from the permanent magnet in a radial inward direction,
the magnetic shielding member of the sleeve-unit side is arranged in an inside of the permanent magnet and in contact with an axial end surface of the inner peripheral portion of the first magnetic-flux guiding member so as to cover the same axial end surface from the housing-outer side of the first magnetic-flux guiding member, and the magnetic shielding member of the sleeve-unit side is further in contact with an axial end surface of the inner peripheral portion of the second magnetic-flux guiding member so as to cover the same axial end surface from the housing-inner side of the second magnetic-flux guiding member.

32. The hydraulic braking device according to claim 31, wherein the brake shaft has;

a first and a second annular projection, each of which is projected in a radial outward direction to the respective first and second magnetic-flux guiding plates so as to form respective sealing gaps between the inner peripheral portions of the first and second magnetic-flux guiding plates and outer peripheral portions of the first and second annular projections, so that the magnetic flux of the permanent magnet is respectively guided from the magnetic-flux guiding plates to the annular projections via the sealing gaps, or vice versa; and a magnetic shielding member of a shaft side, which is arranged between the first and second annular projections and in contact with axial end surfaces of the first and second annular projections, so as to cover not only the axial end surface of the first annular projection from the housing-outer side thereof but also the axial end surface of the second annular projection from the housing-inner side thereof, wherein the magnetic shielding member of the shaft side forms the communication gap between the magnetic shielding member of the shaft side and the magnetic shielding member of the sleeve-unit side for restricting the passing of the magnetic flux of the permanent magnet in the axial direction to the housing-inner side.

33. The hydraulic braking device according to claim 31, wherein the brake shaft has;

a first and a second annular projection, each of which is projected in a radial outward direction to the respective first and second magnetic-flux guiding plates so as to form respective sealing gaps between the inner peripheral portions of the first and second magnetic-flux guiding plates and outer peripheral portions of the first and second annular projections, so that the magnetic flux of the permanent magnet is respectively guided from the magnetic-flux guiding plates to the annular projections via the sealing gaps, or vice versa; and wherein a part of the magnetic shielding member of the sleeve-unit side is projected into a space formed between the first and second annular projections so as to form a part of the communication gap between the magnetic shielding member of the sleeve-unit side and the first and/or the second annular projections.

34. A valve timing adjusting apparatus for adjusting a valve timing of an operating valve for an internal combustion engine, wherein the operating valve is opened and/or closed by a cam shaft to which torque is transmitted from a crankshaft of the engine, comprising:

the hydraulic braking device according to claim 21; and a phase adjusting device arranged at an outside of the hydraulic braking device and coupled to the brake shaft for adjusting a relative phase between the crankshaft and the cam shaft of the engine depending on the braking torque applied to the brake rotating member of the hydraulic braking device.

35. A hydraulic braking device comprising:

a housing having a fluid chamber;

magnetic viscous fluid filled in the fluid chamber and made of non-magnetic fluid into which magnetic particles are dispersed, so that viscosity of the magnetic viscous fluid is changed depending on density of magnetic flux passing through the magnetic viscous fluid;

a viscosity controlling unit for controlling the density of the magnetic flux passing through the magnetic viscous fluid in order to change the viscosity of the magnetic viscous fluid;

a brake rotating member rotatably accommodated in the fluid chamber, the braking rotating member being in contact with the magnetic viscous fluid in the fluid chamber so that braking torque depending on the viscosity of the magnetic viscous fluid is applied to the brake rotating member, the brake rotating member having a brake shaft outwardly extending from the housing; and a magnetic sealing structure for fluid-tightly sealing a gap between the housing and the brake rotating member, wherein the magnetic sealing structure comprises;

a magnetic-flux generating member provided in the housing for generating magnetic flux;

a magnetic screw portion formed in the brake shaft formed in a male screw shape having a spiral projection, which is projected in a radial outward direction and spirally comes away from a housing-inner side of the brake shaft toward a housing-outer side of the brake shaft when tracing the spiral projection in a shaft rotating direction;

a magnetic-flux guiding portion provided in the housing so as to surround an outer periphery of the brake shaft to thereby form a sealing gap portion in a radial direction between the magnetic screw portion and the magnetic-flux guiding portion, the sealing gap portion being communicated to the fluid chamber, and the magnetic-flux guiding portion guiding the magnetic flux generated by the magnetic-flux generating member to the magnetic screw portion via the sealing gap portion;

a fluid sealing member provided in the housing so as to be in contact with the outer periphery of the brake shaft for fluid-tightly sealing a gap between the brake shaft and the housing; and a magnetic-flux restricting portion provided in the housing between the magnetic-flux guiding portion and the fluid sealing member in the axial direction so as to surround the outer periphery of the magnetic screw portion, the magnetic-flux restricting portion forming a fluid pooling gap portion in the radial direction between the magnetic screw portion and the magnetic-flux restricting portion, the fluid pooling gap portion being communicated to the sealing gap portion, wherein a radial distance of the fluid pooling gap portion is set to be such a value that Reynolds number of the non-magnetic fluid passing through the fluid pooling gap portion becomes smaller than a critical Reynolds number.

36. The hydraulic braking device according to claim 35, wherein a radial distance of the sealing gap portion is set to be such a value that Reynolds number of the non-magnetic fluid passing through the sealing gap portion becomes smaller than the critical Reynolds number.

37. The hydraulic braking device according to claim 35, wherein the sealing gap portion is composed of a first sealing gap and a second sealing gap, and the magnetic-flux guiding portion comprises;
a first magnetic-flux guiding plate for guiding the magnetic flux to the magnetic screw portion via the first sealing gap; and
a second magnetic-flux guiding plate for guiding the magnetic flux to the magnetic screw portion via the second sealing gap,
wherein the second magnetic-flux guiding plate is provided in the housing at a hosing-outer side of the magnetic-flux generating member, which corresponds to such a position more apart from the fluid chamber in the axial direction than the first magnetic-flux guiding plate,
wherein the second magnetic-flux guiding plate surrounds the outer periphery of the magnetic screw portion to thereby form at least a portion of the magnetic-flux restricting portion,
wherein the second magnetic-flux guiding plate forms the second sealing gap in the radial direction between the magnetic screw portion and the second magnetic-flux guiding plate, and
wherein the second sealing gap functions as the fluid pooling gap portion.

38. The hydraulic braking device according to claim 37, wherein
the magnetic-flux generating member is composed of a permanent magnet provided in the housing between the first and second magnetic-flux guiding plates so as to surround the outer periphery of the magnetic screw portion for generating the magnetic flux, which is guided by the first and second magnetic-flux guiding plates to the magnetic screw portion; and
the magnetic sealing structure further comprises a magnetic-flux shielding member provided in the housing at an inner periphery of the permanent magnet to surround the outer periphery of the magnetic screw portion,
wherein the magnetic-flux shielding member forms at least a portion of the magnetic-flux restricting portion together with the second magnetic-flux guiding plate,
wherein the magnetic-flux shielding member forms a magnetic-flux shielding gap, which functions as the fluid pooling gap portion communicated to the first and second sealing gaps, in the radial direction between the magnetic screw portion and the magnetic-flux shielding member, and
wherein the magnetic-flux shielding member restricts short-circuit of the magnetic flux between the first and second magnetic-flux guiding plates.

39. A valve timing adjusting apparatus for an internal combustion engine, in which torque is transmitted from a crankshaft to a cam shaft of the engine to open and close an intake valve and/or an exhaust valve and a valve opening and/or closing timing is controlled, comprising:
the hydraulic braking device according to claim 35; and
a phase adjusting device provided at an outside of the hydraulic braking device and connected to the brake rotating member for adjusting a relative phase between the crankshaft and the cam shaft depending on the braking torque applied to the brake rotating member.

* * * * *